(12) United States Patent
Aoyanagi

(10) Patent No.: US 11,620,732 B2
(45) Date of Patent: Apr. 4, 2023

(54) MULTI-PROJECTION SYSTEM, IMAGE PROJECTION METHOD AND PROJECTOR

(71) Applicant: NEC Display Solutions, Ltd., Tokyo (JP)

(72) Inventor: Hisakazu Aoyanagi, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 476 days.

(21) Appl. No.: 16/636,295

(22) PCT Filed: Sep. 19, 2017

(86) PCT No.: PCT/JP2017/033686
§ 371 (c)(1),
(2) Date: Feb. 3, 2020

(87) PCT Pub. No.: WO2019/058415
PCT Pub. Date: Mar. 28, 2019

(65) Prior Publication Data
US 2020/0193568 A1   Jun. 18, 2020

(51) Int. Cl.
*G06T 5/00* (2006.01)
*H04N 9/31* (2006.01)

(52) U.S. Cl.
CPC .......... *G06T 5/002* (2013.01); *H04N 9/3147* (2013.01); *H04N 9/3155* (2013.01); *H04N 9/3185* (2013.01)

(58) Field of Classification Search
CPC ............... H04N 9/3147; H04N 13/363; H04N 13/324; H04N 9/3194; H04N 13/254; H04N 13/27
See application file for complete search history.

(56) References Cited

U.S. PATENT DOCUMENTS

2008/0095468 A1   4/2008   Klemmer et al.
2013/0222386 A1*  8/2013   Tannhauser .......... H04N 9/3185
                                          345/428
(Continued)

FOREIGN PATENT DOCUMENTS

JP    2006-165949 A    6/2006
JP    2007-156325 A    6/2007
(Continued)

OTHER PUBLICATIONS

International Search Report (ISR) (PCT Form PCT/ISA/210), in PCT/JP2017/033686, dated Dec. 19, 2017.

*Primary Examiner* — Samira Monshi
(74) *Attorney, Agent, or Firm* — McGinn I.P. Law Group, PLLC.

(57) ABSTRACT

A multi-projection system for projecting an image from a plurality of projectors onto a three-dimensional object, includes a master projector and a slave projector. The slave projector estimates an amount of blur in an image projected from the projector itself on a plurality of planes of the three-dimensional object, and provides the estimated amount of blur in the image to the master projector. The master projector estimates an amount of blur in an image projected from the projector itself on a plurality of planes of the three-dimensional object, and determines a region of the image projected from the plurality of projectors for each of the plurality of planes based on the amount of blur in the image estimated by the master projector and the amount of blur in the image estimated by the slave projector.

10 Claims, 34 Drawing Sheets

(56) References Cited

U.S. PATENT DOCUMENTS

2015/0161775 A1\* 6/2015 Kim .................. G06F 3/1446
                                                                               345/634
2015/0347077 A1\* 12/2015 Kataoka ............. G06F 3/147
                                                                               345/1.1

FOREIGN PATENT DOCUMENTS

| JP | 2007-316461 A | 12/2007 |
| JP | 2009-524849 A | 7/2009 |
| JP | 2012-047849 A | 3/2012 |
| JP | 2013-165344 A | 8/2013 |
| JP | 2017-201748 A | 11/2017 |
| WO | WO 2017/085802 A1 | 5/2017 |

\* cited by examiner

MULTI-PROJECTION SYSTEM, IMAGE PROJECTION METHOD AND PROJECTOR

TECHNICAL FIELD

The present invention relates to a multi-projection system, an image projection method for projecting an image from a plurality of projectors provided in the multi-projection system to a three-dimensional object and a projector provided in the multi-projection system.

BACKGROUND ART

In recent years, projection mapping for projecting an image onto various three-dimensional objects such as buildings, human bodies, furniture, automobiles, trees, and uneven walls has been actively performed using projectors. In the projection mapping, since an image is projected onto a three-dimensional object having depth, a problem occurs in which a region (blur) having an out of focus image is generated in the projected image. For this reason, in the projection mapping of the background art, for example, a technique to reduce blur by using a projection lens having a wide range of distances (projection distances) with respect to an imaging plane that appears to be in focus, that is, having a deep depth of field, has been adopted. Alternatively, in the projection mapping of the background art, a technique to reduce the influence of a blur by devising the creation of a projected image, such as projecting a low-resolution image onto a projection plane in which the blur increases, has been adopted.

In projection mapping, multi-projection in which one or a plurality of images are projected using a plurality of projectors, is often used.

In multi-projection, even if an amount of blur in images that are projected from an arbitrary projector onto an arbitrary plane is small, if an amount of blur in images that are projected from another projector onto the same plane is large, then a problem will occur in which the amount of blur in images that are projected onto the plane increases.

Also, in a multi-projection in which an image is projected onto a three-dimensional object, an image may be projected unintentionally from a projector onto an arbitrary plane. Further, in an multi-projection in which an image is projected onto a three-dimensional object, if the inclination of the projected image with respect to an arbitrary plane is extremely large, an image whose resolution is greatly reduced will be projected onto the plane. Therefore, there is a problem that the projected image will deteriorate on the plane on which an unintended image is projected or on the plane on which an image having a greatly reduced resolution is projected.

A technique for correcting a projected image in multi-projection is proposed in, for example, Patent Documents 1-3.

Patent Document 1 discloses a technique by measuring distances between a plurality of projectors and a plurality of projection planes, and by selecting a projector whose distance from the projection plane corresponds to a focal length, to display an image in focus.

Patent Document 2 describes projecting adjustment images having different characteristics from a plurality of projectors used for stack projection or stereo projection, respectively, and adjusting the projection conditions of the projectors based on the captured data of the adjustment images. The characteristics of the adjustment image include a wavelength range, a polarization characteristic, a projection position, and the like. The projection condition is an adjustment value of a focal length, a zoom magnification, a correction value of trapezoidal distortion, or the like.

Patent Document 3 discloses measuring a three-dimensional position of screens on which images are projected, and performing geometric correction of the projected images projected on each screen based on the three-dimensional position.

RELATED ART DOCUMENTS

Patent Documents

Patent Document 1: JP 2007-156325 A
Patent Document 2: JP 2012-047849 A
Patent Document 3: JP 2013-165344 A

SUMMARY

Problem to be Solved by the Invention

In the technique described in Patent Document 1, a projector capable of displaying an image focused on each plane of a three-dimensional object is selected and the image is projected. Therefore, it is impossible to solve the above-mentioned problem that occurs when images are projected from a plurality of projectors on the same plane. On the other hand, the techniques described in Patent Documents 2 and 3 are not for projecting an image onto a three-dimensional object.

It is an object of the present invention to provide a multi-projection system, an image projection method and a projector capable of reducing an increase in the amount of blur in images that are projected onto a three-dimensional object and reducing deterioration of a projected image onto a three-dimensional object.

Means for Solving the Problem

In order to achieve the above object, a multi-projection system of an exemplary aspect of the present invention is a multi-projection system for projecting an image from a plurality of projectors onto a three-dimensional object, comprising:

a master projector that is one of the plurality of projectors and that controls the operation of the multi-projection system; and a slave projector that is not the master projector in the plurality of projectors and that performs processing in accordance with an instruction of the master projector, wherein the slave projector estimates an amount of blur in an image projected from the projector itself in each of a plurality of planes of the three-dimensional object, and provides the estimated amount of blur in the image to the master projector, wherein the master projector estimates an amount of blur in an image projected from the projector itself in each of a plurality of planes of the three-dimensional object, and determines regions of the image projected from the plurality of projectors based on the amount of blur in the image estimated by the master projector and based on the amount of blur in the image estimated by the slave projector so that the amounts of blur in the image in each of the plurality of planes are minimized, respectively.

On the other hand, an image projection method of an exemplary aspect of the present invention is an image projection method for projecting an image onto a three-dimensional object from a plurality of projectors provided in a multi-projection system that comprises a master projector that is one of the plurality of projectors and that controls the operation of the multi-projection system, and a slave projector that is not the master projector in the plurality of projectors and that performs processing in accordance with an instruction of the master projector, the method comprising steps of:

estimating, by the slave projector, an amount of blur in an image projected from the projector itself in each of a plurality of planes of the three-dimensional object;

providing, by the slave projector, the estimated amount of blur in the image to the master projector;

estimating, by the master projector, an amount of blur in an image projected from the projector itself in each of a plurality of planes of the three-dimensional object; and determining, by the master projector, regions of the image projected from the plurality of projectors based on the amount of blur in the image estimated by the master projector and based on the amount of blur in the image estimated by the slave projector so that the amounts of blur in the image in each of the plurality of planes are minimized, respectively.

A projector of an exemplary aspect of the present invention is a projector in a multi-projection system for projecting an image from a plurality of projectors onto a three-dimensional object, comprising:

a blur amount estimation unit that estimates an amount of blur in an image projected from the projector in each of a plurality of planes of the three-dimensional object; and a blending unit that determines regions of the image projected from the plurality of projectors based on the amount of blur in the image estimated by the blur amount estimation unit and based on the amount of blur in the image estimated by another projector except for the projector itself in the plurality of projectors so that the amounts of blur in the image on the plurality of faces are minimized, respectively.

Effect of the Invention

According to the present invention, it is possible to reduce an increase in the amount of blur in images that are projected image on the three-dimensional object and to reduce a deterioration of the projected image on the three-dimensional object.

EXEMPLARY EMBODIMENT

Next, the present invention will be explained with reference to the drawings.

First Exemplary Embodiment

Figure 1:
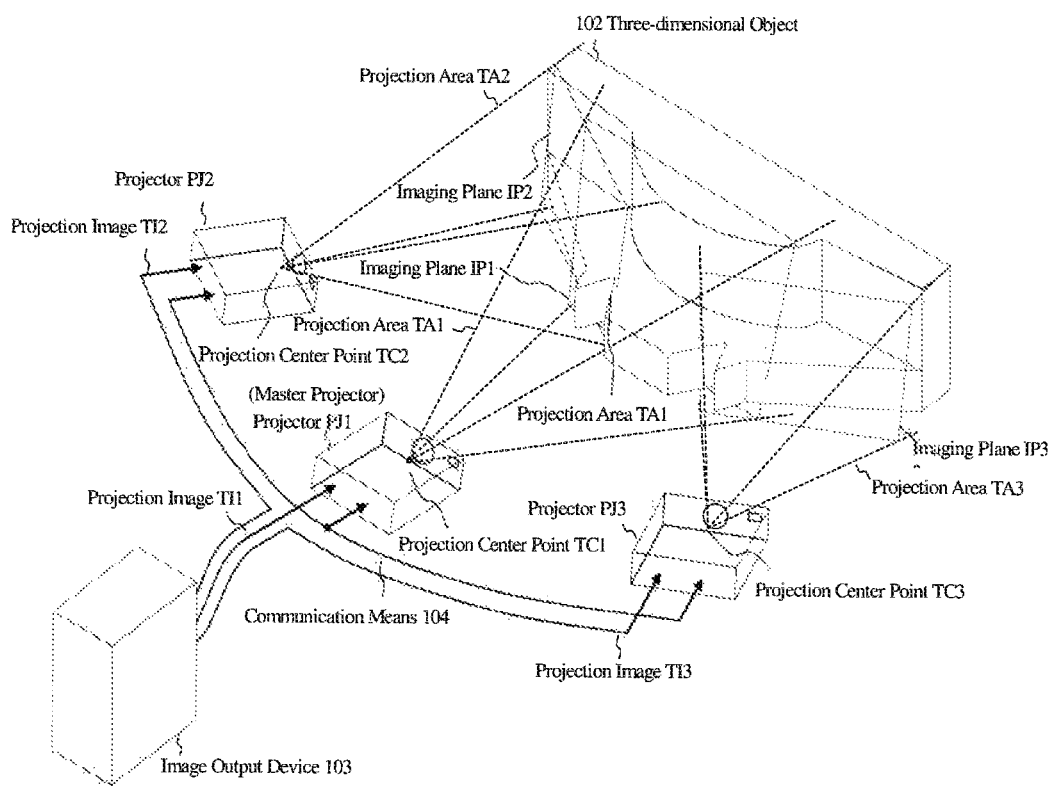
FIG. 1 is a schematic diagram showing an example of a configuration of a multi-projection system of the present invention.

FIG. 1 is a schematic diagram showing an example of a configuration of a multi-projection system of the present invention.

As shown in FIG. 1, the multi-projection system includes a plurality of projectors (three in FIG. 3) PJ1-PJ3, which are connected to each other via a communication unit so that data and signals can be transmitted and received. The number of projectors included in the multi-projection system is not limited to three, and may be any number as long as the number of projectors is two or more. As the communication unit, a communication device conforming to the RS (Recommended Standard)-232 standard, or a wired LAN (Local Area Network), a radio LAN, or the like realized by a well-known communication method, may be used. The communication means is not limited to these, and may be realized by using other communication methods.

Image signals are inputted to projectors PJ1-PJ3 from image output device 103 such as a personal computer. Projectors PJ1-PJ3 project images represented by the inputted image signals onto three-dimensional object 102 to be projected.

In FIG. 1, the projection center point of projector PJ1 is denoted by TC1, the projection area is denoted by TA1, the imaging plane is denoted by IP1, and the projected image represented by the image signals inputted to projector PJ1 is denoted by TI1. Similarly, in FIG. 1, the projection center point of projector PJ2 is denoted by TC2, the projection area is denoted by TA2, the imaging plane is denoted by IP2, and the projected image represented by the image signals inputted to projector PJ2 is denoted by TI2. In FIG. 1, the projection center point of projector PJ3 is indicated by TC3, the projection area thereof is indicated by TA3, the imaging plane thereof is indicated by IP3, and the projection image indicated by the image signals inputted to projector PJ3 is indicated by TI3. The projection areas TA1-TA3 indicate respective ranges of images projected from the projectors PJ1-PJ3 on the imaging planes IP1-IP3 of projectors PJ1-PJ3.

Hereinafter, when the multi-projection system shown in FIG. 1 is described as an example, the same reference numerals as those described above are given to each projector, three-dimensional objects, and the projection center point, imaging plane and projection image of each projector in the drawing used in the description.

When images are projected from a plurality of projectors onto one plane of three-dimensional object 102 shown in FIG. 1, it is assumed that the images projected from the plurality of projectors are created in advance so that they become the same image on the plane.

Here, the relationship between an image projected from a plurality of projectors and an image on each plane of a three-dimensional object will be described in detail with reference to FIG. 2. For simplification of description, FIG. 2 shows an example in which a three-dimensional object is composed of three planes, that is, planes A, B and C.

Figure 2:
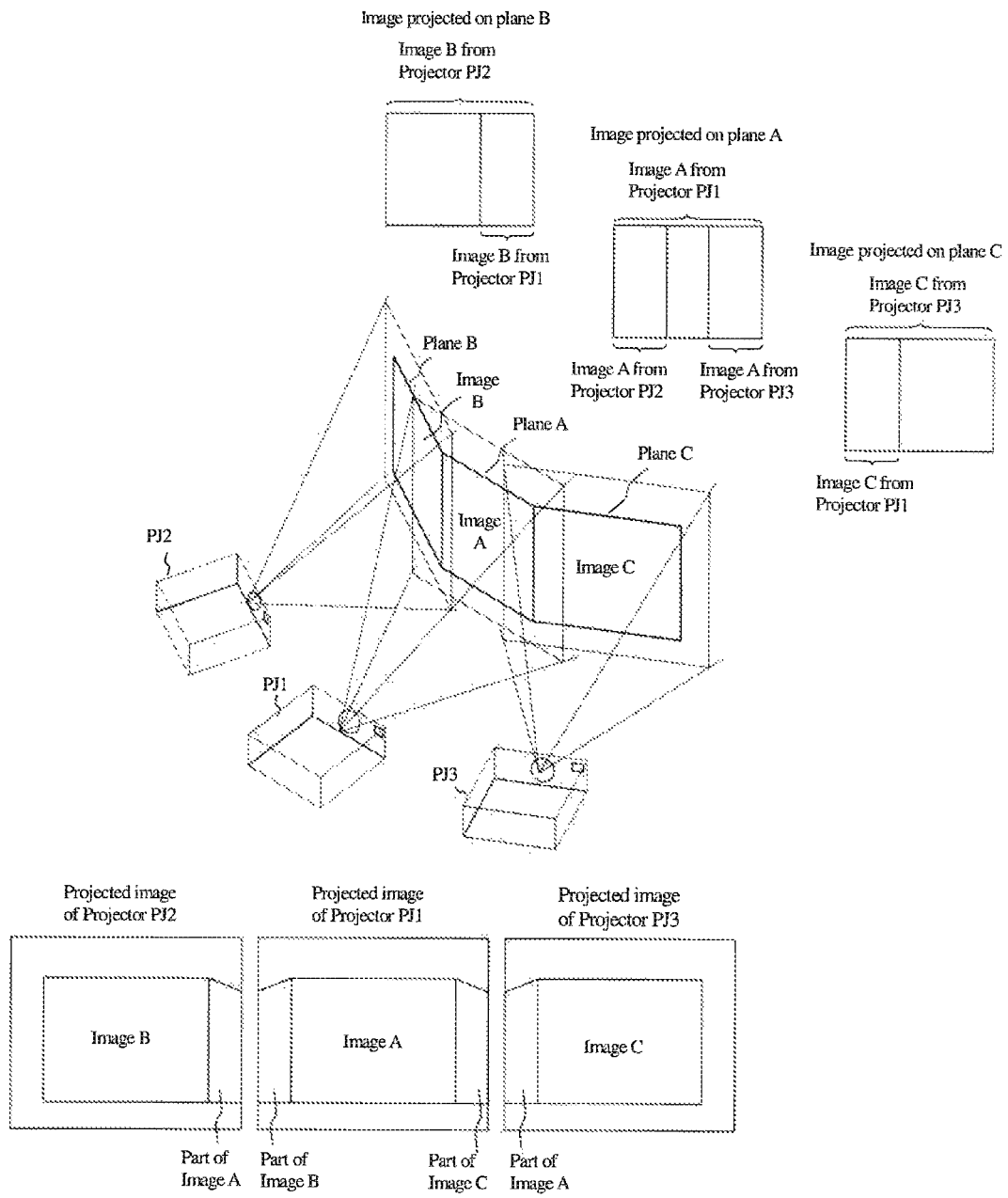
FIG. 2 is a schematic diagram showing an example of a relationship between an image projected from a plurality of projectors and an image on each plane of a three-dimensional object.

As shown in FIG. 2, it is assumed that projector PJ1 is installed in front of plane A of the three-dimensional object, projector PJ2 is installed in front of plane B of the three-dimensional object, and projector PJ3 is installed in front of plane C of the three-dimensional object. Further, it is assumed that image A is projected on plane A, image B is projected on plane B, and image C is projected on plane C. Further, it is assumed that projector PJ1 projects an image on plane A, a part of an image on the right side of plane B as viewed from the front, and a part of an image on the left side of plane C as viewed from the front. It is assumed that projector PJ2 projects an image on plane B and a part of an image on the left side of plane A as viewed from the front, and projector PJ3 projects an image on plane C and a part of an image on the right side of plane A as viewed from the front.

In this case, the image projected from projector PJ1 needs to include a part of image A, a part of image B and a part of image C. Similarly, the image projected from projector PJ2 needs to include a part of image B and image A, and the image projected from projector PJ3 needs to include a part of image C and image A. That is, projectors PJ1-PJ3 projects images differing from each other on a plurality of planes in the projection areas of the projector itself.

Therefore, in the case shown in FIG. 2, the images projected from projectors PJ1-PJ3 are prepared in advance so that the images become image A on plane A, image B on plane B and image C on plane C.

In the multi-projection system shown in FIG. 1, any one of a plurality of projectors becomes a master projector, and the remaining projectors become slave projectors. FIG. 1 shows examples in which projector PJ1 is a master projector and projectors PJ2 and PJ3 are slave projectors. The master projector controls the operation of the entire multi-projection system including the master projector and the slave projector. The slave projector executes processing in accordance with instructions from the master projector.

Projectors PJ1-PJ3 measure the position of three-dimensional object 102 (the distances from projectors PJ1-PJ3 to three-dimensional object 102), which is the projection target of the image, in three dimensions, and generate three-dimensional position data which are the measurement result. Further, projectors PJ1-PJ3 generate projector data including a projector position coordinate indicating the position of the projector itself and a lens optical axis direction vector indicating the optical axis direction of the projection lens which is the projection direction of the images.

The master projector acquires the three-dimensional position data generated by the slave projectors. The master projector performs alignment of three-dimensional object 102 indicated by the three-dimensional position data generated by the master projector itself and the three-dimensional position data acquired from each slave projector, and integrates them into one three-dimensional position data. Furthermore, the master projector converts the coordinate system of the integrated three-dimensional position data into a world coordinate system in the master projector, and detects a plurality of planes included in three-dimensional object 102 indicated by the three-dimensional position data of the world coordinate system. The detected plane data indicating the plane of three-dimensional object 102 is transmitted to each slave projector. The world coordinate system is a coordinate system with reference to a horizontal plane.

Based on the integrated three-dimensional position data, projectors PJ1-PJ3 estimate the amount of blur caused by the pixel-by-pixel focus deviation in the projected images on each plane, which is projected from the projector itself to three-dimensional object 102. The master projector acquires the amount of blur in images for each plane estimated by each slave projector. Based on the amount of blur in images estimated by projectors PJ1-PJ3, the master projector determines the area of the image projected from projectors PJ1-PJ3 for each plane so that the amount of blur in images on each plane of three-dimensional object 102 is minimized. At this time, the master projector determines a region in which an image is projected from one projector and a blending region, which is a region in which images projected from a plurality of projectors are superimposed on a plane on which an image is projected. The blending region is a region in which, when an image is projected from a plurality of projectors onto the same plane of three-dimensional object 102, a part of each image provided at a boundary between three-dimensional object 102 and an adjacent image on the plane is superimposed.

The master projector calculates a blending coefficient for adjusting the luminance of each pixel of the image signal corresponding to the image projected on the plurality of planes of three-dimensional object 102 based on the set area for projecting the image for each projector. The master projector transmits the calculated blending coefficients of the respective planes to the respective slave projectors.

Projectors PJ1-PJ3 integrate the blending coefficients on each plane of three-dimensional object 102 to generate the blending coefficients of the entire projected image. Projectors PJ1-PJ3 adjust the brightness of the projected image by adjusting the signal levels of the image signals using the generated blending coefficients.

In the present exemplary embodiment, a series of operations in projectors PJ1-PJ3 described above is referred to as a "blending operation".

Figure 3:
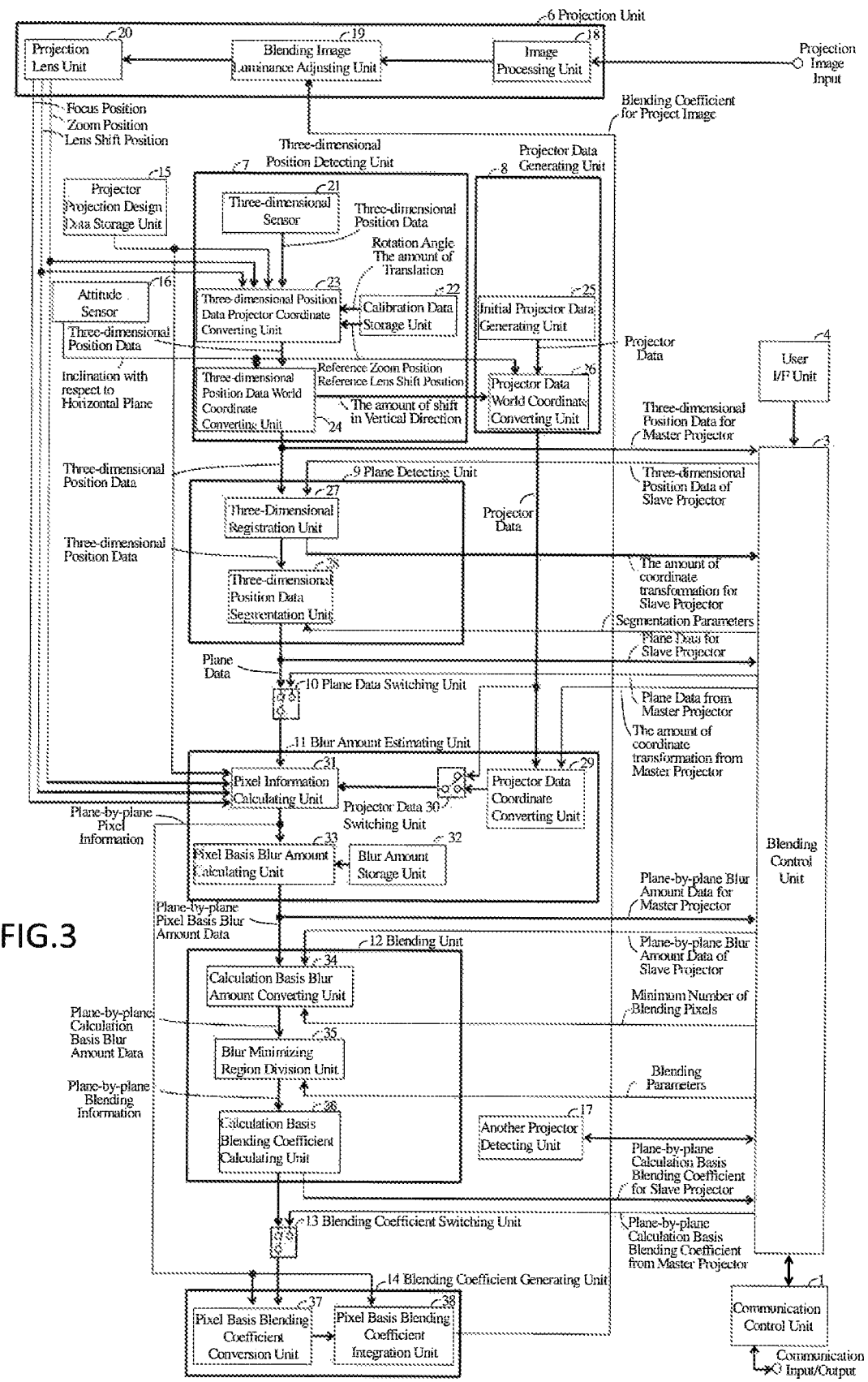
FIG. 3 is a block diagram showing an example of the configuration of a projector according to the first exemplary embodiment.

FIG. 3 is a block diagram showing an example of the configuration of the projector according to the first exemplary embodiment.

The projector of the first exemplary embodiment includes communication control unit 1, blending control unit 3, user I/F unit 4, projection unit 6, three-dimensional position detecting unit 7, projector data generating unit 8, plane detecting unit 9, plane data switching unit 10 and blur amount estimating unit 11. The projector of the first exemplary embodiment further includes blending unit 12, blending coefficient switching unit 13, blending coefficient generating unit 14, projector projection design data storage unit 15, attitude sensor 16 and another projector detecting unit 17.

Communication control unit 1 controls a communication unit (not shown) to transmit and receive data and signals to and from other projectors.

Blending control unit 3 stores various parameters used in the processes of plane detecting unit 9 and blending unit 12, and controls the blending operation.

User I/F unit 4 is a user interface used by the user to input instructions, parameters, and the like to the projector.

Projection unit 6 projects an image represented by an image signal supplied from image output device 103 such as a personal computer onto three-dimensional object 102 to be projected.

Projection unit 6 includes image processing unit 18, blending image luminance adjusting unit 19 and projection lens unit 20.

Image processing unit 18 performs resolution conversion for converting the resolution of the image represented by the image signal supplied from image output device 103 into the resolution of the image forming element included in the projector, image quality adjustment of the image represented by the image signal, and the like. DMDs (Digital Micromirror Device: registered trademark), liquid crystal panels, and the like are used as the image-forming elements.

Blending image luminance adjusting unit 19 adjusts the signal level of each pixel of the image represented by the image signal output from image processing unit 18 based on the blending coefficient generated by blending coefficient generating unit 14.

Projection lens unit 20 has a zoom function for adjusting the size of the projected image, a focus function for adjusting the imaging position of the projected image and a lens shift function for adjusting the projected image position vertically and horizontally. Projection lens unit 20 projects an image represented by an image signal whose signal level is adjusted by blending image luminance adjusting unit 19. Projection lens unit 20 detects a zoom position, a focus position and a lens shift position of the projection lens, and outputs data indicating the detected values to blur amount estimating unit 11 and three-dimensional position detecting unit 7. The zoom position indicates an amount of enlargement or an amount of reduction of the image on the projection plane. The focus position indicates an amount of adjustment of the imaging position. The lens shift position indicates an amount of movement of the image position on the projection plane in the up, down, left, and right directions.

Hereinafter, the maximum range in which an image can be projected by using the lens shift function of the projector is referred to as a "projection possible area".

Three-dimensional position detecting unit 7 includes three-dimensional sensor 21, calibration data storage unit 22, three-dimensional position data projector coordinate converting unit 23 and three-dimensional position data world coordinate converting unit 24.

Three-dimensional sensor 21 three-dimensionally measures the position of three-dimensional object 102, which is the projection target of the image, and outputs three-dimensional position data indicating the measurement result.

Calibration data storage unit 22 stores the amount of rotation and the amount of translation which are parameters for converting the coordinate system of three-dimensional sensor 21 into the projector coordinate system. The amount of rotation and the amount of translation used for the conversion of the coordinate system may be obtained by measuring in advance the positional relationship between the coordinate system of three-dimensional sensor 21 and the coordinate system of the projector. In the present exemplary embodiment, the process for converting the coordinate system of three-dimensional sensor 21 into the coordinate system of the projector is sometimes referred to as "calibration". Calibration data storage unit 22 stores the zoom position and the lens shift position at the time of determination of the amount of rotation and the amount of translation used for conversion of the coordinate system as the reference zoom position and the reference lens shift position, respectively.

Three-dimensional position data projector coordinate converting unit 23 converts the three-dimensional position data of three-dimensional object 102 obtained by three-dimensional sensor 21 into three-dimensional position data of the projector coordinate system. To convert the coordinate system, the amount of rotation, the amount of translation, the reference zoom position and the reference lens shift position stored in calibration data storage unit 22 are used. The current zoom position and lens shift position of projection lens unit 20 and the design data of the projection function stored in projector projection design data storage unit 15 are also used for the conversion of the coordinate system.

Three-dimensional position data world coordinate converting unit 24 converts the three-dimensional position data of three-dimensional object 102 in the projector coordinate system into three-dimensional position data in the world coordinate system using the amount of inclination of the projector with respect to the horizontal plane detected by attitude sensor 16. Three-dimensional position data world coordinate converting unit 24 moves the world coordinate system in parallel in the vertical direction so that the minimum value of the coordinates of the three-dimensional position data in the vertical direction becomes "0".

Projector data generating unit 8 includes initial projector data generating unit 25 and projector data world coordinate converting unit 26.

Initial projector data generating unit 25 sets the origin of the projector coordinate system, that is, the coordinates (0, 0, 0) which are the projection center points of the image as the projector position coordinates. In addition, initial projector data generating unit 25 sets the optical axis direction of the projection lens equal to the projection direction of the image as the lens optical axis direction vector, and generates projector data including the projector position coordinates and the lens optical axis direction vector.

Projector data world coordinate converting unit 26 converts the projector position coordinates and the lens optical axis direction vector from the projector coordinate system to the world coordinate system using the amount of inclination of the projector with respect to the horizontal plane. Projector data world coordinate converter 26 also translates the world coordinate system of the projector data in the vertical direction by the amount of shift in the vertical direction translated by three-dimensional position data world coordinate converter 24.

Plane detecting unit 9 integrates the three-dimensional position data generated by three-dimensional position detecting unit 7 of projectors PJ1-PJ3, detects each plane of three-dimensional object 102, which is a projection target of an image, from the integrated three-dimensional position data, and outputs plane data indicating the detected plane. These processes in plane detecting unit 9 are executed by the master projector. The plane data generated by plane detecting unit 9 is transmitted to each slave projector via the communication means.

Plane detecting unit 9 includes three-dimensional registration unit 27 and three-dimensional position data segmentation unit 28.

Three-dimensional registration unit 27 performs alignment of three-dimensional object 102 indicated by the three-dimensional position data generated by three-dimensional position detecting unit 7 of projectors PJ1-PJ3. Three-dimensional registration unit 27 integrates the three-dimensional position data after alignment in the world coordinate system of the master projector. Furthermore, three-dimensional registration unit 27 generates an amount of coordinate transformation for transforming the world coordinate system of each slave projector into the world coordinate system of the master projector.

Three-dimensional position data segmentation unit 28 detects a plurality of planes of three-dimensional object 102 based on the integrated three-dimensional position data using segmentation parameters stored in advance in blending control unit 3. In general, it is thought that three-dimensional object 102 onto which an image is projected has a plane surface and various curved surfaces. The segmentation parameter is a parameter used to detect a plane surface or a curved surface of three-dimensional object 102 as a "plane" to be projected.

Plane data switching unit 10 selects the plane data of three-dimensional object 102 detected by the plane detecting unit 9 in the master projector, and selects the plane data of three-dimensional object 102 detected by plane detecting unit 9 of the master projector in the slave projector.

Blur amount estimating unit 11 identifies the position of the pixel in the projected image on each plane of three-dimensional object 102 from the plane data selected by plane data switching unit 10, estimates the amount of blur caused by the focus deviation for each pixel, and converts the amount of blur into the amount of blur of the resolution in calculation.

When a plurality of projectors project images onto an arbitrary plane of three-dimensional object 102, usually, the resolutions of the plurality of projected images on the plane are not the same, and the positions of the pixels of the plurality of projected images on the plane do not coincide with each other. Thus, each plane of three-dimensional object 102 needs to be processed with the same resolution of projected images projected from a plurality of projectors. Therefore, in the present exemplary embodiment, the highest resolution in the resolutions of the projected images of the respective projectors on the plane of three-dimensional object 102 is set as the calculational resolution for each plane of three-dimensional object 102, and the amount of blur in images at the calculational resolution is obtained. The calculational resolution referred to herein corresponds to the "plane-by-plane maximum resolution" to be described later.

As the amount of blur of the resolution in calculation, for example, the amount of blur obtained for each pixel position in the projected image may be converted into the amount of blur of the resolution in calculation based on the ratio between the resolution of the projected images of each projector and the resolution in calculation.

Blur amount estimating unit 11 includes projector data coordinate converting unit 29, projector data switching unit 30, pixel information calculating unit 31, blur amount storage unit 32 and pixel basis blur amount calculating unit 33.

Projector data coordinate converting unit 29 converts the projector data into the world coordinate system of the master projector by using the amount of coordinate conversion for converting the world coordinate system of the slave projector into the world coordinate system of the master projector.

Projector data switching unit 30 causes projector data coordinate converting unit 29 to execute processing in the slave projector, and does not cause projector data coordinate converting unit 29 to execute processing in the master projector.

Pixel information calculating unit 31 detects the position of each pixel in the projected image on each plane of three-dimensional object 102 detected by the master projector and the position of each pixel in the projected image from the projector corresponding to the pixel. Pixel information calculating unit 31 also detects the projection distance of each pixel position in the projected image on each plane of three-dimensional object 102. Furthermore, pixel information calculating unit 31 detects the position of each pixel in the projectable area corresponding to each pixel in the projected image on each plane of three-dimensional object 102 detected by the master projector. In addition, pixel information calculating unit 31 detects the amount of inclination of each plane of three-dimensional object 102 with respect to the projection plane at the position of each pixel of the projection image. Pixel information calculating unit 31 obtains the density of the pixels in the projected image on each plane of three-dimensional object 102, and detects the resolution of the portion having the highest density as the maximum resolution for each plane. The information on the pixels in the projected image on each plane of three-dimensional object 102 detected by pixel information calculating unit 31 is hereinafter referred to as "plane-by-plane pixel information".

Blur amount storage unit 32 stores an area represented by the number of pixels indicating the amount of blur caused by the focus deviation for each zoom position according to the focus position and the projection distance. Blur amount storage unit 32 also stores the correction coefficient of the amount of blur for each zoom position corresponding to the position of each pixel in the projected image in the projectable area corresponding to the focus position and the projection distance. Furthermore, blur amount storage unit 32 stores the conversion coefficient of the amount of blur for each zoom position corresponding to the amount of inclination with respect to the projection plane corresponding to the focus position and the projection distance. The amounts of blur in images, the correction coefficients of the amount of blur in images and the conversion coefficients of the amount of blur in images for each zoom position corresponding to the focus position and the projection distance are measured for each projector in advance and stored as actual measurement values.

Pixel basis blur amount calculating unit 33 calculates a plane-by-plane pixel basis blur amount which is an amount of blur for each pixel position in the projected image on each plane of three-dimensional object 102. The plane-by-plane pixel basis blur amount may be calculated for each pixel position in the projected image by using the amounts of blur in images stored in blur amount storage unit 32 and the correction coefficients and the conversion coefficients of the amount of blur for each zoom position based on the plane pixel information detected by pixel information calculating unit 31.

Blending unit 12 includes calculation basis blur amount converting unit 34, blur minimizing region division unit 35 and calculation basis blending coefficient calculating unit 36.

Calculation basis blur amount converting unit 34 converts the plane-by-plane pixel basis blur amount on each plane of three-dimensional object 102 calculated by pixel basis blur amount calculating unit 33 into the amount of blur in an image of the resolution in calculation on each plane of three-dimensional object 102 (hereinafter, referred to as "plane-by-plane calculation basis blur amount").

Blur minimizing region division unit 35 determines the area of the image projected from each projector for each plane so that the plane-by-plane calculation basis blur amount in each plane of three-dimensional object 102 becomes minimum by using the plane-by-plane calculation basis blur amount obtained by blur amount estimating unit 11.

Calculation basis blending coefficient calculating unit 36 calculates a blending coefficient for adjusting the luminance of each pixel by using the calculational resolution in the projected image on each plane of three-dimensional object 102 based on the processing result of blur minimizing region division unit 35.

In the master projector, blending coefficient switching unit 13 selects a blending coefficient for each pixel in the projected image on each plane of three-dimensional object 102 calculated by the master projector. In addition, in the slave projector, blending coefficient switching unit 13 selects the blending coefficient for each pixel in the projected image on each plane of three-dimensional object 102 calculated by the master projector.

Blending coefficient generating unit 14 includes pixel basis blending coefficient conversion unit 37 and pixel basis blending coefficient integration unit 38.

Pixel basis blending coefficient conversion unit 37 converts the blending coefficient for each pixel corresponding to the calculational resolution calculated by calculation basis blending coefficient calculating unit 36 into the blending coefficient for each pixel in the projected image on each plane of three-dimensional object 102.

Pixel basis blending coefficient integration unit 38 integrates the blending coefficients for each pixel in the projected image on each plane of three-dimensional object 102 transformed by pixel basis blending coefficient conversion unit 37 to generate a blending coefficient for the entire projected image.

Projector projection design data storage unit 15 stores design data related to the projection function of the projector.

Attitude sensor 16 detects the inclination of the projector main body with respect to the horizontal plane, and outputs the detected inclination as the amount of inclination.

Another projector detecting unit 17 detects another projector connected to the own device via the communication means.

Each component except for projection unit 6 shown in FIG. 3 can be realized by, for example, an information processing apparatus (computer) including a three-dimensional position sensor, an attitude sensor, and a communication unit. The information processing device includes a CPU (Central Processing Unit) for executing processing according to a program, a storage device for storing the program and data, and various logical circuits.

Figure 4:
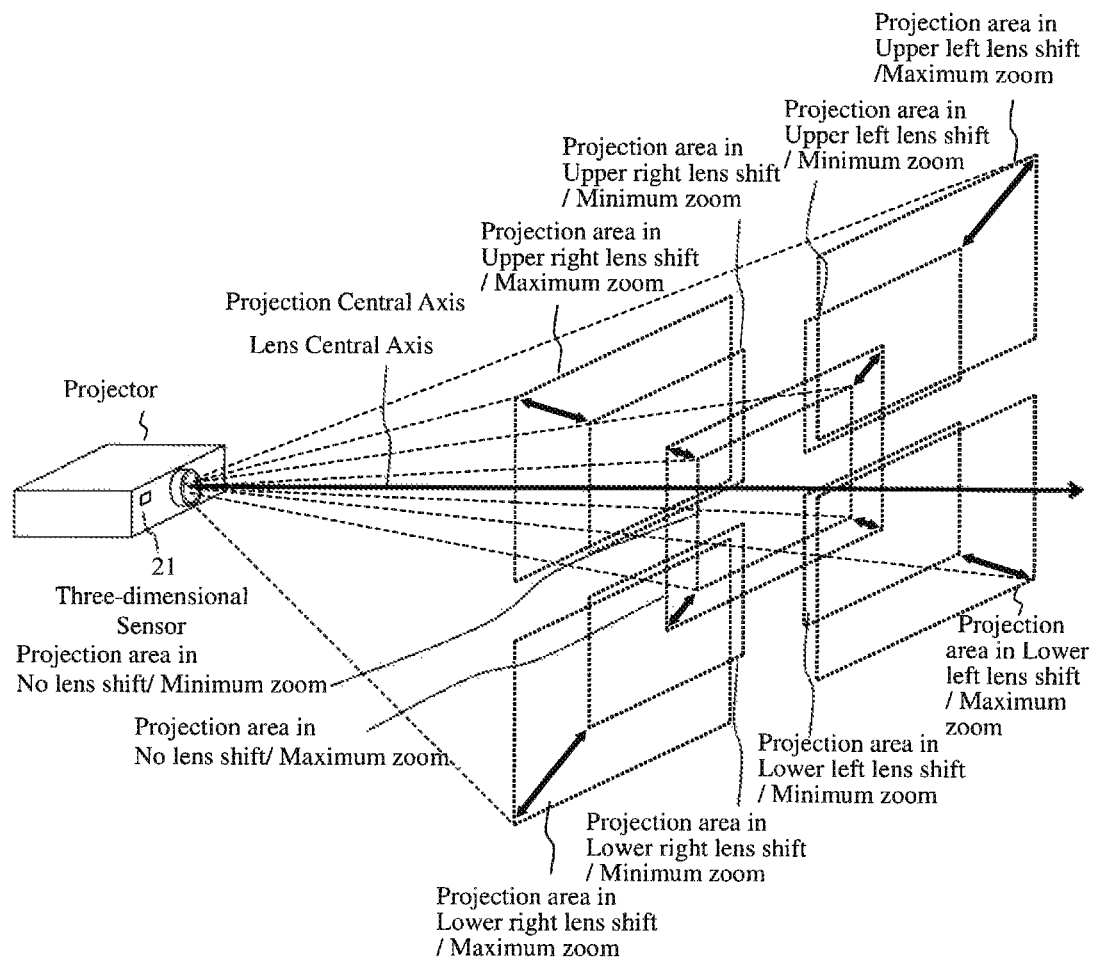
FIG. 4 is a schematic diagram showing an example of a relationship between a projector on which a three-dimensional sensor is mounted and a projection area thereof.

FIG. 4 is a schematic diagram showing an example of a relationship between a projector on which a three-dimensional sensor is mounted and a projection area thereof.

Three-dimensional sensor 21 is a three-dimensional position sensor for three-dimensionally measuring a distance from three-dimensional object 102 to be a projection target of an image, and detects a position of three-dimensional object 102 in a projection area of the projector shown in FIG. 4. Three-dimensional sensor 21 can three-dimensionally measure the position of three-dimensional object 102 within the projectable area even when the projector moves the projection area in the up-down-left-right direction by the lens shift function or when the projected image is enlarged by the zoom function.

Next, the blending operation of the projector of the present invention will be described by taking the multi-projection system shown in FIG. 1 as an example.

[1] First, in an arbitrary projector, when a user inputs an instruction to start a blending operation using user I/F unit 4, the projector becomes a master projector. The master projector detects another projector communicably connected by using another projector detecting unit 17, and recognizes the detected other projector as a slave projector. As described above, FIG. 1 shows an exemplary embodiment in which projector PJ1 is a master projector.

[2] The master projector uses three-dimensional sensor 21 to measure the position of three-dimensional object 102 to be projected with an image. The slave projector uses three-dimensional sensor 21 to measure the position of three-dimensional object 102, which is a projection target of an image, in accordance with an instruction from the master projector. The master projector and the slave projector respectively generate projector data including the position coordinates of the projector itself and the lens optical axis direction vector by using projector data generating unit 8.

[3] The master projector acquires the three-dimensional position data measured by each slave projector. The master projector uses plane detecting unit 9 to align three-dimensional object 102 indicated by the three-dimensional position data measured by the master projector and the three-dimensional position data measured by each slave projector in the world coordinate system of the master projector. Then, the master projector combines the three-dimensional position data after the alignment and integrates the combined three-dimensional position data into one three-dimensional position data by using plane detecting unit 9.

In addition, the master projector detects each plane of three-dimensional object 102 on which an image is projected from the integrated three-dimensional position data using plane detecting unit 9, and generates plane data which is three-dimensional data indicating the detected plane. Further, the master projector transmits to each slave projector the amount of coordinate transformation for transforming the world coordinate system of the slave projector into the world coordinate system of the master projector, and plane data indicating each plane of three-dimensional object 102.

[4] The master projector performs the following processing using blur amount estimating unit 11. The slave projector executes the following processing by using blur amount estimating unit 11 in accordance with an instruction from the master projector. However, plane data switching unit 10 selects the plane data of plane detecting unit 9 of the projector itself in the master projector, and selects plane data transmitted from the master projector in the slave projector.

The slave projector converts the projector data into the world coordinate system of the master projector based on the amount of coordinate conversion transmitted from the master projector. The master projector does not perform coordinate transformation of the projector data using the amount of coordinate transformation.

The master projector and the slave projector determine the pixels in the projected image on each plane of three-dimensional object 102 detected in the above [3] and their positions (pixel positions) from the three-dimensional data included in the plane data selected by plane data switching unit 10. Further, the master projector and the slave projector estimate the pixel basis blur amount, which is an amount of blur for each pixel position caused by the focus deviation, in each plane, and set the amount as a plane-by-plane pixel basis blur amount. Further, the master projector and the slave projector generate the plane-by-plane pixel basis blur amount date which comprises the plane-by-plane pixel basis blur amount, and the pixel position and the plane-by-plane maximum resolution that are included in the plane-by-plane pixel information.

[5] The master projector acquires the plane-by-plane pixel basis blur amount data generated by each slave projector, and calculates the plane-by-plane calculation basis resolution, which is the calculational resolution in each plane of three-dimensional object 102, using blending unit 12.

Furthermore, the master projector converts the amount of blur in each pixel of each plane included in the plane-by-plane pixel basis blur amount data (plane-by-plane pixel basis blur amount) into the amount of blur in the plane-by-plane calculation basis resolution (plane-by-plane calculation basis blur amount).

The master projector uses the plane-by-plane calculation basis resolution and the minimum number of blending pixels to determine plane-by-plane calculation basis minimum blending size for each projector corresponding to the calculational resolution on each plane of three-dimensional object 102. The minimum number of blending pixels is a minimum number of pixels of an image that can be projected as a blending region which is set for each projector in advance. The plane-by-plane calculation basis minimum blending size is the minimum size of the blending area for each projector which is represented by the calculational resolution. The master projector generates the plane-by-plane calculation basis blur amount data for each projector including the plane-by-plane calculation basis blur amount and plane-by-plane calculation basis minimum blending size.

In addition, the master projector determines an area for projecting an image for each projector in which the amount of blur becomes the minimum on each plane of three-dimensional object 102, using the plane-by-plane calculation basis blur amount and plane-by-plane calculation basis minimum blending size of each projector.

The master projector calculates a calculation basis blending coefficient for adjusting the luminance for each pixel of the calculational resolution on each plane of three-dimensional object 102, and transmits the calculation basis blending coefficient to each slave projector.

[6] The master projector converts the calculation basis blending coefficient calculated by blending unit 12 of the projector itself into a pixel basis blending coefficient by using blending coefficient generating unit 14. The pixel basis blending coefficient is a blending coefficient for each pixel in the projected image on each plane of three-dimensional object 102.

The slave projector converts the calculation basis blending coefficient transmitted from the master projector into the pixel basis blending coefficient by using blending coefficient generating unit 14.

The master projector and the slave projector use blending coefficient generator 14 to integrate each pixel basis blending coefficient, generate a blending coefficient of the entire projected image, and output the blending coefficient to projection unit 6. Projection unit 6 adjusts the luminance of the projected image indicated by the image signal by changing the signal level of the image signal in accordance with the blending coefficient of the projected image.

Through the above process, the image is projected from projectors PJ1-PJ3 onto each plane of three-dimensional object 102, which is the projection target of the image, so that the amount of blur in the image on each plane is minimized.

Next, in the operations of the projector of the present exemplary embodiment described above, the operations indicated by [2]-[6] will be described in more detail.

[2] Operation of Three-Dimensional Position Detecting Unit 7 of Each Projector

[2-1] The projectors PJ1-PJ3 use three-dimensional sensor 21 provided in three-dimensional position detecting unit 7 to three-dimensionally measure the position of three-dimensional object 102 which is a projection target of an image. The three-dimensional position data indicating the measured position of three-dimensional object 102 is represented by a point data group in the coordinate system of three-dimensional sensor 21.

As a three-dimensional position measuring method for measuring the position of three-dimensional object 102 (distance from three-dimensional object 102) in three dimensions, for example, there are a TOF (Time of Flight) method, a passive triangulation method, and an active triangulation method.

The TOF method is a method for measuring a distance to an object based on a time from irradiation of light onto the object until light is reflected back by the object.

The passive triangulation system is a so-called stereo camera system in which an object is simultaneously photographed by two cameras arranged at two points, and the distance to the object is measured from the difference in the position of the object obtained from the photographed image of each camera by using the principle of triangulation. The active triangulation system is a system in which one camera is replaced with a light-emitting device in a stereo camera system, light is irradiated from the light-emitting device to an object, and the distance to a light point irradiated on the object is measured using the principle of triangulation.

The measurement method of the three-dimensional position is not limited to the TOF method, the passive triangulation method and the active triangulation method, and any well-known method may be used.

[2-2] Three-dimensional position detecting unit 7 converts the three-dimensional position data of three-dimensional object 102 detected by three-dimensional sensor 21 into a projector coordinate system having a projection center point as an origin. For the conversion of the coordinate system, the amount of rotation and the amount of translation for converting the coordinate system of three-dimensional sensor 21 into the coordinate system of the projector, and the reference zoom position and the reference lens shift position at the time of determination of the amount of rotation and the amount of translation are used. In addition, for the conversion of the coordinate system, the zoom position and the lens shift position of projection lens unit 20 and the design data of the projection function of the projector stored in projector projection design data storage unit 15 are used together with these values. The conversion processing of the coordinate system will be described with reference to FIG. 5.

Figure 5:
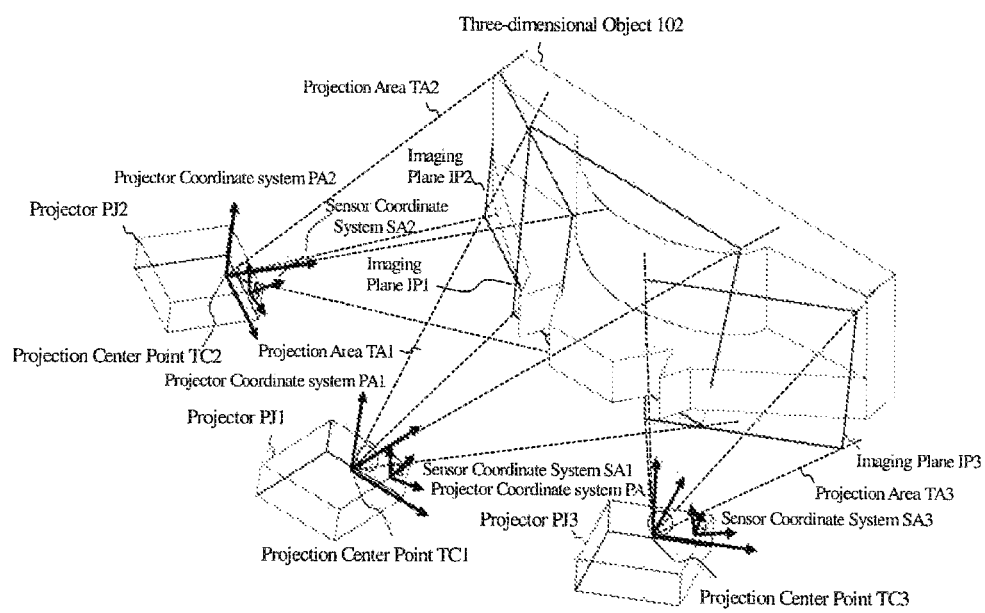
FIG. 5 is a schematic diagram showing an example of the relationship between the sensor coordinate system and the projector coordinate system.

Since three-dimensional sensor 21 is usually installed at a position different from the projection center point of the projector, its origin does not coincide with the projection center point of the projector, and its measurement direction does not coincide with the optical axis direction of the projection lens of the projector. That is, as shown in FIG. 5, the three-dimensional position data of three-dimensional object 102 in the sensor coordinate systems SA1-SA3 measured by three-dimensional sensors 21 differ from the three-dimensional position data of three-dimensional object 102 in projector coordinate systems PA1-PA3.

In the present invention, since the positional relationship between the projection area of the projector and the three-dimensional position data is important, it is necessary to convert the three-dimensional position data of three-dimensional object 102 measured by three-dimensional sensor 21 into three-dimensional position data in the projector coordinate system. The amount of transformation for the coordinate system can be defined by using the amount of rotation with respect to the three coordinate axes orthogonal to each other and the amount of translation indicating the amount of movement with respect to the three coordinate axes.

In the projector, the projection center point serving as the origin of the projector coordinate system is not fixed but moved by using a zoom function or a lens shift function. Therefore, together with the amount of rotation and the amount of translation, the zoom position and the lens shift position at the time of determination of the amount of rotation and the amount of translation are stored in calibration data storage unit 22 as the reference zoom position and the reference lens shift position, respectively.

After obtaining the coordinates of the reference projection center point, three-dimensional position data projector coordinate converting unit 23 obtains the coordinates of the current projection center point from the current zoom position and the lens shift position. The coordinates of the reference projection center point are obtained based on the design data of the projection function stored in projector projection design data storage unit 15, the reference zoom position and the reference lens shift position.

Three-dimensional position data projector coordinate converting unit 23 converts the three-dimensional position data measured by three-dimensional sensor 21 into data of the projector coordinate system using the amount of rotation and the amount of translation stored in calibration data storage unit 22. Thereafter, the projector coordinate system is moved from the coordinates of the reference projection center point to the coordinates of the current projection center point by the amount of translation in accordance with the current zoom position and the lens shift position. As a result, the three-dimensional position data output from three-dimensional sensor 21 can be converted into a projector coordinate system having the current projection center point as the origin. It is assumed that the amount of translation for converting the coordinates of the reference projection center point into the coordinates of the current projection center point is measured in advance and stored in three-dimensional position data projector coordinate converting unit 23.

[2-3] Three-dimensional position data world coordinate converting unit 24 converts the three-dimensional position data of three-dimensional object 102 in the projector coordinate system into three-dimensional position data in the world coordinate system based on the amount of inclination of the projector detected by attitude sensor 16. Three-dimensional position data world coordinate converting unit 24 translates the world coordinate system in the vertical direction so that the minimum value of the coordinates of the three-dimensional position data in the vertical direction becomes "0". As attitude sensor 16, for example, a three-axis acceleration sensor capable of detecting the rotation angle with respect to the front-rear axis and the rotation angle with respect to the left-right axis may be used.

Figure 6:
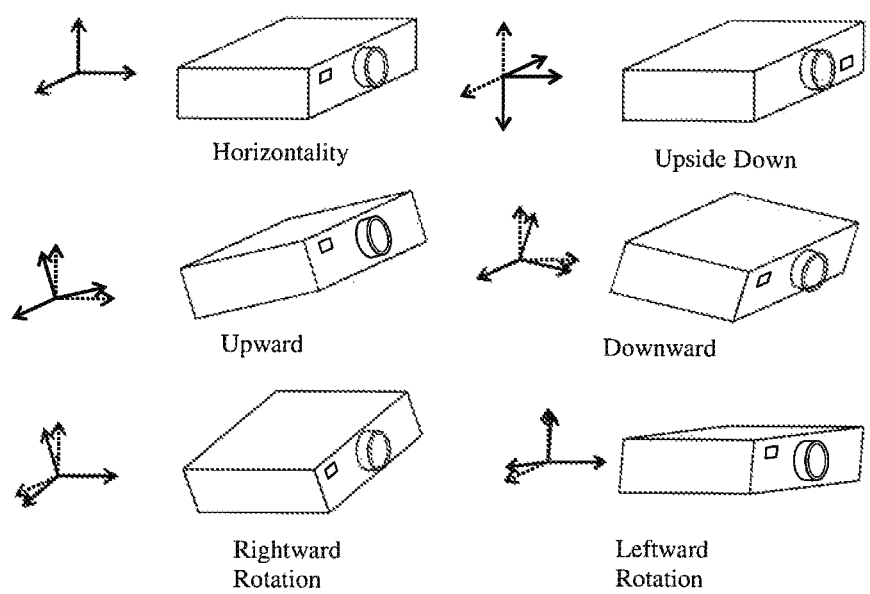
FIG. 6 is a schematic diagram showing an example of the arrangement of projectors.

As shown in FIG. 6, the projector is used by being installed so as to be inclined in the front-rear direction or the left-right direction with respect to the projection direction of an image, or so as to be installed so that the top plate is vertically upward or vertically downward. Therefore, three-dimensional position data world coordinate converting unit 24 converts the three-dimensional position data of the projector coordinate system into the world coordinate system with the horizontal plane as a reference, using the amount of inclination with respect to the horizontal direction detected by attitude sensor 16.

Figure 7A:
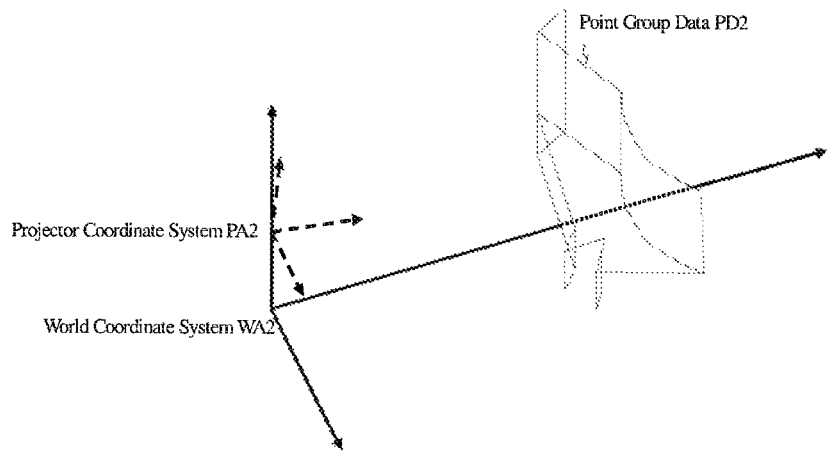
FIGS. 7A-7C are schematic diagrams showing an example of three-dimensional position data of a three-dimensional object, in the projector coordinate system, detected by the projector shown in FIG. 1.
Figure 7B:
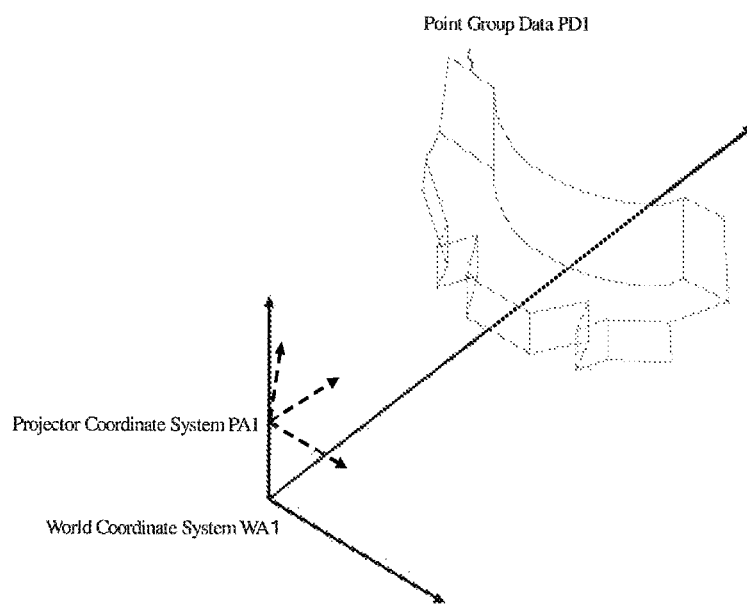
Figure 7C:
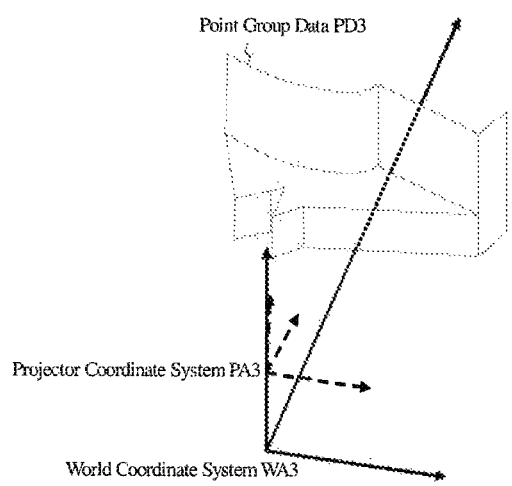

FIGS. 7A-7C show how the three-dimensional position data of three-dimensional object 102, in the projector coordinate system, detected by the projector shown in FIG. 1 is converted into three-dimensional position data in the world coordinate system. FIG. 7A shows the three-dimensional position data of three-dimensional object 102, in projector coordinate system PA2, detected by projector PJ2 and the world coordinate system WA2 of projector PJ2. FIG. 7B shows the three-dimensional position data of three-dimensional object 102, in projector coordinate system PA1, detected by projector PJ1 and world coordinate system WA1 of projector PJ1. FIG. 7C shows the three-dimensional position data of three-dimensional object 102, in projector coordinate system PA3, detected by projector PJ3 and world coordinate system WA3 of projector PJ3. The three-dimensional position data detected by projectors PJ1-PJ3 are represented by point group data PD1-PD3 indicating the positions of a large number of points in three-dimensional object 102. The coordinate transformation of the three-dimensional position data is performed in order to shorten the process time when integrating the three-dimensional position data of three-dimensional object 102 detected by projectors PJ1-PJ3.

Initial projector data generating unit 25 sets the origin of the projector coordinate system, that is, the coordinates (horizontal, vertical, projection direction)=(0, 0, 0) as the projector position coordinates indicating the position of the projector. In addition, initial projector data generating unit 25 also sets the optical axis direction of the projection lens equal to the projection direction of the image to the lens optical axis direction vector, and generates projector data including the projector position coordinates and the lens optical axis direction vector.

Projector data world coordinate converter 26 converts the projector data (the projector position coordinates and the lens optical axis direction vector) into a world coordinate system based on the horizontal plane by using the amount of inclination detected by attitude sensor 16. Furthermore, projector data world coordinate converter 26 translates the world coordinate system of the projector data in the vertical direction by the amount of shift in the vertical direction translated by three-dimensional position data world coordinate converter 24.

[3] Processing by Plane Detecting Unit 9 of the Master Projector

[3-1] In plane detecting unit 9 of the master projector, three-dimensional registration unit 27 performs alignment of three-dimensional object 102 indicated by the three-dimensional position data output from the master projector and the slave projector. Three-dimensional registration unit 27 combines the three-dimensional position data after the alignment and integrates the combined three-dimensional position data into one three-dimensional position data.

Figure 8:
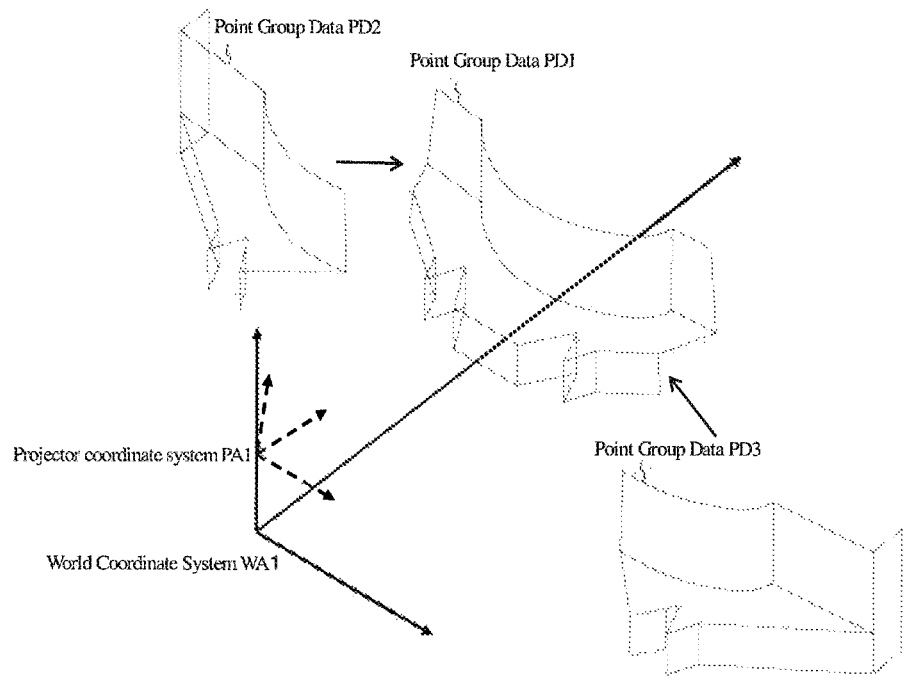
FIG. 8 is a schematic diagram showing a state of integrating three-dimensional position data of a three-dimensional object obtained from the projector shown in FIG. 1.
Figure 9:
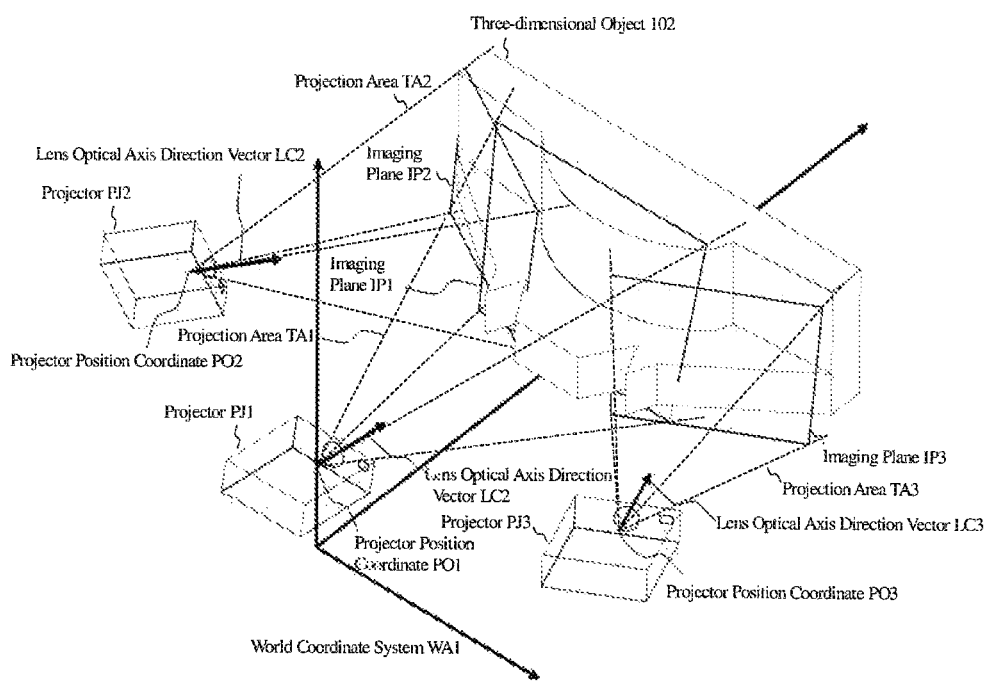
FIG. 9 is a schematic diagram showing an example of three-dimensional position data after integration of three-dimensional objects.

Three-dimensional registration unit 27 moves the three-dimensional position data outputted from the slave projector (projectors PJ2 and PJ3), for example, to world coordinate system WA1 of the master projector (projector PJ1). In addition, the three-dimensional position data outputted from each slave projector is integrated by rotating and moving the three-dimensional position data with respect to each coordinate axis of world coordinate system WA1 of the master projector so that the same part of three-dimensional object 102 indicated by each three-dimensional position data overlaps. The amount of translation indicating the rotation angle and the amount of movement with respect to the respective coordinate axes of world coordinate system WA1 is an amount of coordinate transformation for integrating the three-dimensional position data. FIG. 8 shows how the three-dimensional position data of three-dimensional object 102 obtained from projectors PJ1-PJ3 is integrated. The three-dimensional position data of three-dimensional object 102 after integration is defined by, for example, world coordinate system WA1 of projector PJ1 which is the master projector as shown in FIG. 9.

Note that three-dimensional sensors 21 included in projectors PJ1-PJ3 do not necessarily measure distances from all planes of three-dimensional object 102 due to the presence of a blind spot. The process of integrating the three-dimensional position data of three-dimensional object 102 is also executed to detect the plane of three-dimensional object 102, which is a blind spot in some projectors, using the three-dimensional position data obtained from other projectors.

[3-2] Three-dimensional position data segmentation unit 28 detects each plane of three-dimensional object 102, which is a projection target of an image, from the integrated three-dimensional position data using the segmentation parameters stored in advance in bleeding control unit 3. Hereinafter, the process of detecting each plane of three-dimensional object 102 is referred to as a "segmentation process". The segmentation parameter is, for example, a value set in advance by the manufacturer of the projector as a standard, and is a value that can be adjusted by the user using user I/F unit 4 as necessary.

Figure 10:
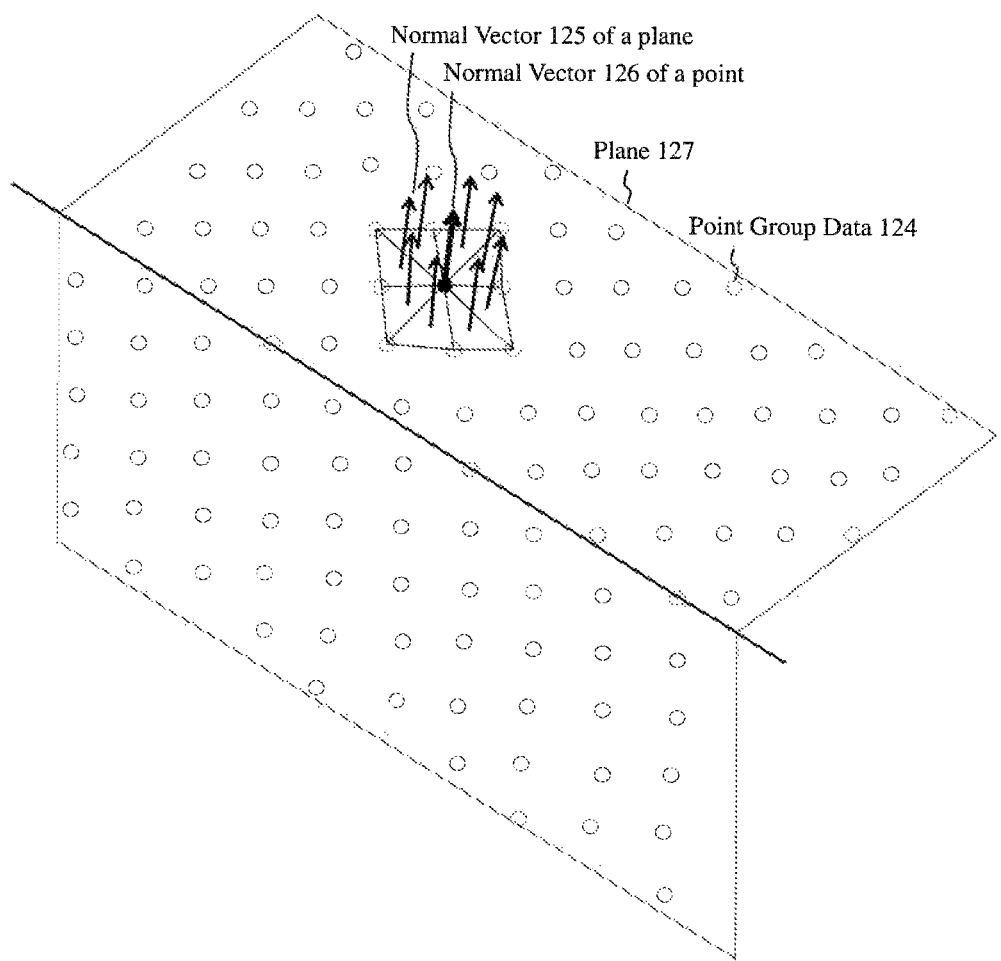
FIG. 10 is a schematic diagram showing an example of segmentation processing.

FIG. 10 is a schematic diagram showing an example of segmentation processing.

In segmentation processing, three-dimensional position data segmentation unit 28 first obtains respective normal vectors 126 at respective points of the three-dimensional position data of three-dimensional object 102 composed of point group data 124. As shown in FIG. 10, three-dimensional position data segmentation unit 28 obtains normal vector 125 of a triangular plane formed by a point of interest and a point around the point of interest, and uses the synthesized vector as normal vector 126 of the point of interest.

Next, three-dimensional position data segmentation unit 28 compares normal vectors 126 of the adjacent points, and determines that the adjacent points are on same plane 127 when the difference between them is smaller than a predetermined threshold value which is a segmentation parameter. That is, the threshold value set as the segmentation parameter determines how much curved surface is detected as one plane. Here, an example is shown in which a threshold value set to the difference between normal vectors 126 of adjacent points is used as a segmentation parameter. When the contents of the segmentation processing are different, a value corresponding to the contents of the processing may be used as the segmentation parameter. The position of each plane of three-dimensional object 102 extracted by the segmentation processing of three-dimensional position data segmentation unit 28 included in plane detecting unit 9 is output as three-dimensional data.

The master projector transmits the three-dimensional data indicating the position of each plane of three-dimensional object 102 to be projected, which is extracted by plane detecting unit 9, to each slave projector as plane data.

[4] Processing of Blur Amount Estimating Unit 11 in Each Projector

[4-1] Projector data coordinate converting unit 29 of the slave projector converts the projector position coordinates and the lens optical axis direction vector into the world coordinate system of the master projector using the amount of coordinate conversion transmitted from the master projector. The converted projector position coordinates and the lens optical axis direction vector become, for example, projector position coordinates PO1 and lens optical axis direction vector LC1 in world coordinate system WA1 of the master projector (PJ1), as shown in FIG. 9.

Projector data switching unit 30 selects the projector data subjected to the coordinate conversion in the slave projector, and selects the projector data generated in projector data generating unit 8 in the master projector. That is, the master projector does not execute the coordinate conversion process.

[4-2] Pixel information calculating unit 31 generates the following five pieces of data (a)-(e) for each pixel in the projected image on each plane of three-dimensional object 102, and uses them as the plane-by-plane pixel information.

(a) Position of a Pixel in a Projected Image on Each Plane of Three-Dimensional Object 102 and the Position of a Pixel in an Image Projected from a Projector Corresponding to the Pixel Identification is made as to which are the pixels in the projected image, and as to the position where each pixel in the plane of three-dimensional object 102 is projected, the position of each pixel in the projected image on each plane and the position of each pixel in the image projected from the projector corresponding to each pixel are determined:

Three-dimensional data of each plane in three-dimensional object 102 included in the plane data output from plane data switching unit 10;

The projector data output from projector data switching unit 30;

The zoom position and lens shift position output from projection lens unit 20; and Design data of the projection function such as the angle of view, zoom characteristic, lens shift characteristic, and the like of the projector stored in projector projection design data storage unit 15.

(b) Maximum Resolution in the Plane

From the position of each pixel in the projected image on each plane of three-dimensional object 102, the resolution of the portion having the highest pixel density on each plane is obtained as the maximum resolution for each plane. The resolution is defined, for example, by the number of pixels per unit area, for example, 1 cm².

(c) Projection Distance from Each Pixel in the Projected Image on the Plane

Based on the following data, the distance from the projector position coordinates to each pixel in the projected image on the projection plane perpendicular to the optical axis of the projection lens is obtained as the projection distance:

The three-dimensional data of each plane of three-dimensional object 102 included in the plane data output from plane data switching unit 10;

The position of the pixel in the projected image on the plane; and

The projector data output from projector data switching unit 30.

(d) Position of Each Pixel in the Projectable Area Corresponding to Each Pixel in the Projected Image on the Plane The position of each pixel in the projected image in the projectable area is obtained from the following data:

The position of each pixel in the image projected from the projector corresponding to each pixel in the projected image on each plane of three-dimensional object 102;

The zoom position and lens shift position output from projection lens unit 20; and Design data of the projection function such as the angle of view, zoom characteristic, lens shift characteristic, and the like of the projector itself stored in projector projection design data storage unit 15.

(e) Inclination of the Plane with Respect to the Projection Plane at Each Pixel Position The amount of local inclination of the plane at each pixel position in the projected image on the projection plane perpendicular to the optical axis of the projection lens is obtained from the following data:

Three-dimensional data of each plane of three-dimensional object 102 included in the plane data output from plane data switching unit 10;

The position of each pixel in the projected image on the plane; and

Projector data.

Figure 11:
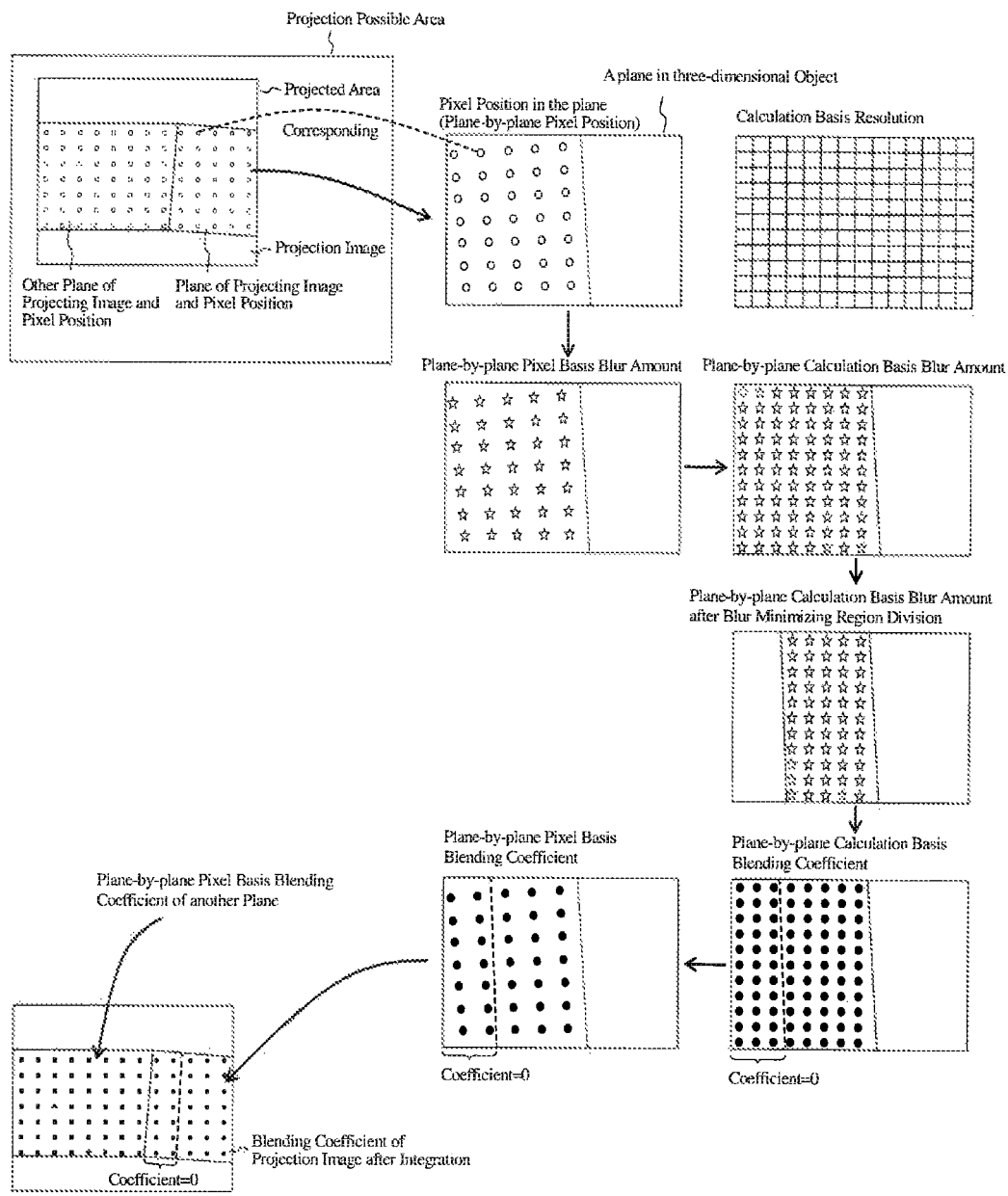
FIG. 11 is a schematic diagram showing an example of a position, an amount of blur and a blending coefficient of each pixel in a projected image on a plane of a three-dimensional object.

An example of the relationship between the plane on which the image is projected, the position of each pixel in the image, the position of each pixel in the projected image on the plane and the position of each pixel in the projected image in the projectable area is shown in FIG. 11.

[4-3] Pixel basis blur amount calculating unit 33 calculates the amount of blur for each pixel in the projected image on each plane of three-dimensional object 102 based on the plane-by-plane pixel information calculated by pixel information calculating unit 31.

Pixel basis blur amount calculating unit 33 acquires, as the amount of blur, an area indicated by the number of pixels for each zoom position stored in blur amount storage unit 32, which corresponds to the focus position and the projection distance. The projection distance is included in the plane-by-plane pixel information calculated by pixel information calculating unit 31. The focus position and the zoom position are output from projection lens unit 20.

Note that the size of the blur on the actual projection plane, that is, the blurred area changes in accordance with the distance from the imaging plane in which the projected image is focused to the actual projection plane, and the amount of blur changes in accordance with the zoom position. Therefore, pixel basis blur amount calculating unit 33 acquires the correction coefficient of the amount of blur for each zoom position stored in blur amount storage unit 32 corresponding to the position of each pixel in the projected image at the projectable area, and multiplies the obtained correction coefficient by the amount of blur for each pixel.

Figure 12:
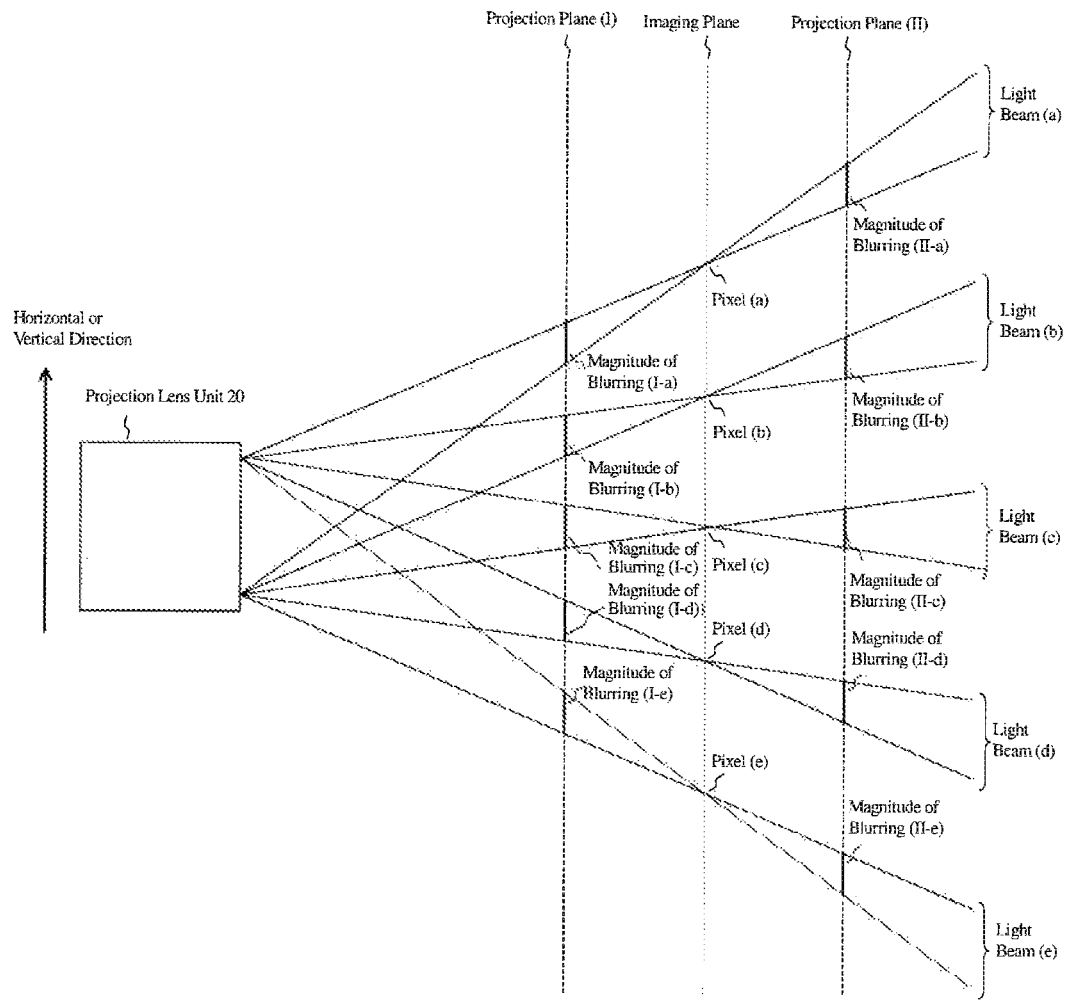
FIG. 12 is a schematic diagram showing a state of projected images on a plurality of projection planes when the projector is viewed from a side or a top.

FIG. 12 shows a state in which the size of blur changes in a plurality of projection planes.

FIG. 12 shows a state in which the size of the blur of the pixels (a)-(e) in the projected image on the imaging plane changes to (I-a)-(I-e) on the projection plane (I) at a position close to projection lens unit 20 with respect to the imaging plane. FIG. 12 also shows a state in which the size of the blur of the pixels (a)-(e) in the projected image on the imaging plane changes to (II-a)-(II-e) on the projection plane (II) at a position distant from projection lens unit 20 with respect to the imaging plane.

As shown in FIG. 12, the size of the blur ideally does not depend on the position of the pixel in the projected image on the same projection plane. However, the actual amount of blur differs depending on the position of the pixel in the projected image on the projection plane. Therefore, in the present exemplary embodiment, a correction coefficient is created in advance for each pixel position in the projected image on the projection plane based on the measured value measured in advance, and the amount of blur in the image is corrected using the correction coefficient.

Pixel basis blur amount calculating unit 33 acquires the conversion coefficient of the amount of blur for each zoom position stored in blur amount storage unit 32, which corresponds to the position of each pixel in the projected image at the projectable area and the amount of inclination with respect to the projection plane.

In addition, pixel basis blur amount calculating unit 33 multiplies the amount of blur of each pixel in the projected image on each plane corrected by the correction coefficient by the obtained conversion coefficient.

When each plane of three-dimensional object 102, which is a projection target of an image, is inclined with respect to the projection plane of the projector, the size of blur, that is, the blurred area becomes large. This is different depending on the position of the pixel in the projected image on each plane.

Figure 13:
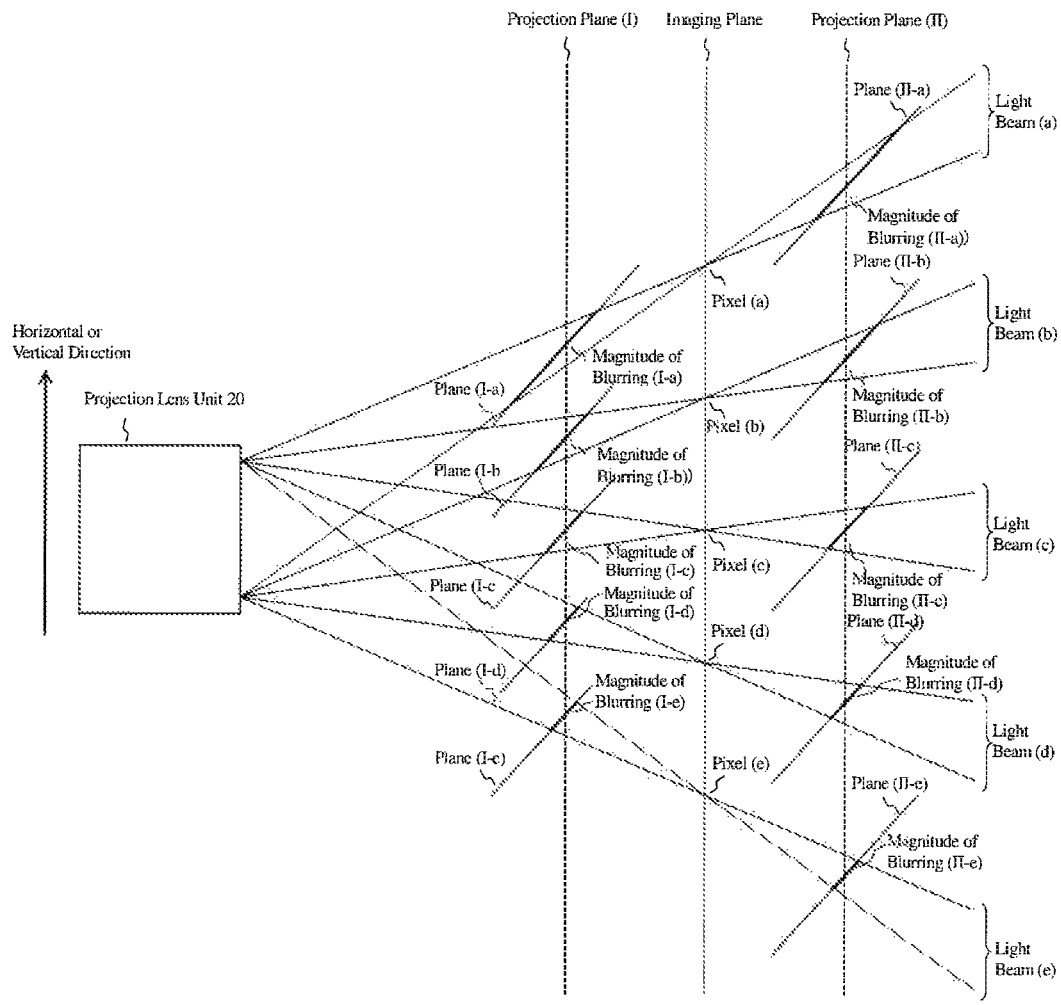
FIG. 13 is a schematic diagram showing a state in which each plane of a three-dimensional object, which is a projection target of an image, is inclined with respect to the projection plane of the projector.

FIG. 13 shows a state in which the size of blur changes due to inclination of the plane of the three-dimensional object in a plurality of projection planes.

FIG. 13 shows a state in which, on the projection plane (I) at a position close to projection lens unit 20 with respect to the imaging plane, the size of the blur of the pixels (a)-(e) in the projected image on the imaging plane changes to (I-a)-(I-e) due to the inclined planes (I-a)-(I-e) of the three-dimensional object. FIG. 13 shows a state in which, on the projection plane (II) at a position distant from projection lens unit 20 with respect to the imaging plane, the size of the blur of the pixels (a)-(e) in the projected image on the imaging plane changes to (II-a)-(II-e) due to the inclined plane (II-a)-(II-e) of the three-dimensional object.

Ideally, the conversion coefficient can be obtained from the position of each pixel in the projected image on the projection plane and the inclination angle of the plane of the three-dimensional object with respect to the projection plane. However, since it is not actually the same as the calculation, it is desirable to previously determine and store the conversion coefficient on the basis of the actually measured value or the like measured in advance.

Pixel basis blur amount calculating unit 33 sets the amount of blur for each pixel in the projected image on each plane finally obtained as the plane-by-plane pixel basis blur amount, and sets the position for each pixel in the projected image on each plane included in the plane-by-plane pixel information generated by the pixel information calculating unit 31 as the plane-by-plane pixel position. Pixel basis blur amount calculating unit 33 combines the plane-by-plane pixel basis blur amount, the plane-by-plane pixel position, and the plane-by-plane maximum resolution of each plane of three-dimensional object 102 included in the plane-by-plane pixel information to obtain plane-by-plane pixel basis blur amount data.

[5] Processing by the Blending Unit 12 of the Master Projector

[5-1] Blending unit 12 performs the following processing for each plane of three-dimensional object 102 using the plane-by-plane pixel basis blur amount, the plane-by-plane pixel position, and the plane-by-plane maximum resolution included in the plane-by-plane pixel basis blur amount obtained by pixel basis blur amount calculating unit 33 of each projector:

In the plane-by-plane maximum resolutions of the projector projected on an arbitrary plane, the resolution equal to or higher than the highest resolution is defined as the plane-by-plane calculation basis resolution on the plane; and The plane-by-plane pixel basis blur amount corresponding to each plane is converted into the plane-by-plane calculation basis blur amount using the plane-by-plane calculation basis resolution while referring to the plane-by-plane pixel position.

As a result, an amount of blur in images of the same resolution in a plurality of projectors corresponding to an arbitrary plane of three-dimensional object 102 is obtained. This is performed because the resolution in the projected images of the plurality of projectors on the same plane is not the same, and the positions of the pixels in the projected images on the same plane do not coincide with each other, and therefore processing needs to be performed at the same resolution thereafter.

Blending unit 12 obtains the plane-by-plane calculation basis minimum blending size corresponding to the calculational resolution of each plane from the plane-by-plane calculation basis resolution and the minimum number of blending pixels stored in blending control unit 3. Blending unit 12 outputs the plane-by-plane calculation basis blur amount and the plane-by-plane calculation basis minimum blending size as a plane-by-plane calculation basis blur amount data.

[5-2] Calculation basis blur amount converting unit 34 sets the resolution equal to or higher than the highest resolution in the plane-by-plane maximum resolutions of the projector projected on an arbitrary plane as the plane-by-plane calculation basis resolution on that plane. Calculation basis blur amount converting unit 34 converts the plane-by-plane pixel basis blur amount obtained by pixel basis blur amount calculating unit 33 into the plane-by-plane calculation basis resolution included in the plane data while referring to the plane-by-plane pixel position, and sets it as the plane-by-plane calculation basis blur amount. As a result, an amount of blur of the same resolution is obtained in a plurality of projectors that project images on the same plane of three-dimensional object 102.

Calculation basis blur amount converting unit 34 obtains the plane-by-plane calculation basis minimum blending size corresponding to the calculational resolution of each plane from the plane-by-plane calculation basis resolution and the minimum number of blending pixels stored in blending control unit 3. Furthermore, calculation basis blur amount converting unit 34 outputs the calculated plane-by-plane calculation basis blur amount and plane-by-plane calculation basis minimum blending size as a plane-by-plane calculation basis blur amount data.

An example of the relationship in the plane-by-plane pixel position, the plane-by-plane pixel basis blur amount and the plane-by-plane calculation basis blur amount on each plane of three-dimensional object 102 is shown in FIG. 11.

[5-3] Blur minimizing region division unit 35 compares the plane-by-plane calculation basis blur amount for each projector on an arbitrary plane of three-dimensional object 102, and performs region division with the region of the image for each projector having the smallest value as the blur minimizing region. Hereinafter, the region division is referred to as "blur minimizing region division". The blur minimizing region division is performed for each plane of three-dimensional object 102 detected by plane detecting unit 9.

Blur minimizing region division unit 35 determines a blending region, which is a region in which the projected images of the plurality of projectors are superimposed, at the boundary of the divided regions of the plurality of projector images. In addition, blur minimizing region division unit 35 sets information indicating a region of an image for each projector on each plane as plane region dividing information, sets a blending region on each plane as plane blending region and sets the blending regions together as plane blending information.

Here, the processing of blur minimizing region division unit 35 will be described with reference to FIGS. 14 to 16A-16C.

Figure 14:
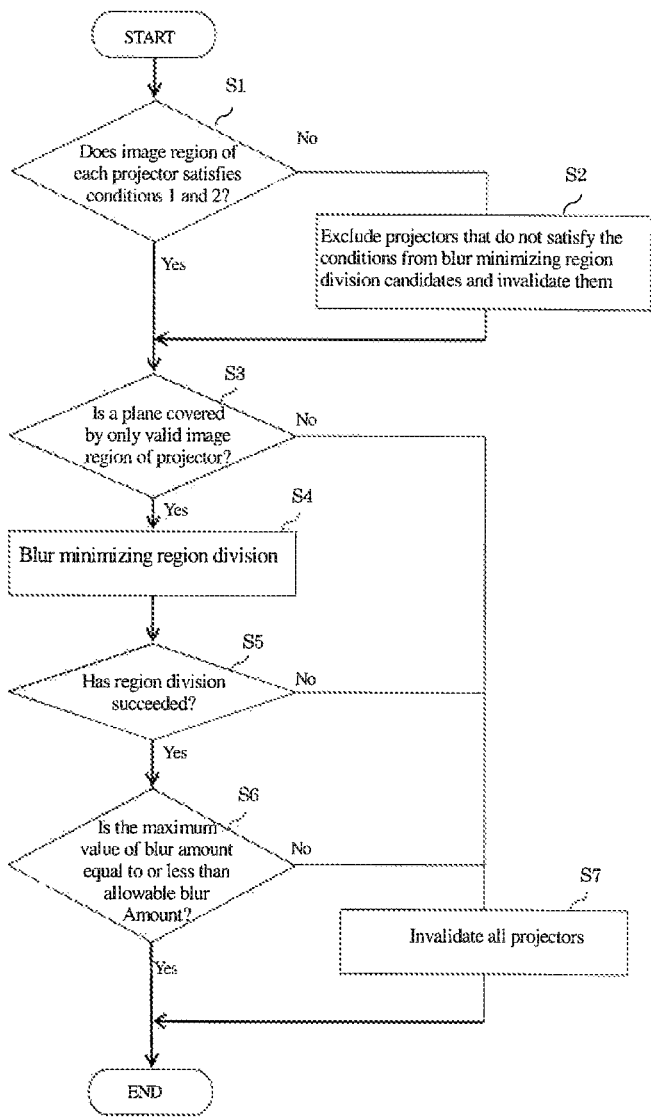
FIG. 14 is a flowchart showing an example of processing performed by the blur minimizing region division unit.

FIG. 14 is a flowchart showing an example of processing performed by the blur minimizing region division unit.

FIGS. 15 and 16A-16C are schematic diagrams showing an example of blur minimizing region division in the multi-projection system shown in FIG. 1.

In the blur minimization region division, the following parameters are used as blending parameters:

Minimum Size Ratio (horizontal/vertical) which indicates the minimum size in the projected image allowed relative to the size of the plane;

The allowable blur amount, which is the upper limit value of the amount of blur in images;

The specified number of projected images indicating the number of projected images to be projected on top of each other; and The plane-by-plane calculation basis minimum blending size for all projectors.

The minimum size ratio is set in advance by the manufacturer of the projector as a standard value and can be changed by the user. The allowable blur amount and the prescribed number of projected images are preset by the manufacturer of the projector as standard values, and can be changed by the user as necessary. The minimum size ratio, the allowable blur amount, and the prescribed number of projected images are stored in bleeding control unit 3.

Blur minimizing region division unit 35 performs blur minimizing region division for each detected plane of three-dimensional object 102.

As shown in FIG. 14, blur minimizing region division unit 35 determines whether or not the region of the image projected from each projector (hereinafter referred to as "image region") satisfies the following conditions 1 and 2 in advance on the plane to be projected (step S1):

Condition 1:

The size of the image region (horizontal/vertical direction)≥the size calculated by the minimum size ratio (horizontal/vertical direction).

Condition 2:

The size of the image region (horizontal/vertical direction)≥twice the plane-by-plane calculation basis minimum blending size (horizontal/vertical direction).

When all the projectors satisfy the above-mentioned conditions 1 and 2, blur minimizing region division unit 35 shifts to the process of step S3.

When there are projectors that do not satisfy the above-mentioned conditions 1 and 2, blur minimizing region division unit 35 excludes those projectors from the projection candidates of the image on the plane to be projected and invalidates them at step S2. Thereafter, blur minimizing region division unit 35 shifts to the process of step S3. As a result, the projector is excluded, in which the size of the image projected on the plane of three-dimensional object 102 is smaller than the predetermined size with respect to the size of the plane to be projected. In addition, projectors that cannot secure a blending region in which the size of the image projected on the plane is a predetermined size are excluded from the projectors that project the image on the plane. Hereinafter, the projection candidates of the image with respect to the plane to be projected are referred to as "blur minimizing region division candidates".

Figure 15:
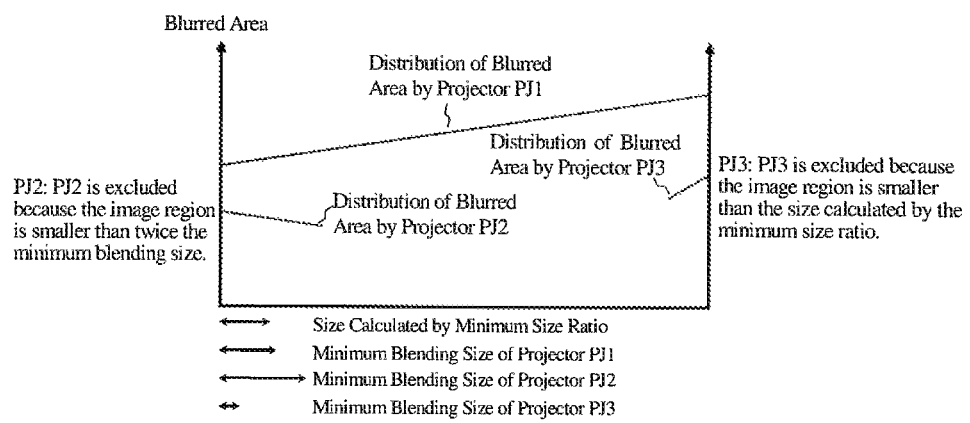
FIG. 15 is a schematic diagram showing an example of blur minimizing region division in the multi-projection system shown in FIG. 1.

For example, in the example shown in FIG. 15, projector PJ3 is excluded from the blur minimizing region division candidates because the image region on the projection target plane (hereinafter referred to as the "projection target plane") is smaller than the size calculated by the minimum size ratio. Further, projector PJ2 is excluded from blur minimizing region division candidates because the image region on the projection target plane is smaller than twice the plane-by-plane calculation basis minimum blending size.

Next, at step S3, blur minimizing region division unit 35 determines whether or not the entire projection target plane can be covered only by the image region of the effective projector remaining as the blur minimizing region division candidate. When the entire projection target plane cannot be covered, blur minimizing region division unit 35 proceeds to step S7 and invalidates all the projectors. In this case, an image is not projected onto the projection target plane processed by blur minimizing region division unit 35 in three-dimensional object 102.

At step S3, when the entire projection target plane can be covered with only the effective image region of the projector, blur minimizing region division unit 35 performs blur minimizing region division at step S4.

In the blur minimizing region division, all or a part of the image region of the effective projector is used to determine a combination of image regions of the effective projector in which the amount of blur in the image is minimized and the entire projection target plane can be covered. At this time, blur minimizing region division unit 35 determines a combination of effective projectors under the condition that the size of each image region is not smaller than the size calculated by the minimum size ratio.

In addition, blur minimizing region division unit 35 provides a region for projecting an image by superimposing the image on the boundary of the image regions of the plurality of projectors, that is, a blending region. The blending region has the widest size in the plane-by-plane calculation basis minimum blending sizes of the plurality of projectors, and blur minimizing region division unit 35 performs blur minimizing region division so that a blending region of this size can be secured.

Figure 16A:
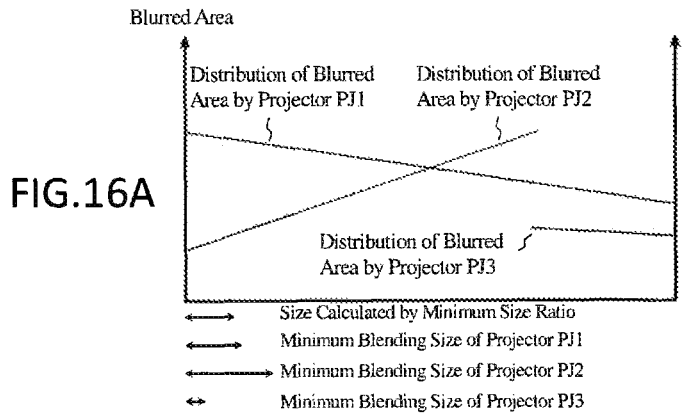
FIGS. 16A-16C are schematic diagrams showing another example of blur minimizing region division in the multi-projection system shown in FIG. 1.
Figure 16B:
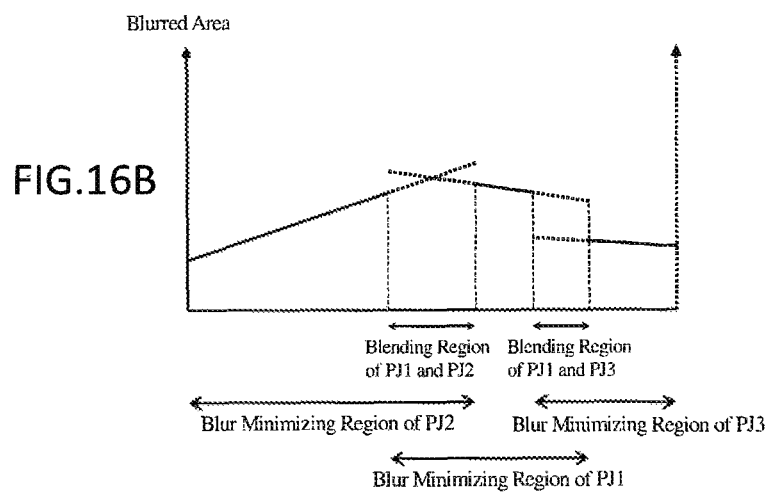
Figure 16C:
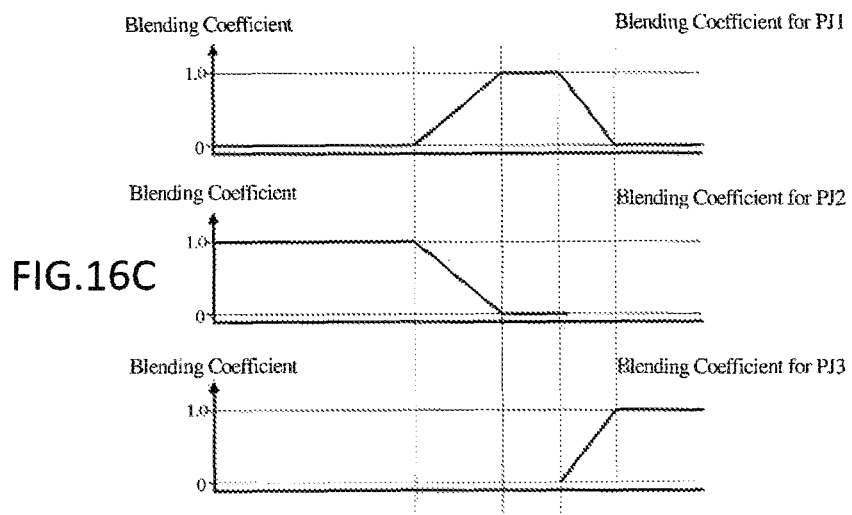

FIGS. 16A-16C shows an example of blur minimizing region segmentation and blending regions. FIG. 16A shows distributions of blurred areas of projected images of projectors PJ1-PJ3 on the projection target plane. FIG. 16B shows an exemplary image region of projectors PJ1-PJ3 after performing blur minimizing region division based on the distributions of blurred areas shown in FIG. 16A. FIG. 16C shows examples of blending coefficients to be applied to projectors PJ1-PJ3 on the projection target plane.

As can be seen from FIG. 16B, when the left half of the projection target plane is projected using projector PJ2, the right end region is projected using projector PJ3, and the remaining region is projected using projector PJ1, the blur level is minimized The blending regions are provided at the boundary between projector PJ1 and PJ2, and at the boundary between projector PJ1 and PJ3, respectively.

When there is no combination of the image regions of the projector covering the entire projection target plane under the above conditions, blur minimizing region division unit 35 determines that the blur minimizing region division has failed. Blur minimizing region division unit 35 determines the combination of the above-mentioned image regions based on the prescribed number of projected images indicating the number of projected images to be projected in a superimposed manner.

For example, in the example shown in FIG. 1, since the number of projected images projected from three projectors PJ1-PJ3 onto one plane is "1", the prescribed number of projected images is "1". On the other hand, as shown in FIG. 17, in order to increase the brightness in the projected image, there is an example in which two projectors are respectively arranged at the positions of the projectors shown in FIG. 1, and the images are projected so that the image regions of the two projectors substantially overlap.

Figure 17:
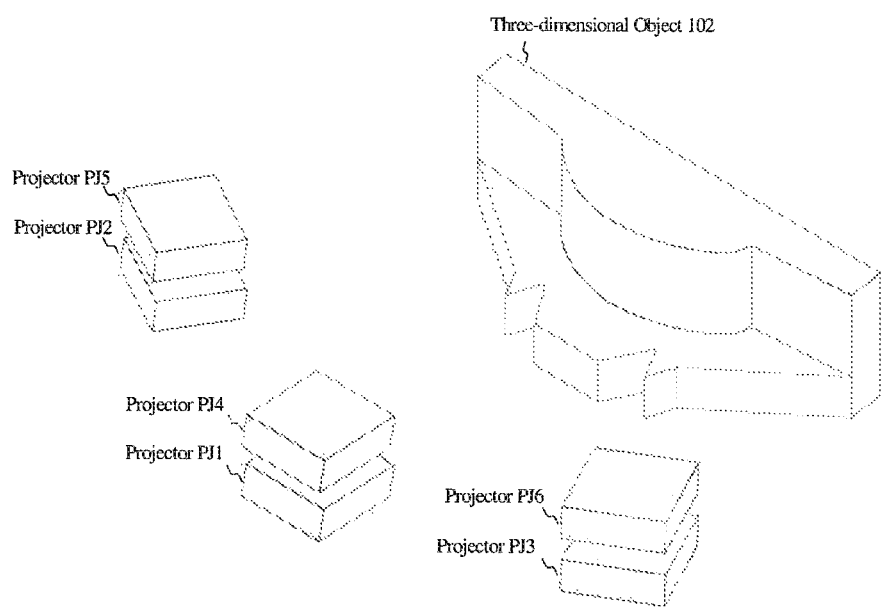
FIG. 17 is a schematic diagram showing a configuration example of a multi-projection system in which two projectors are arranged at the positions of the projectors shown in FIG. 1.

FIG. 17 shows an exemplary arrangement of projector PJ1 and projector PJ4 at the position of projector PJ1 shown in FIG. 1. Similarly, FIG. 17 shows an example in which projector PJ2 and projector PJ5 are arranged at the position of projector PJ2 shown in FIG. 1, and projector PJ3 and projector PJ6 are arranged at the position of projector PJ3. In such a case, since the number of images projected on one plane is "2", the prescribed number of projected images is "2".

Next, at step S5, blur minimizing region division unit 35 determines whether or not the blur minimizing region division has succeeded in step S4. When the blur minimizing region division fails, the blur minimizing region division unit 35 proceeds to step S7 and invalidates all the projectors.

When the blur minimizing region division is successful, blur minimizing region division unit 35 determines at step S6 whether or not the maximum value of the amount of blur in each region after the blur minimizing region division is equal to or less than the allowable blur amount.

When the maximum value of the amount of blur is larger than the allowable blur amount, blur minimizing region division unit 35 proceeds to step S7 and invalidates all the projectors. When the maximum value of the amount of blur is equal to or less than the allowable blur amount, blur minimizing region division unit 35 ends the blur minimizing region division.

[5-3] Calculation basis blending coefficient calculating unit 36 of the master projector calculates the plane-by-plane calculation basis blending coefficient for adjusting the brightness of each pixel in the projected images of the projectors PJ1-PJ3 based on the plane-by-plane blending information. The master projector transmits the plane-by-plane calculation basis blending coefficient calculated by calculation basis blending coefficient calculating unit 36 to each slave projector.

The blending coefficient is set to a value in the range of "0" to "1", for example, as shown in FIG. 16C, and is set to "0" so that an image is not projected in an image region which is not selected as a blur minimizing region. The blending coefficient is set to "1" in a region except for the blending region in the image region selected for the blur minimizing region, and is set to a value that gradually changes from "0" to "1" or from "1" to "0" in the blending region.

Although FIG. 16C shows an example in which the blending coefficient is changed linearly in the blending region, the blending coefficient does not necessarily have to be changed linearly.

FIG. 11 shows an example of the relationship between the plane-by-plane calculation basis blur amount, the plane-by-plane pixel basis blur amount after the blur minimizing region division and the plane-by-plane calculation basis blending coefficient.

[6] Processing by the Blending Coefficient Generator 14 of Each Projector

[6-1] Pixel basis blending coefficient conversion unit 37 converts the plane-by-plane calculation basis blending coefficient output from blending coefficient switching unit 13 into a blending coefficient for each pixel position in the projected images on each plane of three-dimensional object 102. For the conversion of the blending coefficient, each pixel position in the projected image on each plane of three-dimensional object 102, which is included in the plane-by-plane pixel information output from blur amount estimating unit 11, is used.

[6-2] Pixel basis blending coefficient integration unit 38 integrates the blending coefficients transformed by pixel basis blending coefficient conversion unit 37 to generate a blending coefficient for a projection image. In generating the blending coefficient for a projected image, the position of the pixel in the projected image corresponding to each pixel in the projected image on the plane of three-dimensional object 102, which is included in the pixel information for each plane, is used.

An example of the relationship in the plane-by-plane calculation basis blending coefficients, plane-by-plane pixel basis blending coefficients and the blending coefficients for projected images after integration are shown in FIG. 11.

Finally, an example of the blending operation in the multi-projection system shown in FIG. 1 will be described with reference to FIGS. 18A-18B to 32A-32B.

The upper left view from the front of FIGS. 18A-18B to 32A-32B shows a plane (projection target plane) on which an image is projected in three-dimensional object 102 shown in FIG. 1. Parts (a) of FIGS. 18A-18B to 32A-32B show the image regions of projectors PJ1-PJ3 on the respective projection target planes and the amount of blur thereof. Parts (b) of FIGS. 18A-18B to 32A-32B show the image regions (blur minimizing regions) projected from projectors PJ1-PJ3 after the blur minimizing region division and the amount of blur thereof.

In FIGS. 18A-18B to 32A-32B, the amount of blur is indicated by the square root of the blurred areas. In the plane of three-dimensional object 102 shown in FIGS. 18A-18B to 32A-32B, the size calculated by the minimum size ratio used in the processing of step S1 shown in FIG. 14 is 10% of the size in the vertical direction and the horizontal direction of the plane.

Further, in the projector shown in FIGS. 18A-18B to 32A-32B in which an image cannot be projected onto the projection target plane of three-dimensional object 102, the size of the image region is smaller than twice the size calculated by the minimum size ratio and the plane-by-plane calculation basis minimum blending size. Therefore, although the description is omitted below, it is assumed that a projector that cannot project an image onto the projection target plane of three-dimensional object 102 shown in FIGS. 18A-18B to 32A-32B is excluded from the blur minimizing region division candidates at step S1 of FIG. 14.

(1) FIGS. 18A-18B

Figure 18A:
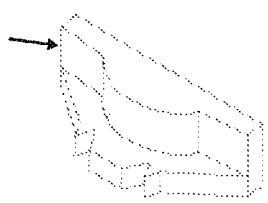
FIGS. 18A-18B are schematic diagrams showing an example of a blending operation in the three-dimensional object plane of the multi-projection system shown in FIG. 1.
Figure 18A:
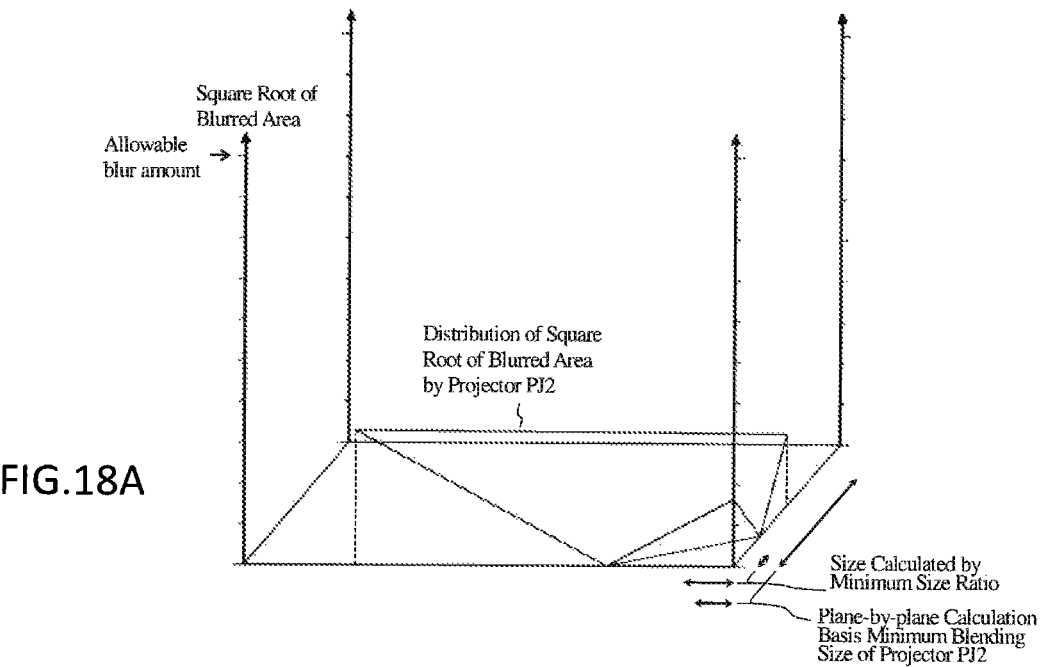
Figure 18B:
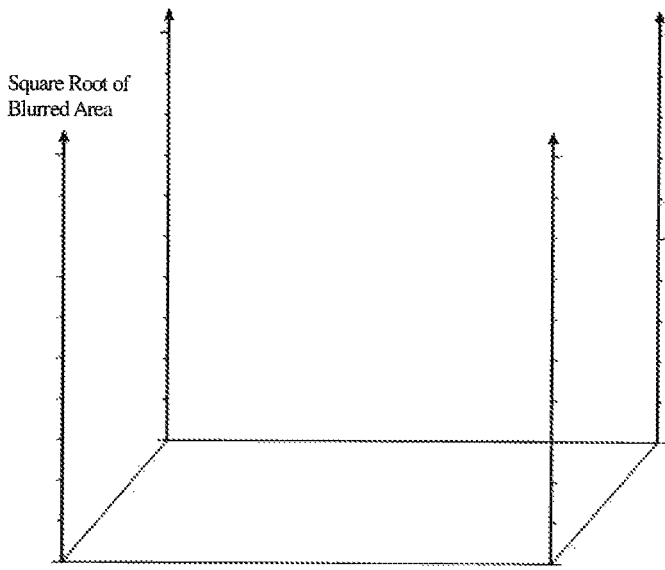

The projected image of projector PJ2 is partially projected at a shallow angle onto the projection target plane of three-dimensional object 102 shown at the upper left as viewed from the front of FIGS. 18A-18B.

Processing of Blur Minimizing Region Division Unit 35

At step S1 of FIG. 14, blur minimizing region division unit 35 determines that the vertical-direction size of the image region of projector PJ2 does not satisfy the condition 2. Therefore, at step S2 of FIG. 14, blur minimizing region division unit 35 excludes projector PJ2 from the blur minimizing region division candidates. Therefore, there is no effective projector.

At step S3 of FIG. 14, blur minimizing region division unit 35 determines that the entire projection target plane of three-dimensional object 102 shown in FIGS. 18A-18B cannot be covered with the effective image region of the projector. As a result, at step S7, blur minimizing region division unit 35 invalidates all the projectors and ends the processing.

Processing of Calculation Basis Blending Coefficient Calculating Unit 36

Calculation basis blending coefficient calculating unit 36 sets all the plane-by-plane calculation basis blending coefficients of the image region of projectors PJ1-PJ3 on the projection target plane of three-dimensional object 102 shown in FIGS. 18A-18B to "0".

Therefore, no image is projected from any projectors PJ1-PJ3 onto the projection target plane of three-dimensional object 102 shown in FIGS. 18A-18B.

(2) FIGS. 19A-19B

Figure 19A:
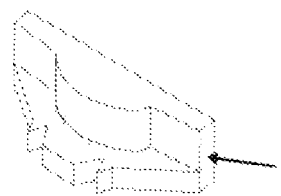
FIGS. 19A-19B are schematic diagrams showing an example of a blending operation in the three-dimensional object plane of the multi-projection system shown in FIG. 1.
Figure 19A:
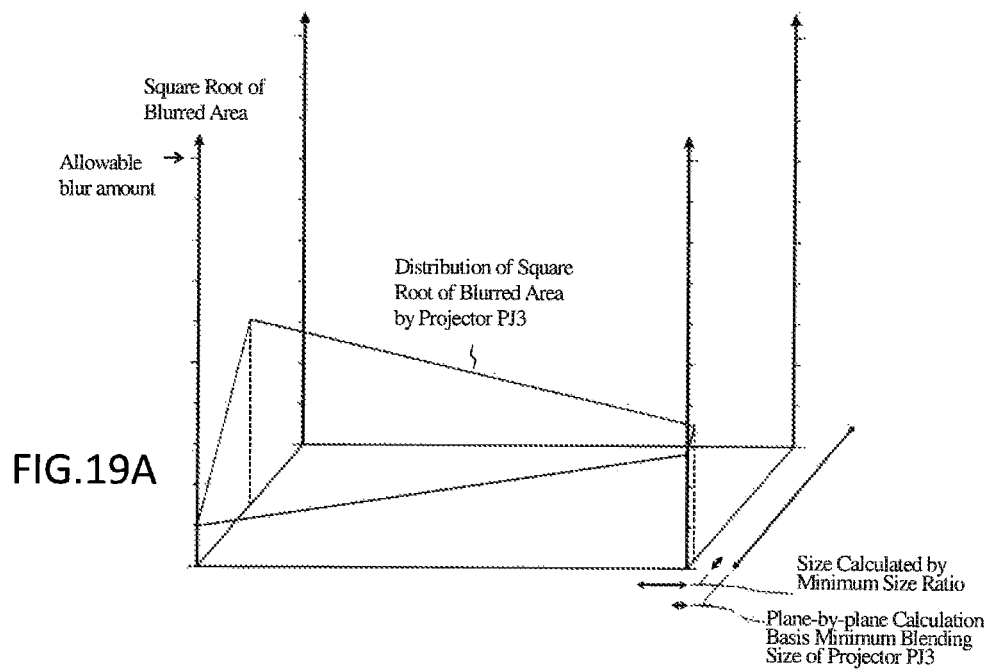
Figure 19B:
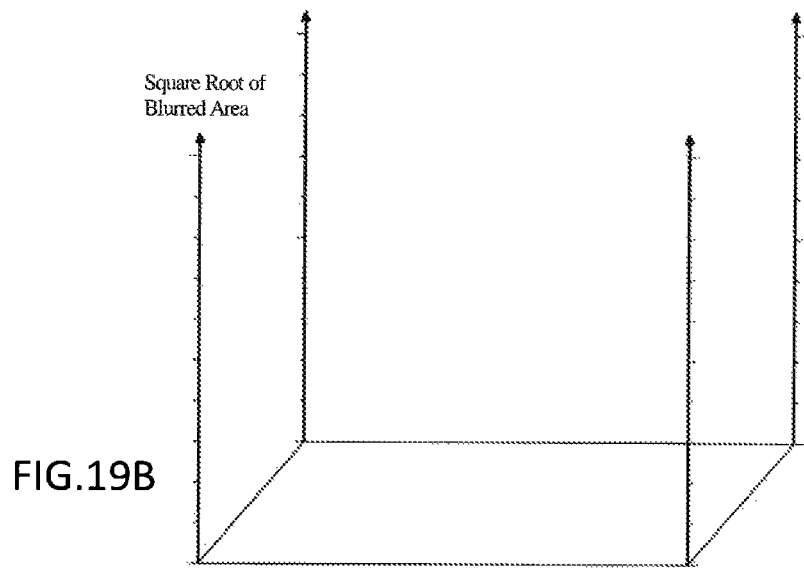

The projected image of projector PJ3 is partially projected at a shallow angle onto the projection target plane of three-dimensional object 102 shown at the upper left as viewed from the front of FIGS. 19A-19B.

Processing of Blur Minimizing Region Division Unit 35

At step S1 of FIG. 14, blur minimizing region division unit 35 determines that the vertical-direction size of the image region of projector PJ3 does not satisfy condition 2. Therefore, at step S2 of FIG. 14, blur minimizing region division unit 35 excludes projector PJ3 from the blur minimizing region division candidates. Therefore, there is no effective projector.

At step S3 of FIG. 14, blur minimizing region division unit 35 determines that the entire projection target plane of three-dimensional object 102 shown in FIGS. 19A-19B cannot be covered with the effective image region of the projector. As a result, at step S7, blur minimizing region division unit 35 invalidates all the projectors and ends the processing.

Processing of Calculation Basis Blending Coefficient Calculating Unit 36

Calculation basis blending coefficient calculating unit 36 sets all the plane-by-plane calculation basis blending coefficients of the image region of the projectors PJ1-PJ3 on the projection target plane of three-dimensional object 102 shown in FIGS. 19A-19B to "0".

Therefore, no image is projected from any projectors PJ1-PJ3 onto the projection target plane of three-dimensional object 102 shown in FIGS. 19A-19B.

(3) FIGS. 20A-20B

Figure 20A:
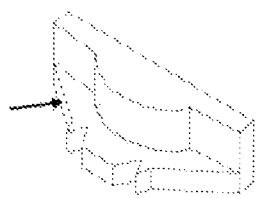
FIGS. 20A-20B are schematic diagrams showing an example of a blending operation in the three-dimensional object plane of the multi-projection system shown in FIG. 1.
Figure 20A:
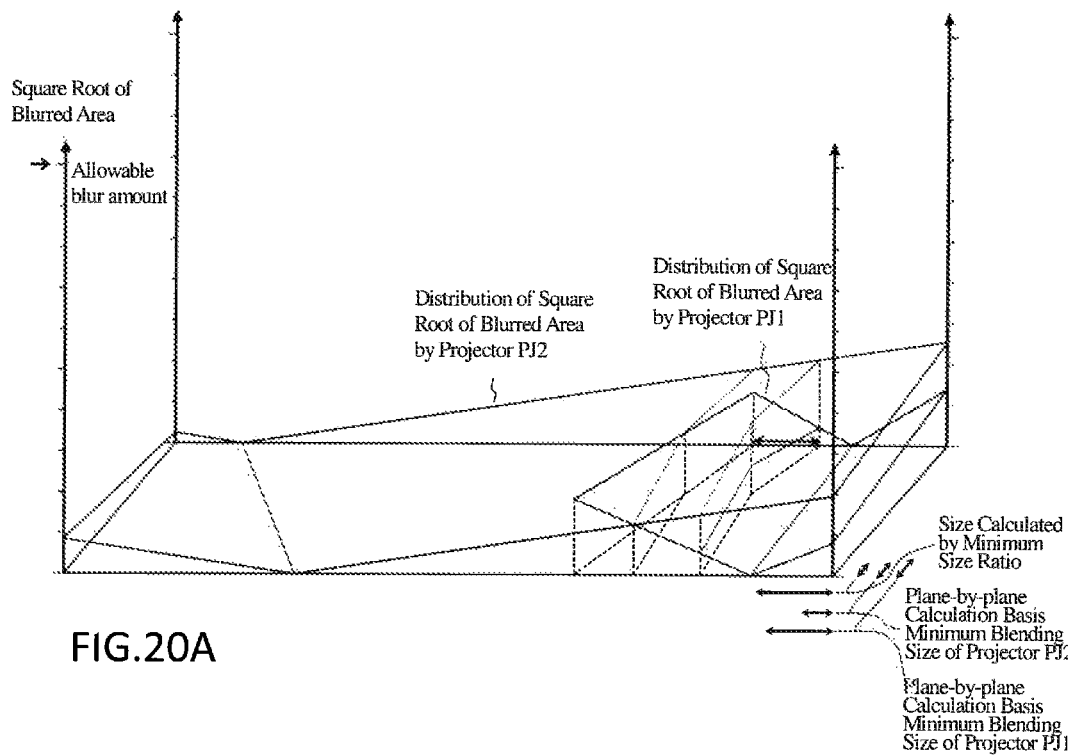
Figure 20B:
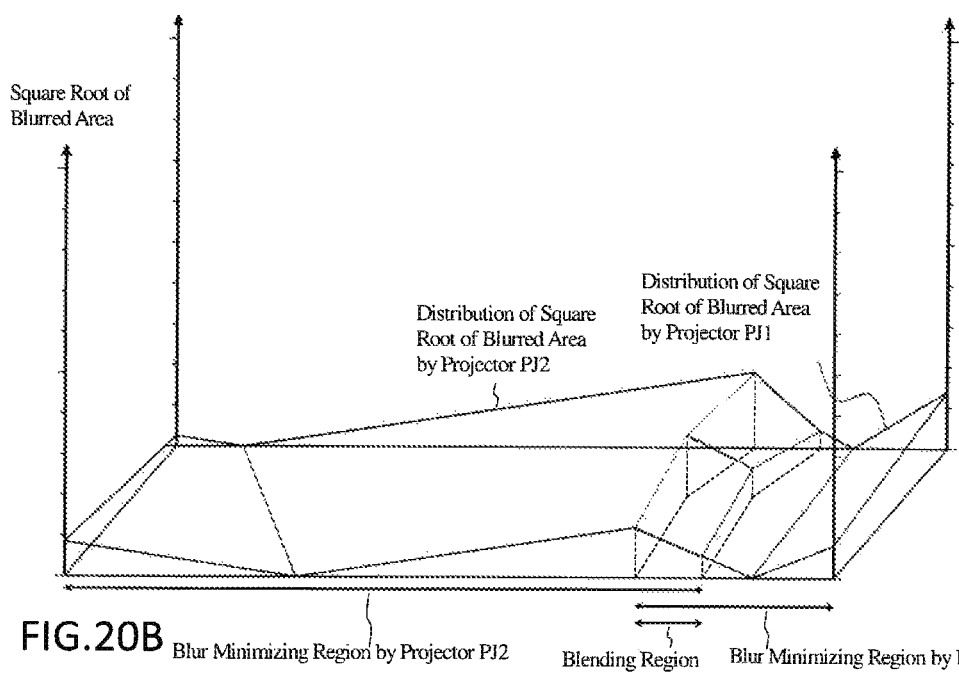

The projection image of projector PJ2 is projected entirely and the projection image of projector PJ1 is partially projected onto the projection target plane of three-dimensional object 102 shown in the upper left as viewed from the front of FIGS. 20A-20B.

Processing of Blur Minimizing Region Division Unit 35

At step S1 of FIG. 14, blur minimizing region division unit 35 determines that the sizes of the image regions of projectors PJ1 and PJ2 satisfy the above-mentioned conditions 1 and 2, respectively.

At step S3 of FIG. 14, blur minimizing region division unit 35 determines that the entire projection target plane shown in FIGS. 20A-20B can be covered with the image regions of the projectors PJ1 and PJ2 that are valid.

At step S4 of FIG. 14, blur minimizing region division unit 35 determines the image region of projector PJ1 at the right end and the image region of projector PJ2 on the left side in the projection target plane of three-dimensional object 102 shown in FIGS. 20A-20B as the blur minimizing region. The blending area is defined using the plane-by-plane calculation basis minimum blending size of projector PJ1.

Processing of Calculation Basis Blending Coefficient Calculating Unit 36

Calculation basis blending coefficient calculating unit 36 sets the plane-by-plane calculation basis blending coefficient of the area that is not selected as the blur minimizing region in the image regions of projectors PJ1 and PJ2 to "0". In addition, calculation basis blending coefficient calculating unit 36 sets a region except for the blending region in the blur minimizing region to "1", and sets the blending region to a value gradually changing from "0" to "1" or from "1" to "0".

Therefore, an image is projected from projectors PJ1 and PJ2 onto the projection target plane of three-dimensional object 102 shown in FIGS. 20A-20B.

(4) FIGS. 21A-21B

Figure 21A:
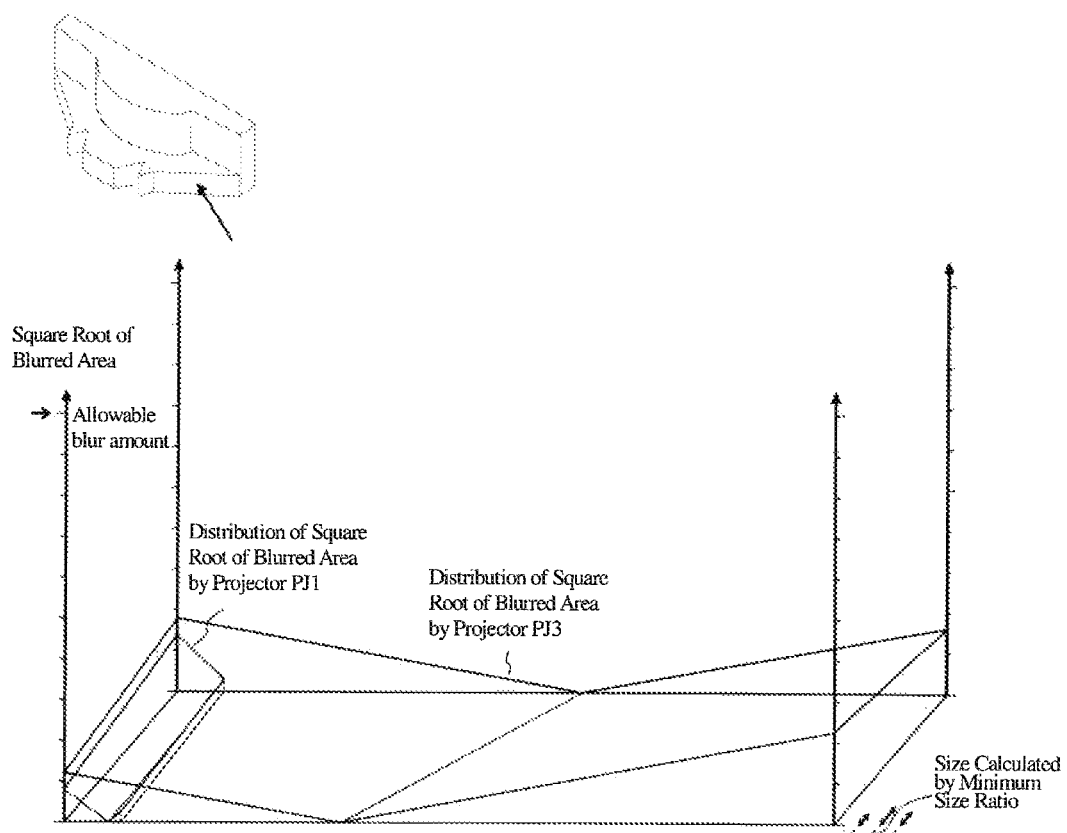
FIGS. 21A-21B are schematic diagrams showing an example of a blending operation in the three-dimensional object plane of the multi-projection system shown in FIG. 1.
Figure 21B:
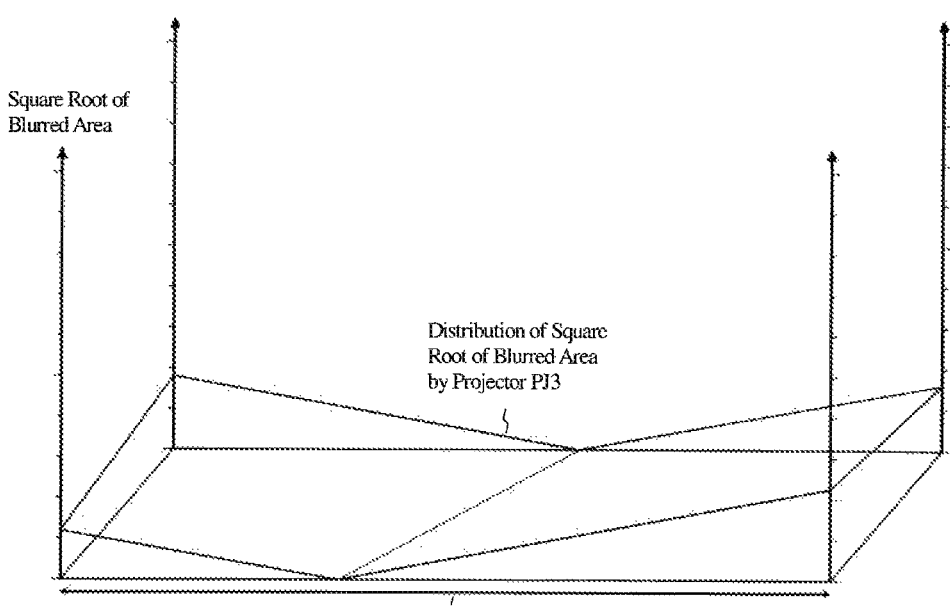

The projection image of projector PJ3 is projected entirely and the projection image of projector PJ1 is partially projected onto the projection target plane of three-dimensional object 102 shown in the upper left when viewed from the front of FIGS. 21A-21B.

Processing of Blur Minimizing Region Division Unit 35

At step S1 of FIG. 14, blur minimizing region division unit 35 determines that the horizontal-direction size of the image region of projector PJ1 does not satisfy the above-mentioned condition 1. Therefore, at step S2 of FIG. 14, blur minimizing region division unit 35 excludes the projector PJ1 from the blur minimizing region division candidates.

At step S1 of FIG. 14, blur minimizing region division unit 35 determines that the size of the image region of projector PJ3 satisfies the above-mentioned conditions 1 and 2, respectively.

At step S3 of FIG. 14, blur minimizing region division unit 35 determines that the entire projection target plane of three-dimensional object 102 shown in FIGS. 21A-21B can be covered with the image region of the valid projector PJ3.

At step S4 of FIG. 14, blur minimizing region division unit 35 determines that the image region of projector PJ3 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 on the projection target plane shown in FIGS. 21A-21B to "0". In addition, calculation basis blending coefficient calculating unit 36 sets all the plane-by-plane calculation basis blending coefficients of the image region of projector PJ3 on the projection target plane of three-dimensional object 102 shown in FIGS. 21A-21B to "1".

Therefore, an image is projected only from projector PJ3 onto the projection target plane of three-dimensional object 102 shown in FIGS. 21A-21B.

(5) FIGS. 22A-22B

Figure 22A:
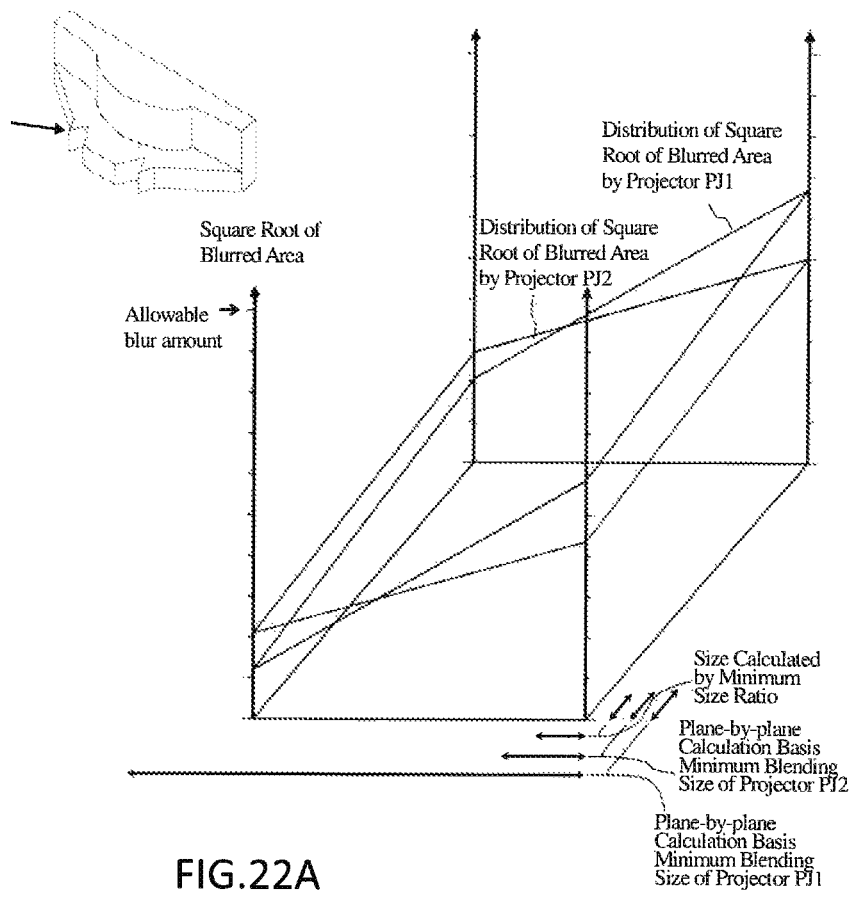
FIGS. 22A-22B are schematic diagram showing an example of a blending operation in the three-dimensional object plane of the multi-projection system shown in FIG. 1.
Figure 22B:
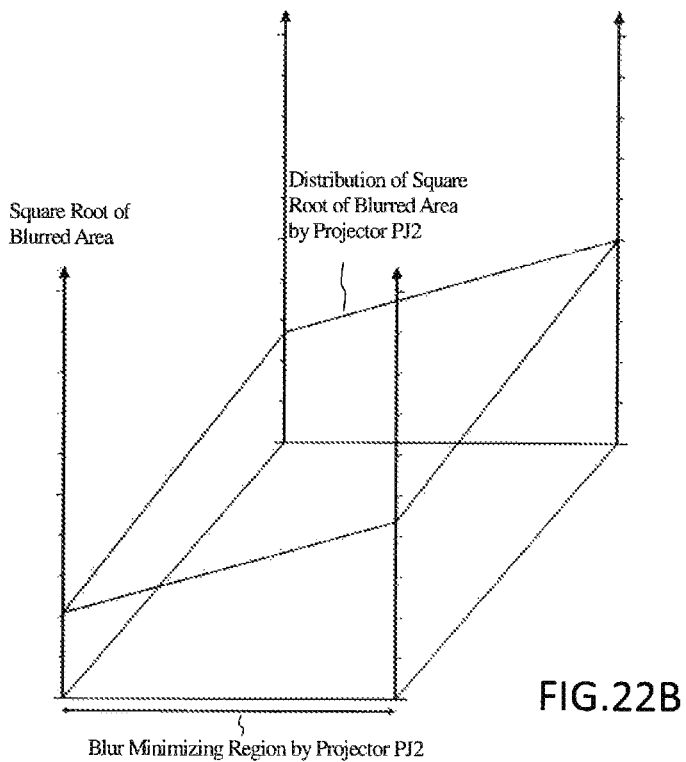

The projection image of projector PJ2 is projected on the entire projection target plane of three-dimensional object 102 shown in the upper left when viewed from the front of FIGS. 22A-22B, and the projection image of projector PJ1 is projected on the entire projection target plane at shallow angles.

Processing of Blur Minimizing Region Division Unit 35

At step S1 of FIG. 14, blur minimizing region division unit 35 determines that the horizontal-direction size of the image region of projector PJ1 does not satisfy the above-mentioned condition 2. Therefore, at step S2 of FIG. 14, blur minimizing region division unit 35 excludes the projector PJ1 from the blur minimizing region division candidates.

At step S1 of FIG. 14, blur minimizing region division unit 35 determines that the size of the image region of projector PJ2 satisfies above-mentioned conditions 1 and 2, respectively.

At step S3 of FIG. 14, blur minimizing region division unit 35 determines that the entire projection target plane of three-dimensional object 102 shown in FIGS. 22A-22B can be covered with the image region of the valid projector PJ2.

At step S4 of FIG. 14, blur minimizing region division unit 35 determines that the image region of projector PJ2 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 on the projection target plane of three-dimensional object 102 shown in FIGS. 22A-22B to "0". In addition, calculation basis blending coefficient calculating unit 36 sets all the plane-by-plane calculation basis blending coefficients of the image region of projector PJ2 on the projection target plane of three-dimensional object 102 shown in FIGS. 22A-22B to "1".

Therefore, an image is projected only from projector PJ2 onto the projection target plane of three-dimensional object 102 shown in FIGS. 22A-22B.

(6) FIGS. 23A-23B

Figure 23A:
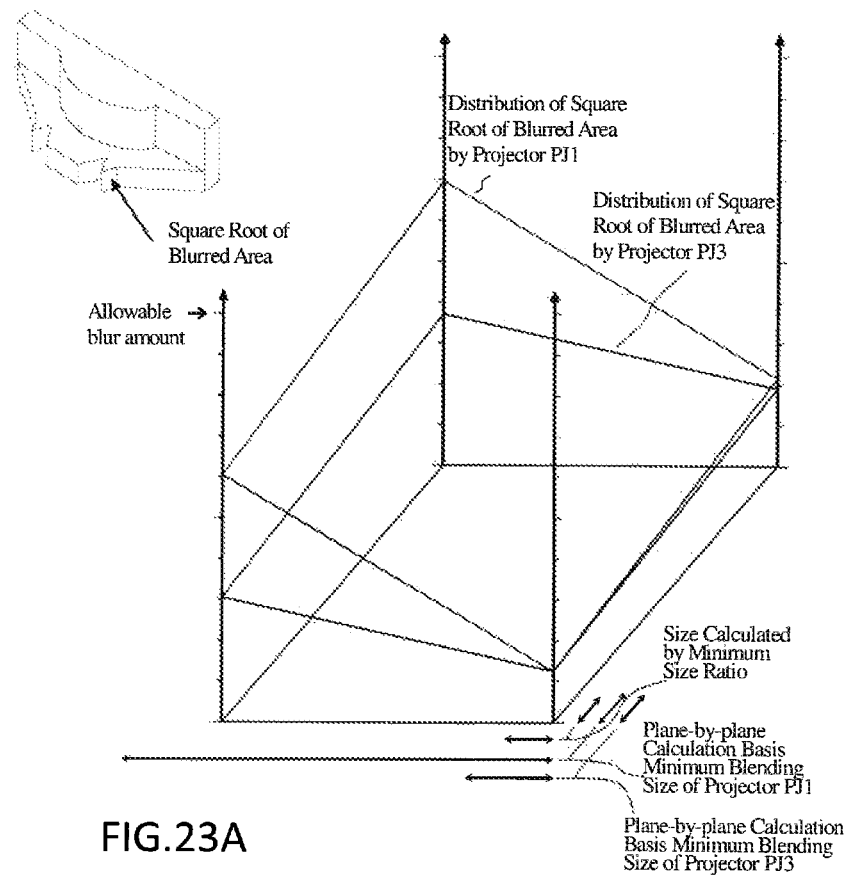
FIGS. 23A-23B are schematic diagrams showing an example of a blending operation in the three-dimensional object plane of the multi-projection system shown in FIG. 1.
Figure 23B:
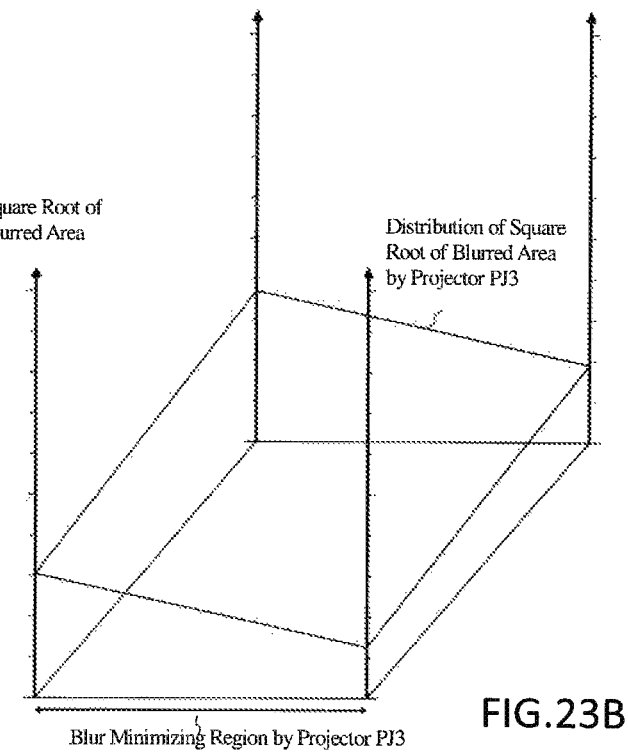

The projection image of projector PJ3 is projected on the entire projection target plane of three-dimensional object 102 shown at the upper left when viewed from the front of FIGS. 23A-23B, and the projection image of projector PJ1 is projected on the entire projection target plane at a shallow angle.

Processing of Blur Minimizing Region Division Unit 35

At step S1 of FIG. 14, blur minimizing region division unit 35 determines that the horizontal-direction size of the image region of projector PJ1 does not satisfy above-mentioned condition 2. Therefore, at step S2 of FIG. 14, blur minimizing region division unit 35 excludes projector PJ1 from the blur minimizing region division candidates.

At step S1 of FIG. 14, blur minimizing region division unit 35 determines that the size of the image region of projector PJ3 satisfies the above-mentioned conditions 1 and 2, respectively.

At step S3 of FIG. 14, blur minimizing region division unit 35 determines that the entire projection target plane of three-dimensional object 102 shown in FIGS. 23A-23B can be covered with the image region of the valid projector PJ3.

At step S4 of FIG. 14, blur minimizing region division unit 35 determines that the image region of projector PJ3 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 in the plane of the three-dimensional object 102 shown in FIGS. 23A-23B to "0". In addition, calculation basis blending coefficient calculating unit 36 sets all the plane-by-plane calculation basis blending coefficients of the image region of projector PJ3 on the projection target plane of three-dimensional object 102 shown in FIGS. 23A-23B to "1".

Therefore, an image is projected only from projector PJ3 onto the projection target plane of three-dimensional object 102 shown in FIGS. 23A-23B.

(7) FIGS. 24A-24B

Figure 24A:
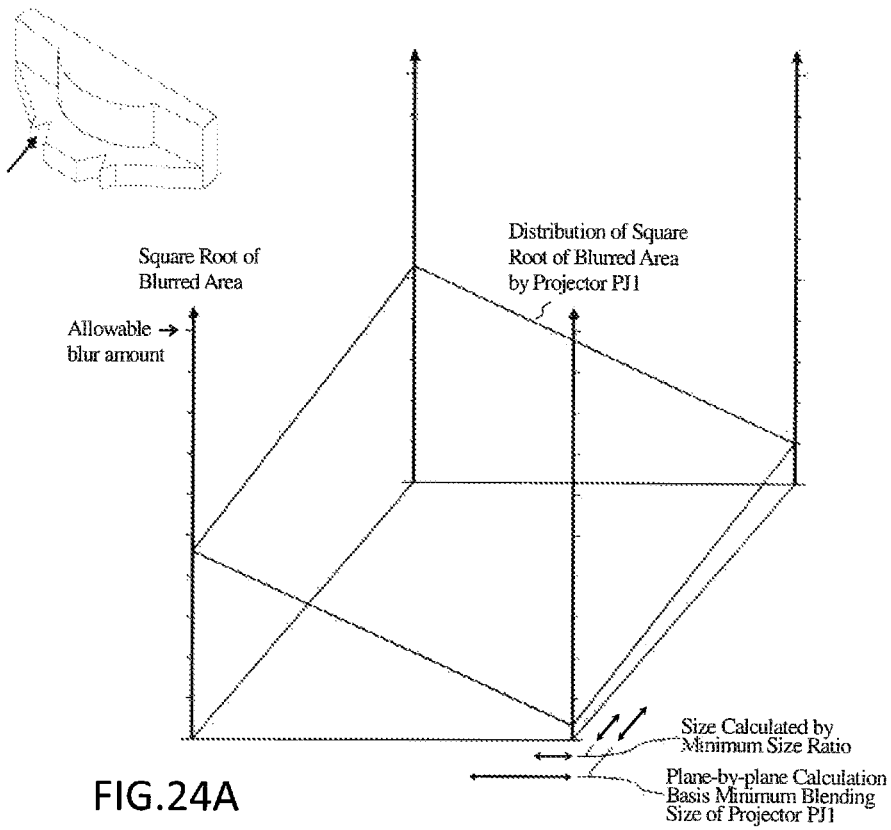
FIGS. 24A-24B are schematic diagrams showing an example of a blending operation in the three-dimensional object plane of the multi-projection system shown in FIG. 1.
Figure 24B:
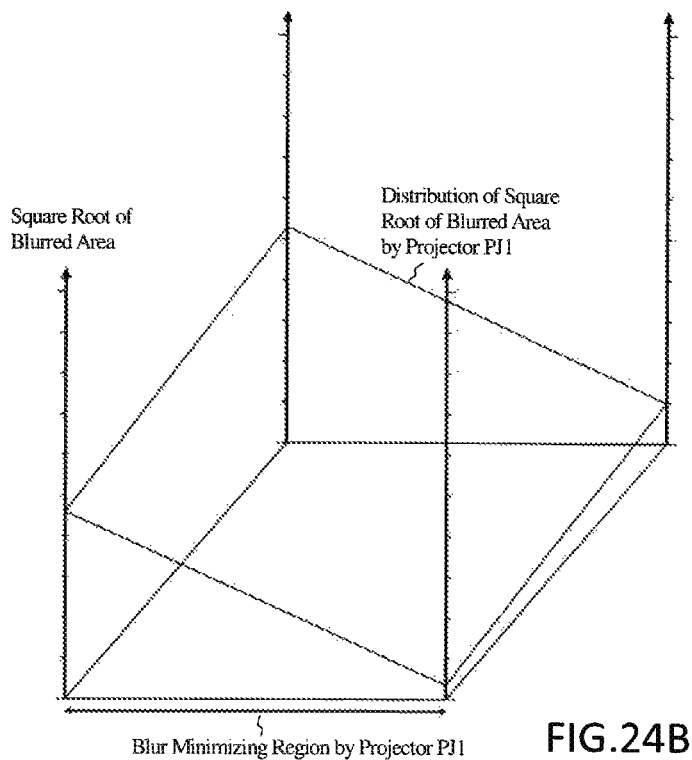

The projection image of projector PJ1 is projected entirely onto the projection target plane of three-dimensional object 102 shown in the upper left as viewed from the front of FIGS. 24A-24B.

Processing of Blur Minimizing Region Division Unit 35

At step S1 of FIG. 14, blur minimizing region division unit 35 determines that the size of the image region of projector PJ1 satisfies the above-described Conditions 1 and 2, respectively.

At step S3 of FIG. 14, blur minimizing region division unit 35 determines that the entire projection target plane of three-dimensional object 102 shown in FIGS. 24A-24B can be covered with the image region of the valid projector PJ1.

At step S4 of FIG. 14, blur minimizing region division unit 35 determines that the image region of projector PJ1 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 on the projection target plane of three-dimensional object 102 shown in FIGS. 24A-24B to "1".

Therefore, an image is projected only from projector PJ1 onto the projection target plane of three-dimensional object 102 shown in FIGS. 24A-24B.

(8) FIGS. 25A-25B

Figure 25A:
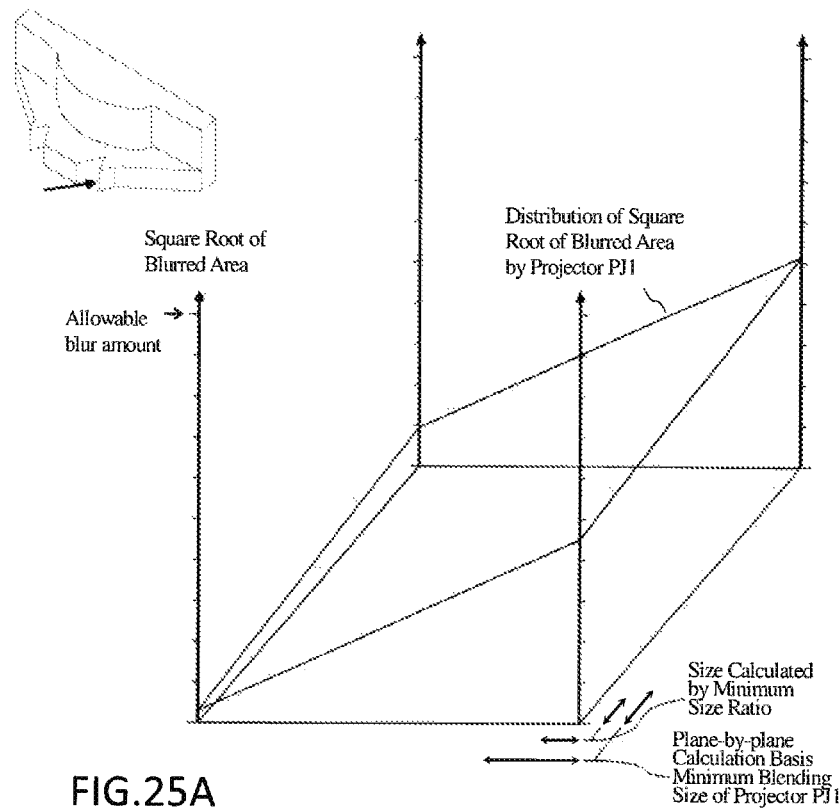
FIGS. 25A-25B are schematic diagrams showing an example of a blending operation in the three-dimensional object plane of the multi-projection system shown in FIG. 1.
Figure 25B:
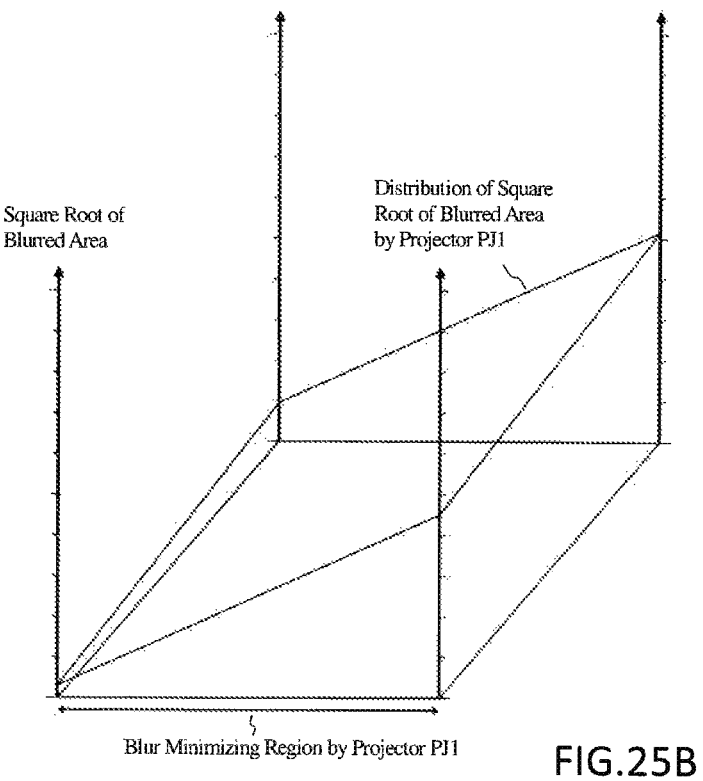

The projected image of projector PJ1 is projected entirely on the plane of three-dimensional object 102 shown at the upper left when viewed from the front of FIGS. 25A-25B.

Processing of Blur Minimizing Region Division Unit 35

At step S1 of FIG. 14, blur minimizing region division unit 35 determines that the size of the image region of the projector PJ1 satisfies the above-described Conditions 1 and 2, respectively.

At step S3 of FIG. 14, blur minimizing region division unit 35 determines that the entire projection target plane of three-dimensional object 102 shown in FIGS. 25A-25B can be covered with the image region of the valid projector PJ1.

At step S4 of FIG. 14, blur minimizing region division unit 35 determines that the image region of projector PJ1 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 on the projection target plane of three-dimensional object 102 shown in FIGS. 25A-25B to "1".

Therefore, an image is projected only from projector PJ1 onto the projection target plane of three-dimensional object 102 shown in FIGS. 25A-25B.

(9) FIGS. 26A-26B

Figure 26A:
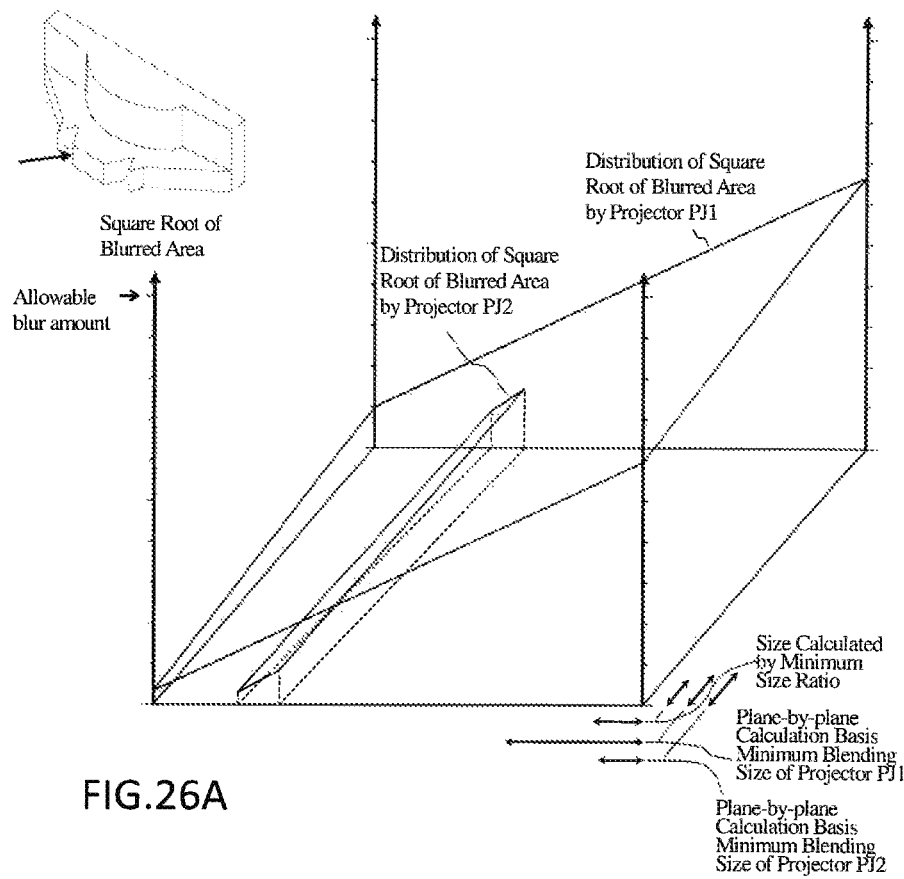
FIGS. 26A-26B are schematic diagram showing an example of a blending operation in the three-dimensional object plane of the multi-projection system shown in FIG. 1.
Figure 26B:
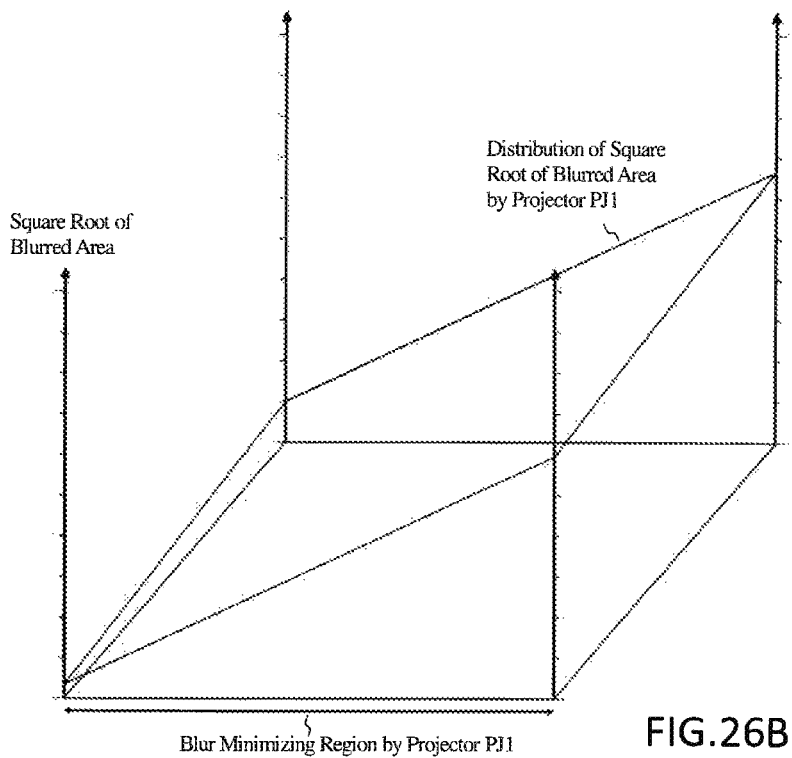

The projection image of projector PJ1 is projected entirely and the projection image of projector PJ2 is partially projected onto the projection target plane of three-dimensional object 102 shown in the upper left when viewed from the front of FIGS. 26A-26B.

Processing of Blur Minimizing Region Division Unit 35

At step S1 of FIG. 14, blur minimizing region division unit 35 determines that the horizontal-direction size of the image region of projector PJ2 does not satisfy the above-mentioned condition 1. Therefore, at step S2 of FIG. 14, blur minimizing region division unit 35 excludes projector PJ2 from the blur minimizing region division candidates.

At step S1 of FIG. 14, blur minimizing region division unit 35 determines that the size of the image region of projector PJ1 satisfies the above-mentioned conditions 1 and 2, respectively.

At step S3 of FIG. 14, blur minimizing region division unit 35 determines that the entire projection target plane of three-dimensional object 102 shown in FIGS. 26A-26B can be covered with the image region of the valid projector PJ1.

At step S4 of FIG. 14, blur minimizing region division unit 35 determines that the image region of projector PJ1 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ2 on the projection target plane of three-dimensional object 102 shown in FIGS. 26A-26B to "0". In addition, calculation basis blending coefficient calculating unit 36 sets all the plane-by-plane calculation basis blending coefficients of the image region of projector PJ1 on the projection target plane of three-dimensional object 102 shown in FIGS. 26A-26B to "1".

Therefore, an image is projected only from projector PJ1 onto the plane of three-dimensional object 102 shown in FIGS. 26A-26B.

(10) FIGS. 27A-27B

Figure 27A:
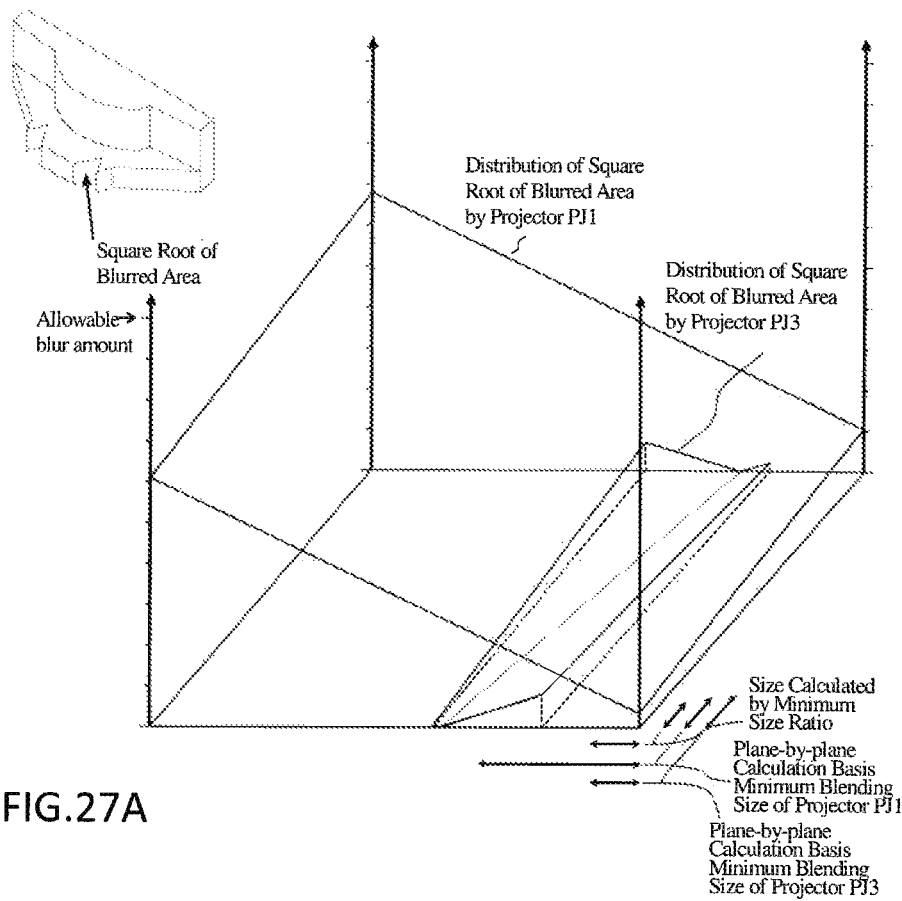
FIGS. 27A-27B are schematic diagrams showing an example of a blending operation in the three-dimensional object plane of the multi-projection system shown in FIG. 1.
Figure 27B:
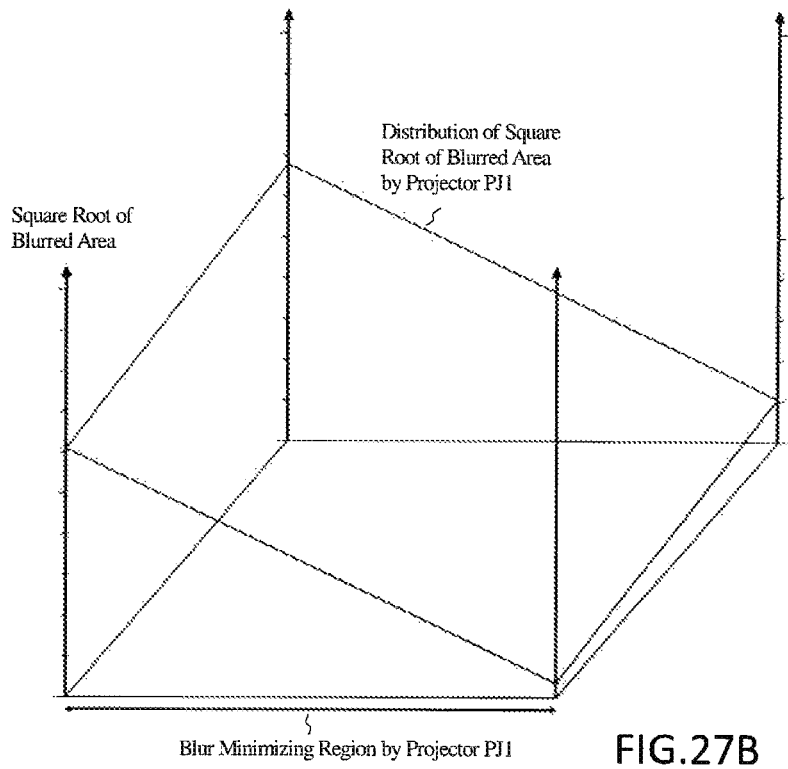

The projection image of projector PJ1 is projected entirely and the projection image of projector PJ3 is partially projected onto the projection target plane of three-dimensional object 102 shown in the upper left when viewed from the front of FIGS. 27A-27B.

Processing of Blur Minimizing Region Division Unit 35

At step S1 of FIG. 14, blur minimizing region division unit 35 determines that the size of the image region of projector PJ1 satisfies above-described Conditions 1 and 2, respectively.

At step S1 of FIG. 14, blur minimizing region division unit 35 determines that the size of the horizontal-direction image region of projector PJ3 does not satisfy condition 2. Therefore, at step S2 of FIG. 14, blur minimizing region division unit 35 excludes projector PJ3 from the blur minimizing region division candidates.

At step S3 of FIG. 14, blur minimizing region division unit 35 determines that the entire projection target plane of three-dimensional object 102 shown in FIGS. 27A-27B can be covered with the image region of the valid projector PJ1.

At step S4 of FIG. 14, blur minimizing region division unit 35 determines that the image region of projector PJ1 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ3 on the projection target plane of three-dimensional object 102 shown in FIGS. 27A-27B to "0". In addition, calculation basis blending coefficient calculating unit 36 sets all the plane-by-plane calculation basis blending coefficients of the image region of projector PJ1 on the projection target plane of three-dimensional object 102 shown in FIGS. 27A-27B to "1".

Therefore, an image is projected only from projector PJ1 onto the projection target plane of three-dimensional object 102 shown in FIGS. 27A-27B.

(11) FIGS. 28A-28B

Figure 28A:
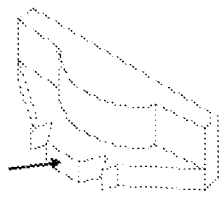
FIGS. 28A-28B are schematic diagrams showing an example of a blending operation in the three-dimensional object plane of the multi-projection system shown in FIG. 1.
Figure 28A:
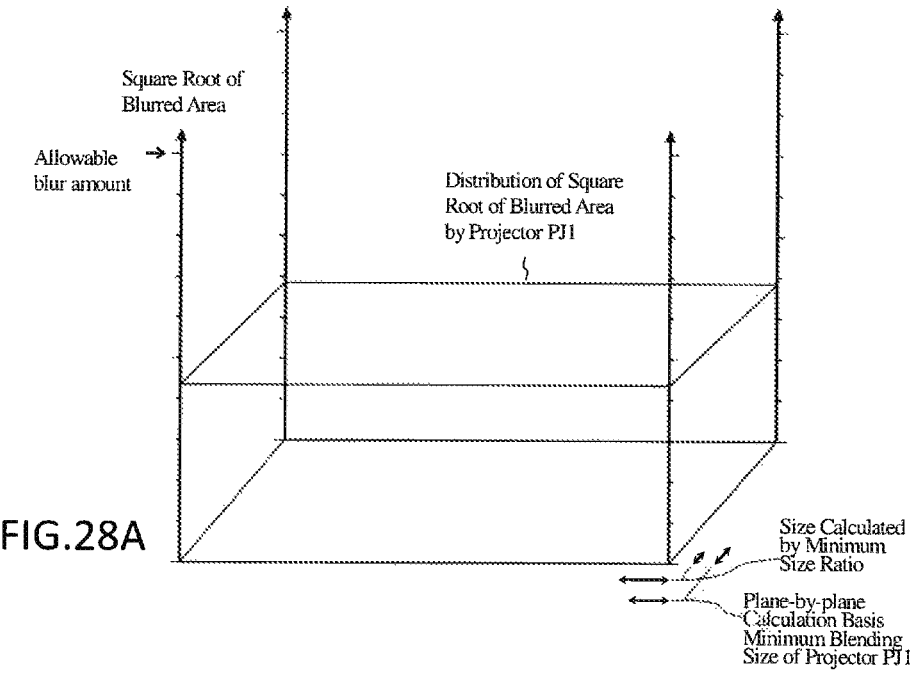
Figure 28B:
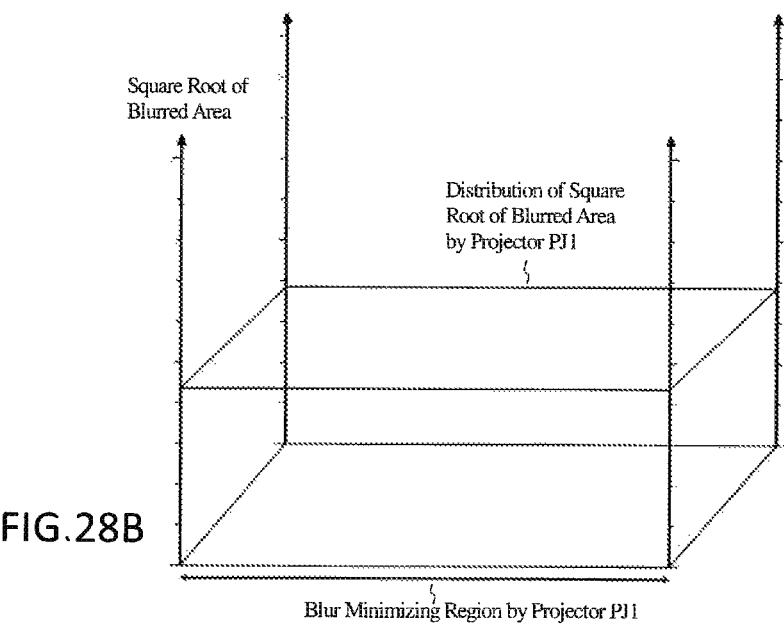

The projection image of projector PJ1 is projected entirely onto the projection target plane of three-dimensional object 102 shown in the upper left as viewed from the front of FIGS. 28A-28B.

Processing of Blur Minimizing Region Division Unit 35

At step S1 of FIG. 14, blur minimizing region division unit 35 determines that the size of the image region of projector PJ1 satisfies the above-described Conditions 1 and 2, respectively.

At step S3 of FIG. 14, blur minimizing region division unit 35 determines that the entire projection target plane of three-dimensional object 102 shown in FIGS. 28A-28B can be covered with the image region of the valid projector PJ1.

At step S4 of FIG. 14, blur minimizing region division unit 35 determines that the image region of projector PJ1 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 on the projection target plane of three-dimensional object 102 shown in FIGS. 28A-28B to "1".

Therefore, an image is projected only from projector PJ1 onto the projection target plane of three-dimensional object 102 shown in FIGS. 28A-28B.

(12) FIGS. 29A-29B

Figure 29A:
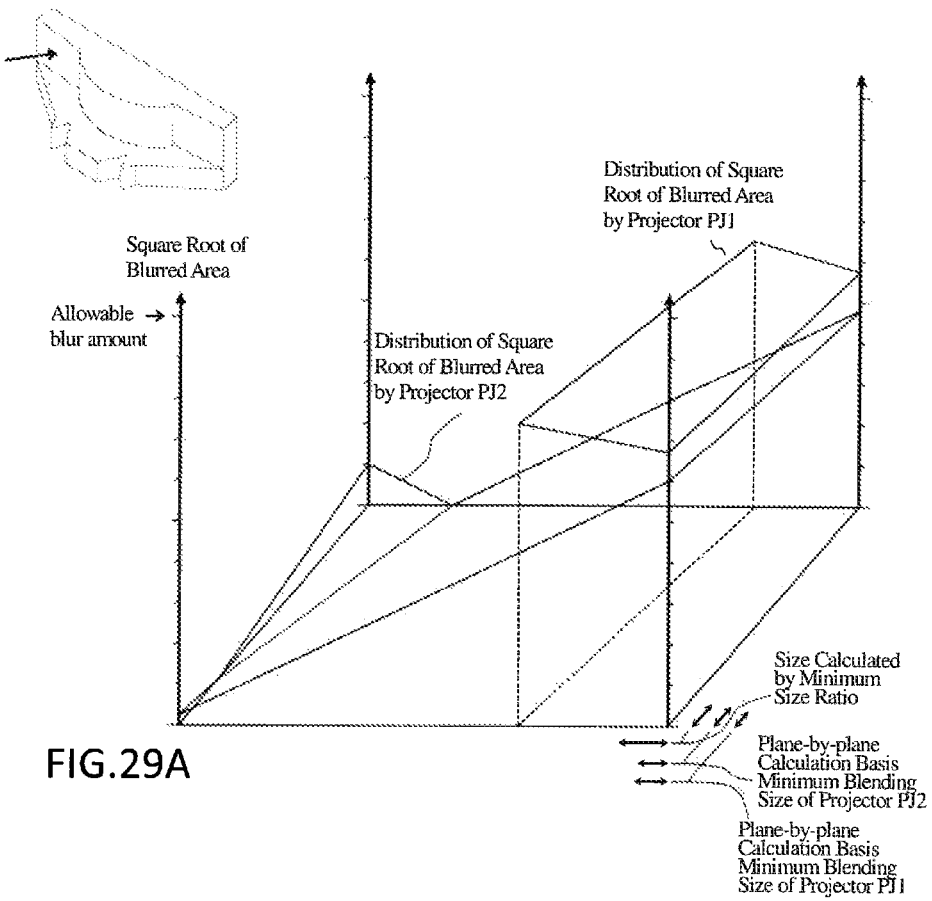
FIGS. 29A-29B are schematic diagrams showing an example of a blending operation in the three-dimensional object plane of the multi-projection system shown in FIG. 1.
Figure 29B:
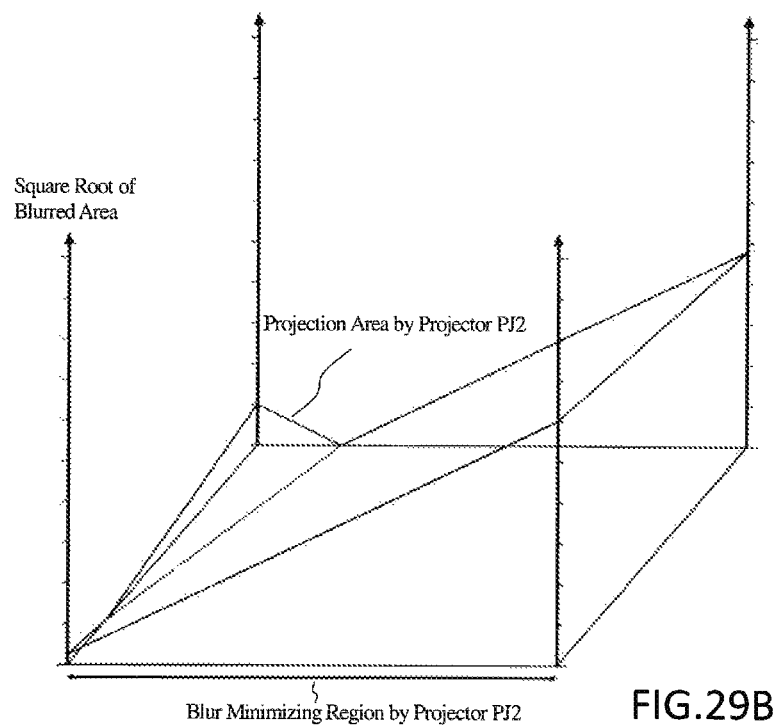

The projection image of projector PJ2 is projected entirely and the projection image of projector PJ1 is partially projected onto the plane of the three-dimensional object 102 shown at the upper left when viewed from the front of FIGS. 29A-29B.

Processing of Blur Minimizing Region Division Unit 35

At step S1 of FIG. 14, blur minimizing region division unit 35 determines that the sizes of the image regions of projectors PJ1 and PJ2 satisfy the above-mentioned conditions 1 and 2, respectively.

At step S3 of FIG. 14, blur minimizing region division unit 35 determines that the entire projection target plane of three-dimensional object 102 shown in FIGS. 29A-29B can be covered with the image regions of projector PJ1 and PJ2 that are valid.

At step S4 of FIG. 14, blur minimizing region division unit 35 determines that the image region of projector PJ2 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 on the projection target plane of three-dimensional object 102 shown in FIGS. 29A-29B to "0". In addition, calculation basis blending coefficient calculating unit 36 sets all the plane-by-plane calculation basis blending coefficients of the image region of projector PJ2 on the projection target plane of three-dimensional object 102 shown in FIGS. 29A-29B to "1".

Therefore, an image is projected only from projector PJ2 onto the projection target plane of three-dimensional object 102 shown in FIGS. 29A-29B.

(13) FIGS. 30A-30B

Figure 30A:
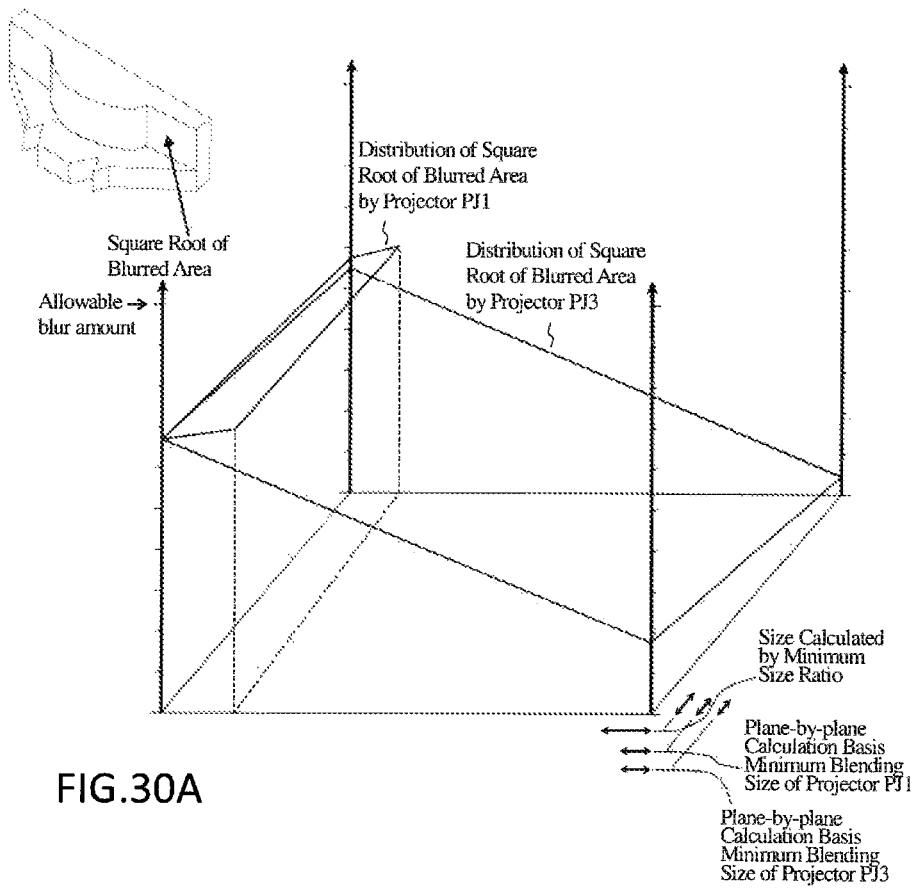
FIGS. 30A-30B are schematic diagrams showing an example of a blending operation in the three-dimensional object plane of the multi-projection system shown in FIG. 1.
Figure 30B:
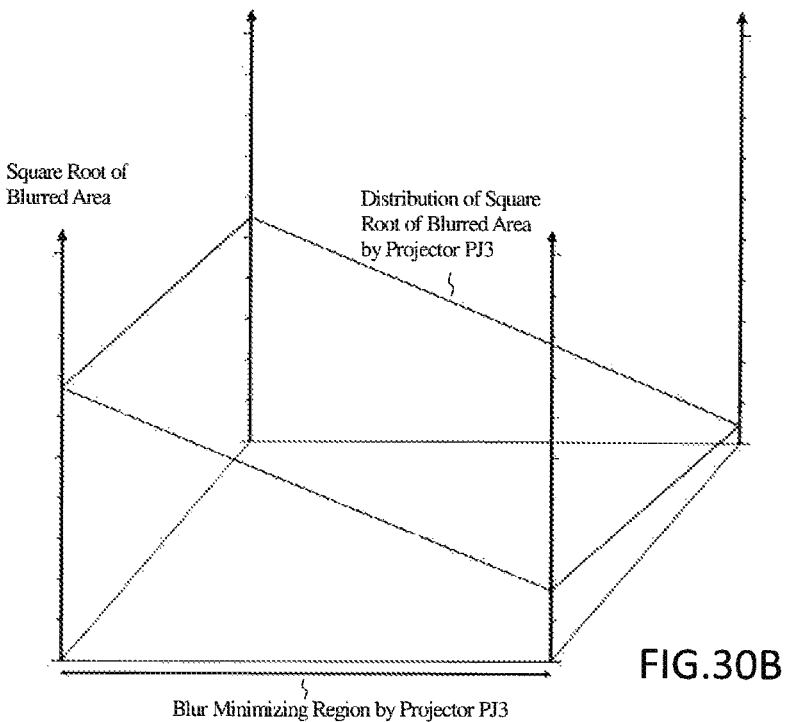

The projection image of projector PJ3 is projected entirely and the projection image of projector PJ1 is partially projected onto the projection target plane of three-dimensional object 102 shown in the upper left when viewed from the front of FIGS. 30A-30B.

Processing of Blur Minimizing Region Division Unit 35

At step S1 of FIG. 14, blur minimizing region division unit 35 determines that the sizes of the image regions of projectors PJ1 and PJ3 satisfy the above-mentioned conditions 1 and 2, respectively.

At step S3 of FIG. 14, blur minimizing region division unit 35 determines that the entire projection target plane of three-dimensional object 102 shown in FIGS. 30A-30B can be covered with the image regions of projector PJ1 and PJ3 that are valid.

At step S4 of FIG. 14, blur minimizing region division unit 35 determines that the image region of projector PJ3 is a blur minimizing region.

Processing of Calculation Basis Blending Coefficient Calculating Unit 36

Calculation basis blending coefficient calculating unit 36 sets all the plane-by-plane calculation basis blending coefficients of the image region of projector PJ1 on the projection target plane of three-dimensional object 102 shown in FIGS. 30A-30B to "0". In addition, calculation basis blending coefficient calculating unit 36 sets all the plane-by-plane calculation basis blending coefficients of the image region of projector PJ3 on the projection target plane of three-dimensional object 102 shown in FIGS. 30A-30B to "1".

Therefore, an image is projected only from projector PJ3 onto the projection target plane of three-dimensional object 102 shown in FIGS. 30A-30B.

(14) FIGS. 31A-31B

Figure 31A:
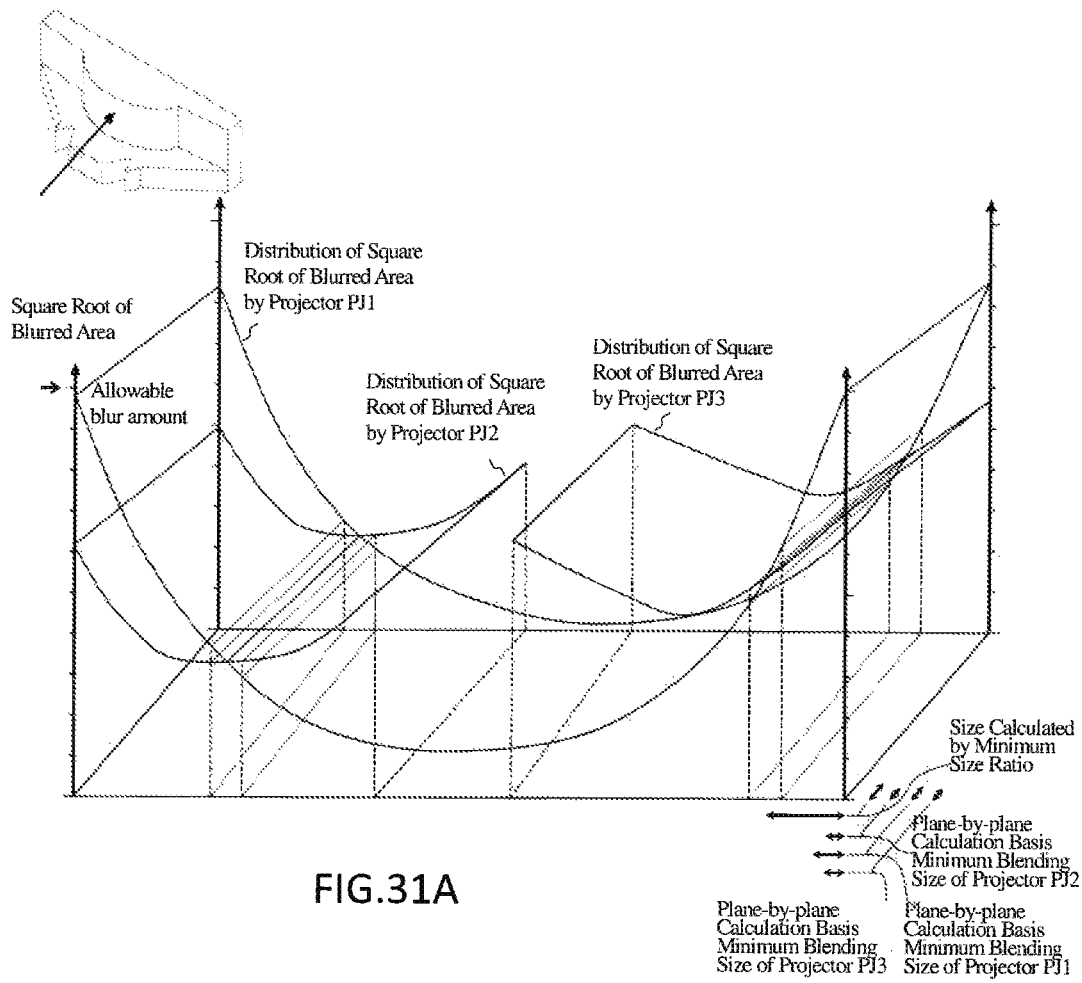
FIGS. 31A-31B are schematic diagrams showing an example of a blending operation in the three-dimensional object plane of the multi-projection system shown in FIG. 1.
Figure 31B:
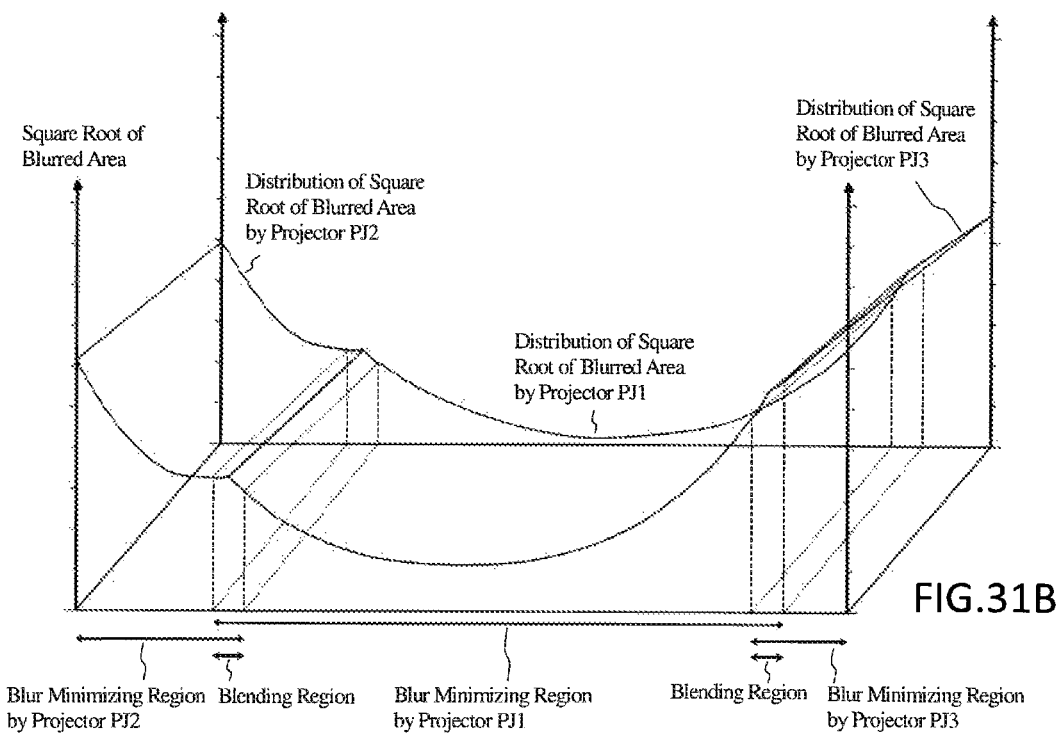

The projection image of projector PJ1 is projected entirely and the projection images of projectors PJ2 and PJ3 are partially projected onto the projection target plane of three-dimensional object 102 shown in the upper left when viewed from the front of FIGS. 31A-31B.

Processing of Blur Minimizing Region Division Unit 35

At step S1 of FIG. 14, blur minimizing region division unit 35 determines that the size of the image region of projector PJ1-PJ3 satisfies the above-described Conditions 1 and 2, respectively.

At step S3 of FIG. 14, blur minimizing region division unit 35 determines that the entire projection target plane of three-dimensional object 102 shown in FIGS. 31A-31B can be covered with the image region of the valid projectors PJ1-PJ3.

At step S4 of FIG. 14, blur minimizing region division unit 35 determines the image region of projector PJ2 as the blur minimizing region on the left end side of the projection target plane, and determines the image region of projector PJ1 as the blur minimizing region at the center of the projection target plane. Further, on the right end side of the projection target plane, the image region of projector PJ3 is determined as a blur minimizing region.

In addition, blur minimizing region division unit 35 sets a blending area using the plane-by-plane calculation basis minimum blending size of projector PJ1 at the boundaries of the image regions of projectors PJ1 and PJ2. Furthermore, blur minimizing region division unit 35 sets a blending area using the plane-by-plane calculation basis minimum blending size of projector PJ1 at the boundaries of the image regions of projectors PJ1 and PJ3.

Processing of Calculation Basis Blending Coefficient Calculating Unit 36

Calculation basis blending coefficient calculating unit 36 sets the plane-by-plane calculation basis blending coefficient of the image region that is not selected as the blur minimizing region in the image regions of projectors PJ1, PJ2 and the PJ3 to "0". In addition, calculation basis blending coefficient calculating unit 36 sets the image region except for the blending area to "1" in the blur minimizing region, and sets the blending area to a value gradually changing from "0" to "1" or from "1" to "0".

Therefore, images are projected from projectors PJ1-PJ3 onto the projection target plane of three-dimensional object 102 shown in FIGS. 31A-31B.

(15) FIGS. 32A-32B

Figure 32A:
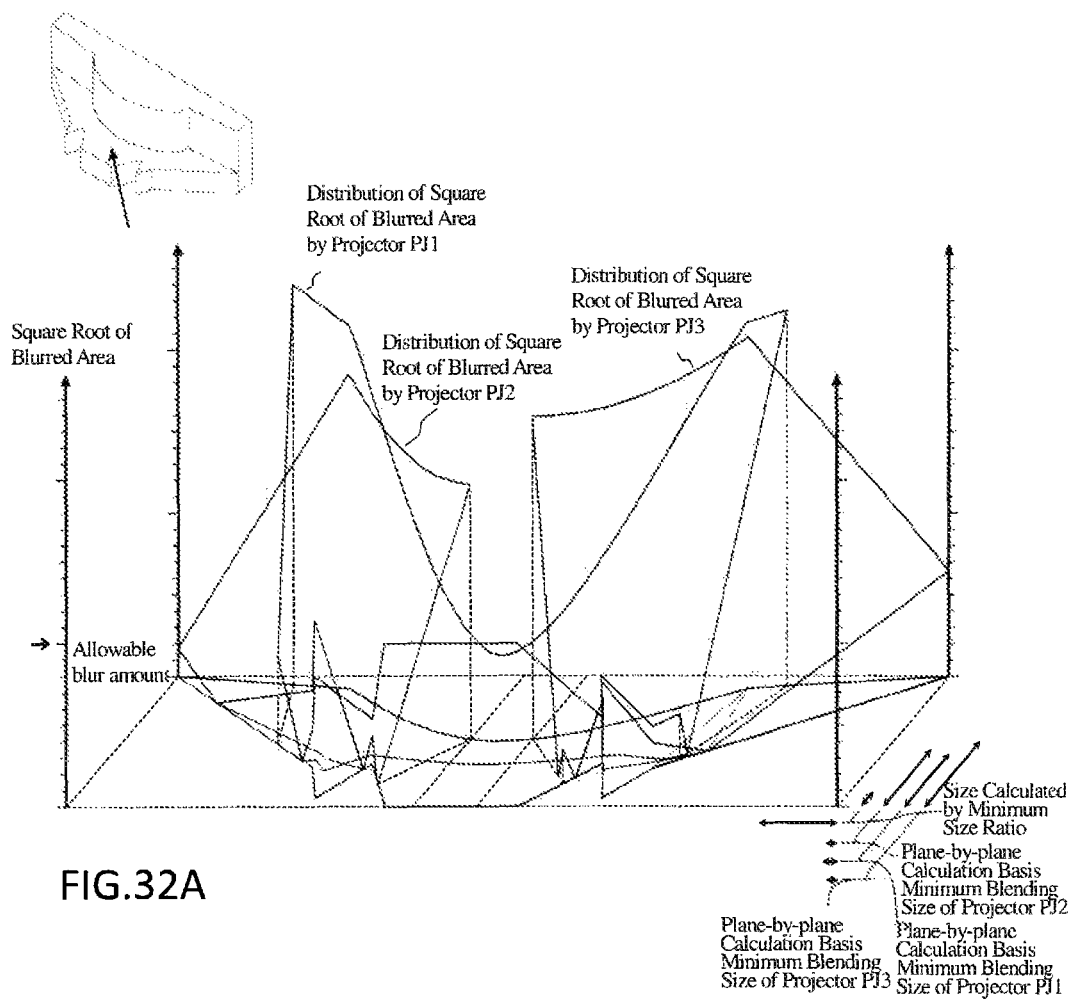
FIGS. 32A-32B are schematic diagrams showing an example of a blending operation in the three-dimensional object plane of the multi-projection system shown in FIG. 1.
Figure 32B:
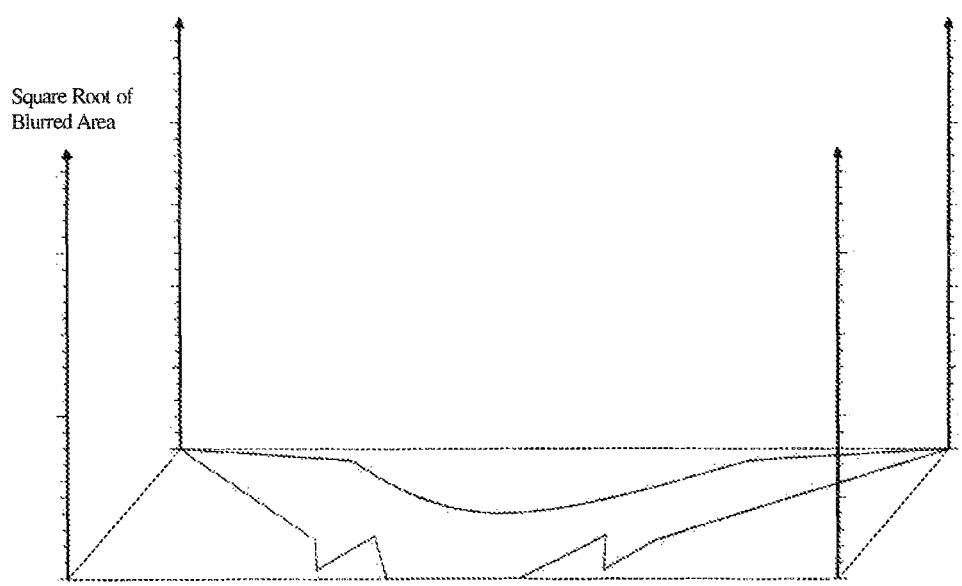

The projection image of projector PJ1 is projected entirely and the projection images of projectors PJ2 and PJ3 are partially projected onto the projection target plane of three-dimensional object 102 shown in the upper left when viewed from the front of FIGS. 32A-32B.

Processing of the Blur Minimizing Region Division Unit 35

At step S1 of FIG. 14, blur minimizing region division unit 35 determines that the size of the image region of projectors PJ1-PJ3 satisfies the above-described Conditions 1 and 2, respectively.

At step S3 of FIG. 14, blur minimizing region division unit 35 determines that the entire projection target plane of three-dimensional object 102 shown in FIGS. 32A-32B can be covered with the image region of the valid projectors PJ1-PJ3.

At step S4 of FIG. 14, blur minimizing region division unit 35 determines the image region of projector PJ2 as the blur minimizing region on the left end side of the projection target plane, and determines the image region of projector PJ1 as the blur minimizing region at the center of the projection target plane. The blur minimizing region division unit 35 determines the image region of projector PJ3 as the blur minimizing region on the right end side of the projection target plane in S4 of FIG. 14.

In addition, blur minimizing region division unit 35 sets a blending area using the plane-by-plane calculation basis minimum blending size of projector PJ1 at the boundaries of the image regions of projectors PJ1 and PJ2. Furthermore, blur minimizing region division unit 35 sets a blending area using the plane-by-plane calculation basis minimum blending size of projector PJ1 at the boundaries of the image regions of projectors PJ1 and PJ3.

However, at step S6 of FIG. 14, blur minimizing region division unit 35 determines that the maximum value of the amount of blur in each region after the blur minimizing region division is larger than the allowable blur amount, as shown in FIG. 32A. As a result, at step S7, blur minimizing region division unit 35 invalidates all the projectors and ends the processing.

Processing of Calculation Basis Blending Coefficient Calculating Unit 36

Calculation basis blending coefficient calculating unit 36 sets all the plane-by-plane calculation basis blending coefficients of the image region of projectors PJ1-PJ3 on the projection target plane of three-dimensional object 102 shown in FIGS. 32A-32B to "0".

Therefore, no image is projected from any projectors PJ1-PJ3 onto the projection target plane of three-dimensional object 102 shown in FIGS. 32A-32B.

According to the present exemplary embodiment, the master projector determines, based on the plane-by-plane calculation basis blur amount obtained by blur amount estimating unit 11, an area on the projection target plane of three-dimensional object 102 in which the image for each projector having the minimum plane-by-plane calculation basis blur amount is projected. At this time, when a projected image with a small amount of blur and a projected image with a large amount of blur are projected onto the same plane of three-dimensional object 102, the projector that projects an image with a large amount of blur is invalidated. Therefore, the image is not projected from the projector that projects the image having the large amount of blur. Therefore, an increase in the amount of blur in the projected image on each plane of three-dimensional object 102 is reduced.

In addition, the master projector excludes a projector whose image region is too small with respect to the size of the projection target plane of three-dimensional object 102 and a projector whose blending area cannot be secured from candidates for projecting an image onto the projection target plane, and invalidates the projector. Therefore, an unintended image from the projector or an image having a greatly reduced resolution is not projected onto the projection target plane. Therefore, deterioration in the projected image on each plane of three-dimensional object 102 is reduced.

Therefore, according to the present exemplary embodiment, an increase in the amount of blur in the projected image on each plane of three-dimensional object 102 and deterioration in the projected image on each plane of three-dimensional object 102 are reduced.

Second Exemplary Embodiment

Figure 33:
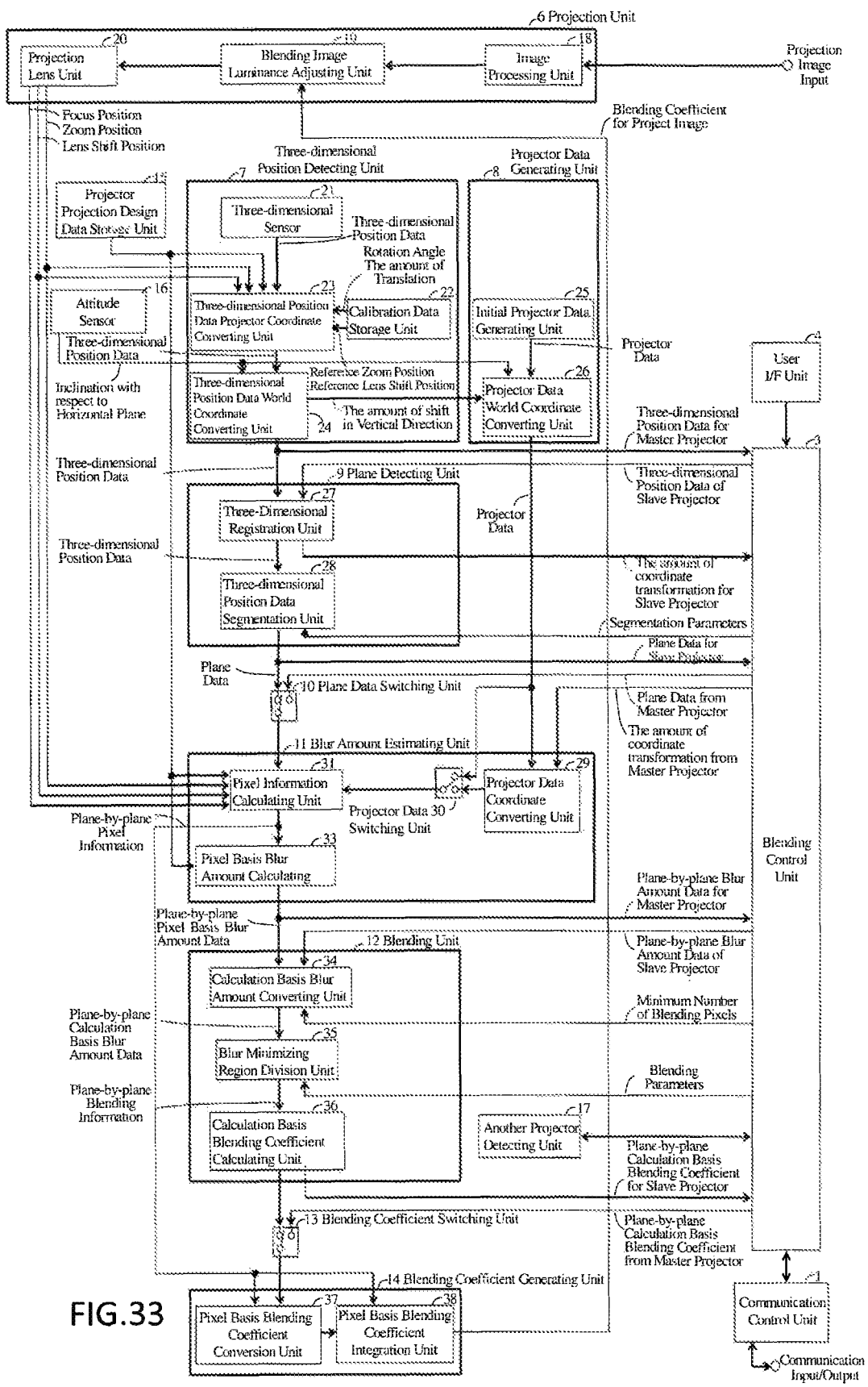
FIG. 33 is a block diagram showing an example of the configuration of a projector according to the second exemplary embodiment.

FIG. 33 is a block diagram showing an example of the configuration of a projector according to the second exemplary embodiment.

As shown in FIG. 33, the projector of the second exemplary embodiment has a configuration excluding blur amount storage unit 32 included in the projector of the first exemplary embodiment shown in FIG. 3. In the projector of the second exemplary embodiment, the pixel-by-plane pixel information calculated by pixel information calculating unit 31 and the design data related to the projection function stored in projector projection design data storage unit 15 are input to pixel basis blur amount calculating unit 33.

In the projector of the first exemplary embodiment, pixel basis blur amount calculating unit 33 obtains the pixel-by-pixel blur amount on each plane of three-dimensional object 102 using the plane-by-plane pixel information calculated by pixel information calculating unit 31 and the actual measurement value stored in blur amount storage unit 32.

On the other hand, in the projector of the second exemplary embodiment, pixel basis blur amount calculating unit 33 theoretically calculates the pixel-by-pixel blur amount on each plane of three-dimensional object 102 using the plane-by-plane pixel information and the design data related to the projection function. Since the calculation method of the pixel-by-pixel blur amount on each plane of three-dimensional object 102 is well-known to those skilled in the art, the description thereof is omitted here. Other configurations and operations are the same as those of the projector of the first exemplary embodiment, and therefore description thereof is omitted.

In the second exemplary embodiment, since the actually measured values are not used as the amount of blur, the blur amount correction coefficient, and the blur amount conversion coefficient for each zoom position corresponding to the focus position and the projection distance, there is a possibility that the accuracy of the obtained pixel basis blur amount is lowered.

However, in the second exemplary embodiment, at the time of manufacturing the projector, it is not necessary to measure and store in advance the amount of blur, the correction coefficient of the amount of blur, the conversion coefficient of the amount of blur, and the like for each zoom position corresponding to each focus position and projection distance. Therefore, according to the second exemplary embodiment, compared with the first exemplary embodiment, the manufacturing process of the projector is shortened, and the manufacturing cost of the projector is also reduced.

Third Exemplary Embodiment

Figure 34:
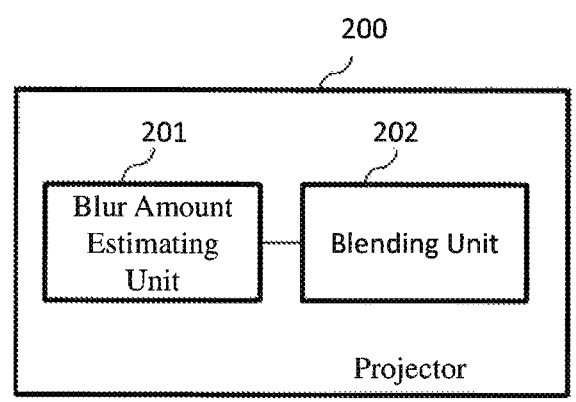
FIG. 34 is a block diagram showing an example of a main configuration of a projector of the present invention.

FIG. 34 is a block diagram showing an example of a main configuration of a projector of the present invention.

As shown in FIG. 34, the projector 200 according to the third exemplary embodiment includes blur amount estimating unit 201 and blending unit 202.

Blur amount estimating unit 201 estimates the amount of blur in image projected from projector 200 in each of a plurality of planes included in three-dimensional object 102.

Based on the amount of blur in images estimated by blur amount estimating unit 201 and the amount of blur in images notified from the projectors except for projector 200 in the plurality of projectors, blending unit 202 determines the area of the image projected from the plurality of projectors for each of the plurality of planes so that the amount of blur in images on the plurality of planes of three-dimensional object 102 is minimum Blur amount estimating unit 11 shown in the first and second exemplary embodiments is an example of blur amount estimation unit 201. Blending unit 12 shown in the first and second exemplary embodiments is an example of blending unit 202.

The present invention may take the form described in the following appendix, but is not limited to the form described in the appendix.

(Appendix 1)

A multi-projection system for projecting an image from a plurality of projectors onto a three-dimensional object, comprising:

a master projector that is one of the plurality of projectors and that controls the operation of the multi-projection system; and a slave projector that is not the master projector in the plurality of projectors and that performs processing in accordance with an instruction of the master projector, wherein the slave projector estimates an amount of blur in an image projected from the projector itself in each of a plurality of planes of the three-dimensional object, and provides the estimated amount of blur in the image to the master projector, wherein the master projector estimates an amount of blur in an image projected from the projector itself in each of a plurality of planes of the three-dimensional object, and determines regions of the image projected from the plurality of projectors based on the amount of blur in the image estimated by the master projector and based on the amount of blur in the image estimated by the slave projector so that the amounts of blur in the image in each of the plurality of planes are minimized, respectively.

(Appendix 2)

The multi-projection system according to Appendix 1, wherein said master projector excludes a projector in which the size of an image projected on a plane of a three-dimensional object is smaller than a preset size from a projector in which an image is projected on the plane.

(Appendix 3)

The multi-projection system according to Appendix 1 or 2, wherein said master projector, when an image is projected from the plurality of projectors onto the same plane of the three-dimensional object, provides a blending region, which is a region in which a part of each image is superimposed on a boundary between adjacent images on the plane, and excludes a projector that cannot secure a blending region having a size set in advance in a size of an image projected on a plane from a projector that projects an image on the plane.

(Appendix 4)

The multi-projection system according to any one of Appendices 1 to 3, said master projector and said slave projector comprise three-dimensional position sensors measuring the position of the three-dimensional object in three dimensions, wherein said master projector integrates three-dimensional position data indicating the positions of the three-dimensional objects measured by the three-dimensional position sensors of the master projector and the slave projector, and detects a plurality of planes of the three-dimensional objects based on the integrated three-dimensional position data.

(Appendix 5)

The multi-projection system according to Appendix 4, wherein said master projector detects a plurality of planes of a three-dimensional object by determining a normal vector of each point of the three-dimensional position data after integration of the three-dimensional object composed of point group data, respectively, and determines that the adjacent points are on the same plane when a difference between the normal vectors of adjacent points is smaller than a predetermined threshold value set in advance.

(Appendix 6)

The multi-projection system according to any one of Appendices 1 to 5, wherein said master projector and said slave projector set as a calculational resolution for each plane of the three-dimensional object in which the highest resolution in resolutions of images projected from the projector on a plurality of planes of the three-dimensional object, obtain a plane-by-plane pixel basis blur amount, which is an amount of blur for each pixel of an image projected from the projector on a plurality of planes of the three-dimensional object, for each plane of the three-dimensional object, convert the plane-by-plane pixel basis blur amount into a plane-by-plane calculation basis blur amount, which is an amount of blur in an image on the calculational resolution, and use the plane-by-plane calculation basis blur amount as the estimated amount of blur in the image on a plurality of planes of the three-dimensional object.

(Appendix 7)

The multi-projection system according to Appendix 6, wherein said master projector and said slave projector store the measured values of the amount of blur in images for each zoom position corresponding to the focus position of the projection lens and the distance to the projection plane, the correction coefficient for the amount of blur in images for each zoom position corresponding to the position of each pixel in the projected image and the distance to the projection plane, and the actually measured values of the conversion coefficient for the amount of blur in images for each zoom position corresponding to the amount of inclination of the plane of the three-dimensional object with respect to the projection plane and the conversion coefficient for the amount of blur in images for each zoom position corresponding to the distance to the projection plane which are measured in advance, and determine the amount of blur in images in pixel basis for each plane based on the measured values.

(Appendix 8)

The multi-projection system according to any one of Appendices 1 to 7, wherein said master projector invalidates all of the plurality of projectors when a minimum amount of blur in an image on a plane of the three-dimensional object is larger than a preset allowable amount of blur in an image, and an image is not projected on the plane.

(Appendix 9)

The multi-projection system according to Appendix 2 or 3, wherein said master projector sets a coefficient for adjusting the luminance of each pixel of an image signal corresponding to a image projected onto a plurality of planes of the three-dimensional object, sets "0" as the coefficient for an image signal corresponding to the image projected onto the plane by a projector excluded from a projector that projects an image onto a plane of the three-dimensional object, set as the coefficient for the image signal corresponding to the image projected to the blending area, in the image signals corresponding to the image projected to the plane by the projector which is not excluded from the projector which projects the image to the plane of the three-dimensional object, a value which gradually changes from "0" to "1" or from "1" to "0", sets "1" as the coefficient for a image signal corresponding to an image projected onto a region excluding the blending region in image signals corresponding to an image projected onto the plane in which a projector that is not excluded from a projector that projects an image onto a plane of the three-dimensional object.

(Appendix 10)

An image projection method for projecting an image onto a three-dimensional object from a plurality of projectors provided in a multi-projection system that comprises a master projector that is one of the plurality of projectors and that controls the operation of the multi-projection system, and a slave projector that is not the master projector in the plurality of projectors and that performs processing in accordance with an instruction of the master projector, the method comprising steps of:

estimating, by the slave projector, an amount of blur in an image projected from the projector itself in each of a plurality of planes of the three-dimensional object;

providing, by the slave projector, the estimated amount of blur in an image to the master projector;

estimating, by the master projector, an amount of blur in an image projected from the projector itself in each of a plurality of planes of the three-dimensional object; and determining, by the master projector, regions of the image projected from the plurality of projectors based on the amount of blur in the image estimated by the master projector and based on the amount of blur in the image estimated by the slave projector so that the amounts of blur in the image in each of the plurality of planes are minimized, respectively.

(Appendix 11)

A projector in a multi-projection system for projecting an image from a plurality of projectors onto a three-dimensional object, comprising:

a blur amount estimation unit that estimates an amount of blur in image projected from the projector in each of a plurality of planes of the three-dimensional object; and a blending unit that determines regions of the image projected from the plurality of projectors based on the amount of blur in image estimated by the blur amount estimation unit and based on the amount of blur in image estimated by another projector except for the projector itself in the plurality of projectors so that the amount of blur in image on the plurality of faces are minimized, respectively.

Although the present invention has been described above with reference to the exemplary embodiments, the present invention is not limited to the above-described exemplary embodiments. Various modifications can be made to the structure and details of the present invention which can be understood by a person skilled in the art within the scope of the present invention.

The invention claimed is:

1. A multi-projection system for projecting an image from a plurality of projectors onto a three-dimensional object, comprising:

a master projector that is one of the plurality of projectors and that controls the operation of the multi-projection system; and a slave projector that is not the master projector in the plurality of projectors and that performs processing in accordance with an instruction of the master projector, wherein the slave projector estimates an amount of blur in an image projected from the slave projector itself in each of a plurality of planes of the three-dimensional object, and provides the estimated amount of blur in the image to the master projector, wherein the master projector estimates an amount of blur in an image projected from the master projector itself in each of a plurality of planes of the three-dimensional object, and determines regions of the image projected from the plurality of projectors based on the amount of blur in the image estimated by the master projector and based on the amount of blur in the image estimated by the slave projector so that the amounts of blur in the image in each of the plurality of planes are minimized, respectively.

2. The multi-projection system according to claim 1, wherein said master projector excludes a projector in which the size of an image projected on a plane of a three-dimensional object is smaller than a preset size from a projector in which an image is projected on the plane.

3. The multi-projection system according to claim 1, wherein said master projector, when an image is projected from the plurality of projectors onto the same plane of the three-dimensional object, provides a blending region which is a region in which a part of each image is superimposed on a boundary between adjacent images on the plane, and excludes a projector that cannot secure a blending region having a size set in advance in a size of an image projected on a plane from a projector that projects an image on the plane.

4. The multi-projection system according to claim 1, wherein said master projector and said slave projector comprise three-dimensional position sensors to measure the position of the three-dimensional object in three dimensions, said master projector integrates three-dimensional position data indicating the positions of the three-dimensional objects measured by the three-dimensional position sensors of the self-device and the slave projector, and detects a plurality of planes of the three-dimensional objects based on the integrated three-dimensional position data.

5. The multi-projection system according to claim 4, wherein said master projector detects a plurality of planes of a three-dimensional object by determining a normal vector of each point of the three-dimensional position data after integration of the three-dimensional object composed of point group data, respectively, and by determining that the adjacent points are on the same plane when a difference between the normal vectors of adjacent points is smaller than a predetermined threshold value set in advance.

6. The multi-projection system according to claim 1, wherein said master projector and said slave projector set as a calculational resolution for each plane of the three-dimensional object in which the highest resolution in resolutions of images projected from said master projector and said slave projector on a plurality of planes of the three-dimensional object, obtain a plane-by-plane pixel basis blur amount, which is an amount of blur for each pixel of an image projected from said master projector and said slave projector on a plurality of planes of the three-dimensional object, for each plane of the three-dimensional object, convert the plane-by-plane pixel basis blur amount into a plane-by-plane calculation basis blur amount, which is an amount of blur in an image on the calculational resolution, and use the plane-by-plane calculation basis blur amount as the estimated amount of blur in the image on a plurality of planes of the three-dimensional object.

7. The multi-projection system according to claim 6, wherein said master projector and said slave projector store the measured values of the amount of blur in images for each zoom position corresponding to the focus position of the projection lens and the distance to the projection plane, the correction coefficient for the amount of blur in the images for each zoom position corresponding to the position of each pixel in the projected image and the distance to the projection plane, and the actually measured values of the conversion coefficient for the amount of blur in the images for each zoom position corresponding to the amount of inclination of the plane of the three-dimensional object with respect to the projection plane and the conversion coefficient for the amount of blur in the images for each zoom position corresponding to the distance to the projection plane, which are measured in advance, and determine the amount of blur in the images in pixel basis for each plane based on the measured values.

8. The multi-projection system according to claim 1, wherein said master projector invalidates all of the plurality of projectors when a minimum amount of blur in an image on a plane of the three-dimensional object is larger than a preset allowable amount of blur in an image, and an image is not projected on the plane.

9. An image projection method for projecting an image onto a three-dimensional object from a plurality of projectors provided in a multi-projection system that comprises a master projector that is one of the plurality of projectors and that controls the operation of the multi-projection system, and a slave projector that is not the master projector in the plurality of projectors and that performs processing in accordance with an instruction of the master projector, the method comprising:

estimating, by the slave projector, an amount of blur in an image projected from the slave projector itself in each of a plurality of planes of the three-dimensional object;

providing, by the slave projector, the estimated amount of blur in an image to the master projector;

estimating, by the master projector, an amount of blur in an image projected from the master projector itself in each of a plurality of planes of the three-dimensional object; and determining, by the master projector, regions of the image projected from the plurality of projectors based on the amount of blur in the image estimated by the master projector and based on the amount of blur in the image estimated by the slave projector so that the amounts of blur in the image in each of the plurality of planes are minimized, respectively.

10. A projector in a multi-projection system for projecting an image from a plurality of projectors onto a three-dimensional object, comprising:

a blur amount estimation unit that estimates an amount of blur in an image projected from the projector in each of a plurality of planes of the three-dimensional object; and a blending unit that determines regions of the image projected from the plurality of projectors based on the amount of blur in the image estimated by the blur amount estimation unit and based on the amount of blur in the image estimated by another projector except for the projector itself in the plurality of projectors so that the amounts of blur in the image on the plurality of faces are minimized, respectively.

* * * * *